US009692875B2

United States Patent
Novet

(10) Patent No.: US 9,692,875 B2
(45) Date of Patent: Jun. 27, 2017

(54) GRIP DETECTION AND CAPACITIVE GESTURE SYSTEM FOR MOBILE DEVICES

(71) Applicant: ANALOG DEVICES, INC., Norwood, MA (US)

(72) Inventor: Isaac Chase Novet, Carlsbad, CA (US)

(73) Assignee: ANALOG DEVICES, INC., Norwood, MA (US)

(*) Notice: Subject to any disclaimer, the term of this patent is extended or adjusted under 35 U.S.C. 154(b) by 0 days.

(21) Appl. No.: 14/634,201

(22) Filed: Feb. 27, 2015

(65) Prior Publication Data

US 2015/0237183 A1 Aug. 20, 2015

Related U.S. Application Data

(63) Continuation of application No. PCT/US2013/057736, filed on Aug. 30, 2013, and a
(Continued)

(51) Int. Cl.
*H04M 1/02* (2006.01)
*H04M 1/725* (2006.01)

(52) U.S. Cl.
CPC .... *H04M 1/72569* (2013.01); *H04M 1/72519* (2013.01); *H04M 2250/12* (2013.01)

(58) Field of Classification Search
CPC ......... H04M 1/72519; H04M 1/72569; H04M 2250/12
See application file for complete search history.

(56) References Cited

U.S. PATENT DOCUMENTS 5,729,200 A * 3/1998 Copeland ........... G08B 13/2408
340/551
7,327,352 B2 2/2008 Keefer
(Continued)

FOREIGN PATENT DOCUMENTS

CN 101266743 B 12/2010
CN 102520797 A 6/2012
(Continued)

OTHER PUBLICATIONS

Non-Final Office Action in U.S. Appl. No. 14/339,410 mailed Dec. 1, 2015, 19 pages.
(Continued)

*Primary Examiner* — Qun Shen
(74) *Attorney, Agent, or Firm* — Patent Capital Group

(57) ABSTRACT

Apparatus and methods are disclosed related to managing characteristics of a mobile device based upon capacitive detection of materials proximate the mobile device, a capacitive gesture system that can allow the same gestures be used in arbitrary locations within range of a mobile device. One such method includes receiving a first capacitive sensor measurement with a first capacitive sensor of the mobile device. The method further includes determining a value indicative of a material adjacent to the mobile device based on a correspondence between the first capacitive sensor measurement and stored values corresponding to different materials. The method further includes sending instructions to adjust a characteristic of the mobile device based on the determined value indicative of the material adjacent to the mobile device. In certain examples, gesture sensing can be performed using capacitive measurements from the capacitive sensors.

16 Claims, 15 Drawing Sheets

Related U.S. Application Data continuation-in-part of application No. 13/794,363, filed on Mar. 11, 2013, now Pat. No. 8,744,418.

(60) Provisional application No. 61/696,121, filed on Aug. 31, 2012, provisional application No. 61/750,349, filed on Jan. 8, 2013, provisional application No. 61/868,661, filed on Aug. 22, 2013.

(56) References Cited

U.S. PATENT DOCUMENTS

| | | |
|---|---|---|
| 7,786,981 B2 | 8/2010 | Proctor |
| 8,417,296 B2 | 4/2013 | Caballero et al. |
| 8,432,322 B2 | 4/2013 | Amm et al. |
| 8,482,536 B1* | 7/2013 | Young ............ G06F 3/044 178/18.03 |
| 8,577,289 B2 | 11/2013 | Schlub et al. |
| 8,744,418 B2 | 6/2014 | Novet |
| 8,977,318 B2 | 3/2015 | Yu et al. |
| 2005/0035955 A1 | 2/2005 | Carter |
| 2005/0122119 A1 | 6/2005 | Barlow |
| 2005/0146509 A1 | 7/2005 | Geaghan |
| 2005/0243053 A1 | 11/2005 | Liess et al. |
| 2006/0238517 A1 | 10/2006 | King |
| 2007/0291016 A1 | 12/2007 | Philipp |
| 2009/0153500 A1* | 6/2009 | Cho ............ G06F 3/0346 345/173 |
| 2009/0195959 A1 | 8/2009 | Ladouceur |
| 2009/0224776 A1* | 9/2009 | Keith ............ H03K 17/962 324/686 |
| 2009/0315570 A1 | 12/2009 | Chappell et al. |
| 2010/0134424 A1 | 6/2010 | Brisebois |
| 2010/0138680 A1 | 6/2010 | Brisebois et al. |
| 2010/0151916 A1* | 6/2010 | Baek ............ H04M 1/72519 455/567 |
| 2010/0153313 A1 | 6/2010 | Baldwin et al. |
| 2010/0164479 A1* | 7/2010 | Alameh ............ G01D 18/006 324/115 |
| 2010/0187332 A1 | 7/2010 | Ushijima |
| 2010/0308847 A1* | 12/2010 | Reynolds ............ G01D 5/24 324/688 |
| 2010/0313050 A1 | 12/2010 | Harrat et al. |
| 2011/0156955 A1* | 6/2011 | Jeong ............ G01S 13/931 342/359 |
| 2011/0193573 A1* | 8/2011 | De Boer ............ G01B 7/023 324/686 |
| 2011/0237306 A1 | 9/2011 | Kamii |
| 2011/0250928 A1 | 10/2011 | Schlub et al. |
| 2011/0263241 A1* | 10/2011 | Duarte ............ H04M 1/72569 455/422.1 |
| 2011/0277532 A1 | 11/2011 | Bartholomeyczik et al. |
| 2011/0312279 A1 | 12/2011 | Tsai et al. |
| 2012/0032916 A1 | 2/2012 | Enoki |
| 2012/0052872 A1 | 3/2012 | Do |
| 2012/0071203 A1 | 3/2012 | Wong |
| 2012/0116548 A1 | 5/2012 | Goree et al. |
| 2012/0218213 A1 | 8/2012 | Ciesla et al. |
| 2012/0290227 A1* | 11/2012 | Estrada ............ G01F 23/266 702/55 |
| 2012/0323513 A1 | 12/2012 | Prance et al. |
| 2013/0029625 A1 | 1/2013 | Park et al. |
| 2013/0045751 A1 | 2/2013 | Chao et al. |
| 2013/0050233 A1 | 2/2013 | Hirsch |
| 2013/0157726 A1 | 6/2013 | Miyazaki et al. |
| 2013/0217342 A1* | 8/2013 | Abdul-Gaffoor .... H03K 17/955 455/77 |
| 2013/0300668 A1 | 11/2013 | Churikov et al. |
| 2013/0335319 A1* | 12/2013 | Balasundaram ...... G06F 3/0488 345/156 |
| 2014/0066124 A1 | 3/2014 | Novet |
| 2014/0078086 A1 | 3/2014 | Bledsoe et al. |
| 2014/0125612 A1 | 5/2014 | Park et al. |
| 2014/0340338 A1 | 11/2014 | Kim |

FOREIGN PATENT DOCUMENTS

| | | |
|---|---|---|
| CN | 102566911 A | 7/2012 |
| CN | ZL20131044378.4 | 9/2015 |
| EP | 2175344 A2 | 4/2010 |
| EP | 2527955 A1 | 5/2011 |
| WO | 2012050875 A1 | 4/2012 |
| WO | 2012092318 A2 | 7/2012 |
| WO | 2013103690 A1 | 7/2013 |
| WO | 2014036532 A1 | 3/2014 |

OTHER PUBLICATIONS

European Search Report in EP Patent Application Serial No. 15175842.2 mailed Nov. 16, 2015, 7 pages.

Korean Patent Application Serial No. 10-2015-0098380 filed Jul. 10, 2015.

English Response to Chinese Office Action in CN Patent Application Serial No. 2013010144378.4 filed May 29, 2015, 13 pages.

Fatemeh Aezinia et al., "Three Dimensional Touchless Tracking of Objects Using Integrated Capacitive Sensors", IEEE Transactions on Consumer Electronics, vol. 58, No. 3, Aug. 2012, pp. 886-890, 5 pages.

U.S. Appl. No. 14/339,410, filed Jul. 23, 2014.

U.S. Appl. No. 13/794,363, filed Mar. 11, 2013.

Non-Final Office Action in U.S. Appl. No. 13/794,363 mailed Sep. 16, 2013.

Response to Non-Final Office Action in U.S. Appl. No. 13/794,363, filed Nov. 11, 2013.

Supplemental Amendment to Response to Non-Final Office Action in U.S. Appl. No. 13/794,363, filed Jan. 15, 2014.

Written Opinion and International Search Report in PCT/US2013/057726 mailed Dec. 19, 2013 (6 pages).

Chinese Patent Application Serial No. 2013010144378.4 filed Apr. 24, 2013.

Chinese Office Action in Serial No. 2013010144378.4 mailed Jan. 20, 2015, 6 pages (no translation).

Korean Patent Application Serial No. 10-2013-0040341 filed Apr. 24, 2013.

Korean Office Action in Korean Patent Application Serial No. 10-2013-0040341 mailed Apr. 25, 2014, 41 pages.

English Translation of Korean Office Action in Korean Patent Application Serial No. 10-2013-0040341, 4 pages.

Translation and Response to Amendments and Arguments in Korean Office Action in Korean Patent Application Serial No. 10-2013-0040341 filed Jun. 24, 2014, 24 pages.

English Translation of Response to Korean Office Action in Korean Patent Application Serial No. 10-2013-0040341 filed Jun. 24, 2014, 3 pages.

Notice of Allowance for Korean Patent Application Serial No. 10-2013-0040341 mailed Oct. 7, 2014, 2 pages.

English Translation of Notice of Allowance for Korean Patent Application Serial No. 10-2013-0040341 mailed Oct. 7, 2014, 1 page.

Sean Buckley, "Cirque's Proximity and Grip Sensor Knows Your Left From Your Right, Won't Let You Turn Up Your Car Stereo," www.engadget.com/2012/02/24/cirques-promixity-and-grip-sensor-knows-your-left-from-your-rig/, pp. 1-3.

Tyler Berryhill, "1-μA Capacitive Grip Detection Based on MSP430™ Microcontrollers," Application Report, SLAA515A—Dec. 2011—Revised Mar. 2013, pp. 1-10.

Raphael Wimmer et al., "Thracker-Using Capacitive Sensing for Gesture Recognition," Research Group Embedded Interaction, University of Munich, pp. 1-6.

"Touché: Touch and Gesture Sensing for the Real World," Disney Research, Jul. 12, 2013, © 2012 Disney, pp. 1-3.

Sebastian Anthony, "Disney Touché Turns Everyday Objects Into Multi-Touch, Gesture-Recognizing Interfaces," ExtremeTech, Jul. 12, 2013, www.extremetech.com/computing/128715-disney-touche-turns-everyday-objects-into-multi-touch-gesture-recognizing-interfaces, pp. 1-3.

(56) References Cited

OTHER PUBLICATIONS

Munehiko Sato et al., "Touché: Enhancing Touch Interaction on Humans, Screens, Liquids, and Everyday Objects," CHI '12, May 5-10, 2012, Austin, Texas, USA, © 2012 ACM 978-1-4503-1015-4-12/05, pp. 1-10.
Kee-Eung Kim et al., "Hand Grip Pattern Recognition for Mobile User Interfaces", Interaction Lab, Samsung Advanced Institute of Technology, Suwon, Korea, © 2006, American Association for Artificial Intelligence (www.aaai.org), 6 pages.
Application Note, "Atmel AT03152: Proximity Sensing for SAR", Atmel Touch Sensors, 42158B-Touchsensors—Aug. 2013, 7 pages.
Patrick Hanley, "Capacitive Proximity Sensing Technology Update", Capacitive Proximity Sensing Technology Update:: Radio-Electronics.com, Dec. 10, 2012, online at: http://www.radio-electronics.com/, Apr. 18, 2014, 7 pages.
Datasheet—Production Data, "STM8T143—Single-channel capacitive sensor for touch and proximity detection", ST life. augmented, Jan. 2014, DocID18315 Rev 7, www.st.com, 65 pages.
Samer Bahou, "Cypress's TrueTouch® Gen4 Touchscreen Controllers Deliver New Advanced Features Including Industry's Best Tracking of Gloved Fingers", May 28, 2013, Cypress Semiconductor Corp. © 2014, 2 pages.
Sivaguru Noopuran et al., "Exclusive: Promixity Sensing in Mobile Phones", Jan. 31, 2014, Wireless Design and Development (WDD), online at: http://www.wirelessdesignmag.com/articles/2014/01/exclusive-proximity-sensing-mobile-phones, 12 pages.
Mayank Goel et al., "GripSense: Using Built-In Sensors to Detect Hand Posture and Pressure on Commonidity Mobile Phones", UIST '12, Oct. 7-10, 2012, Cambridge, Massachusetts, USA, © 2012 ACM 978-1-4503-1580-7/12/10 . . . $15.00, 10 pages.
Sami Myllymäki, "Capacitive Antenna Sensor for User Proximity Recognition", ACTA, Universitatis Ouluensis, Oulu 2012, C 429, University of Oulu, Oulu 2012, 60 pages.
Datong Chen et al., "An Architecture for Multi-Sensor Fusion in Mobile Environments", University of Karlsruhe, Karlruhe, Germany, 8 pages.
Wook Chang et al., "Recognition of Grip-Patterns by Using Capacitive Touch Sensors," IEEE ISIE 2006, Jul. 9-12, 2006, Montréal, Québec, Canada, 1-4244-0497-5/06/$20.00 © 2006 IEEE, 6 pages.
Masakutsu Tsukamoto et al., "User Interface Using National Gripping Features—Grip UI", Technology Reports, © 2014 NTT DOCOMO, Inc., NTT DOCOMO Technical Journal V. 15 No. 3, 8 pages.

Nicholas Cravotta, "Optimizing Proximity Sensing for Consumer Electronics Applications", Digi-Key Corporation, Apr. 26, 2012, online at http://www.digikey.com/en-US/articles/techzone/2012/apr/optimizing-proximity-sensing-for-consumer-electronics-applications, 5 pages.
Tyler Berryhill, "1-µA Capacitive Grip Detection Based on MSP430™ Microcontrollers," Application Report, SLAA515A—Dec. 2011-Revised Mar. 2013, pp. 1-10.
Holly Gu et al., "1-µA Capacitive Grip Detection Based on MSP430™ Microcontrollers," Application Report, SLAA515B—Aug. 2013, 15 pages.
Travis Hwang, "10-cm Capacitive Proximity Detection with MSP430™ Microcontrollers," Application Report, SLAA521A—Jul. 2013, 9 pages.
SX9300 Ultra Low Power, Dual Channel, Smart Proximity SAR Compliant Solution, SEMTECH, Wireless & Sensing, Revision 4, Feb. 5, 2014, © 2014 Semtech Corporation, www.semtech.com, 39 pages.
Brandon Thomas Tyler, "Graspables: Grasp Recognition as a User Interface", © Massachusetts Institute of Technology, 2008, 87 pages.
Cypress, "Take the Next Step with TrueTouch", touch.cypress.com, © 2013 Cypress Semiconductor Corporation, 2 pages.
Ronak Desai, "Using MCUs in Cell Phone and Tablet Apps", Apr. 2, 2014, Cypress Semiconductor Corp., 9 pages.
Chinese Office Action in CN Patent Application Serial No. 2013010144378.4 mailed Jan. 20, 2015, 6 pages (no translation).
English Summary of Chinese Office Action in CN Patent Application Serial No. 2013010144378.4 mailed Jan. 20, 2015, 1 page.
Machine Translation (English) of CN Publication No. 102520797A (obtained from Google Patents on May 7, 2015), 5 pages.
Machine Translation (English) of CN Publication No. 102566911A (obtained from Google Patents on May 7, 2015), 5 pages.
Machine Translation (English) of CN Publication No. 101266743B (obtained from Google Patents on May 7, 2015), 13 pages.
Final Office Action in U.S. Appl. No. 14/339,410 mailed May 24, 2016, 26 pages.
Non-Final Office Action in U.S. Appl. No. 14/339,410 mailed Oct. 4, 2016, 25 pages.
Final Office Action in U.S. Appl. No. 14/339,410 mailed Apr. 6, 2017, 17 pages.

* cited by examiner

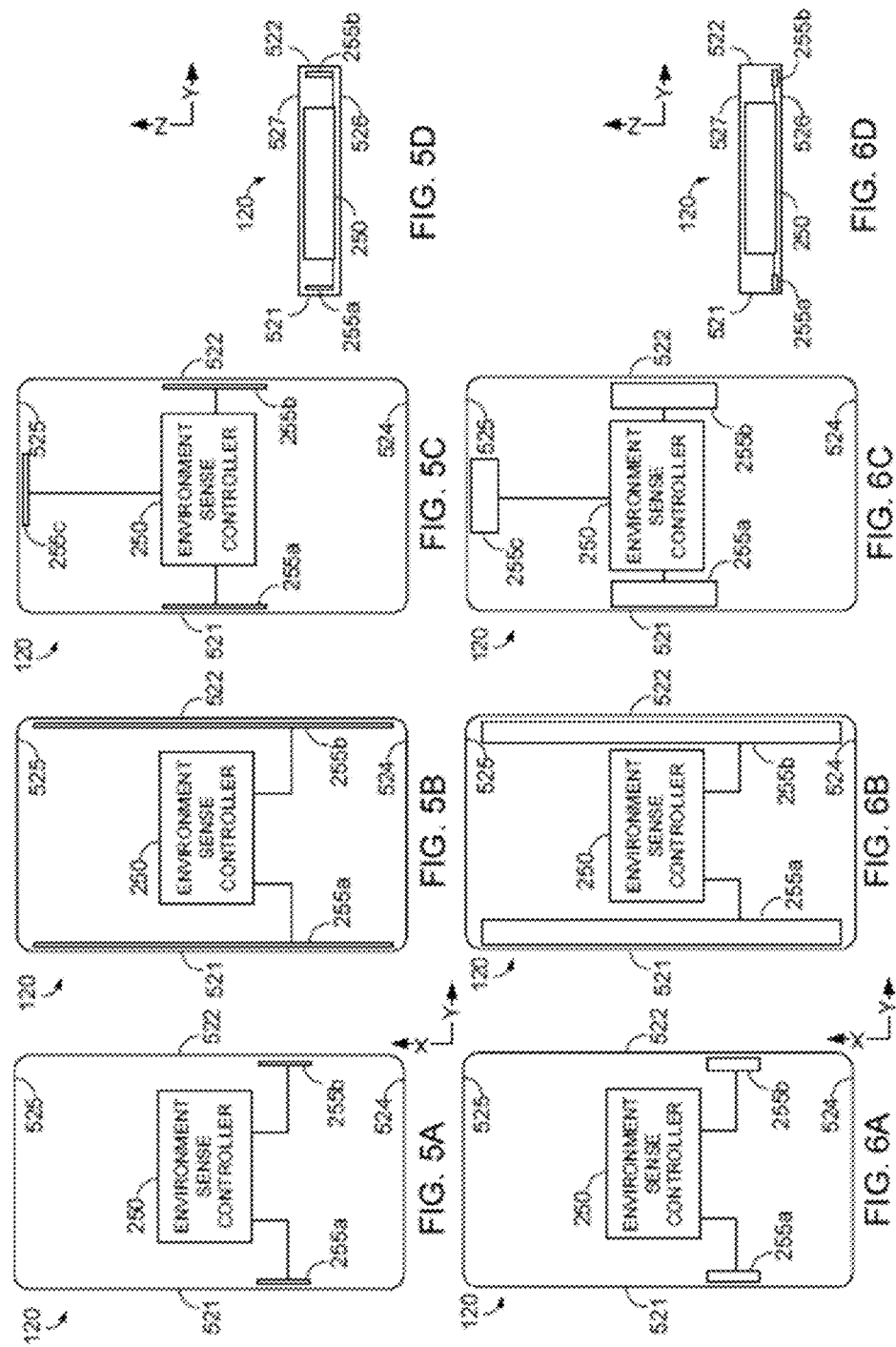

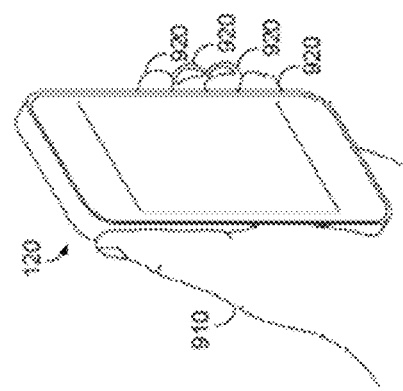
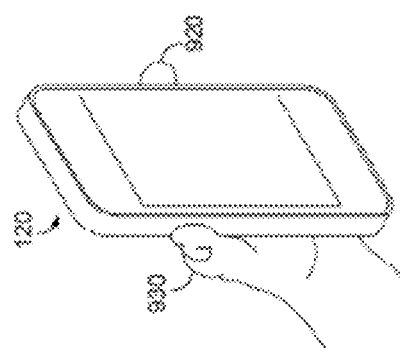
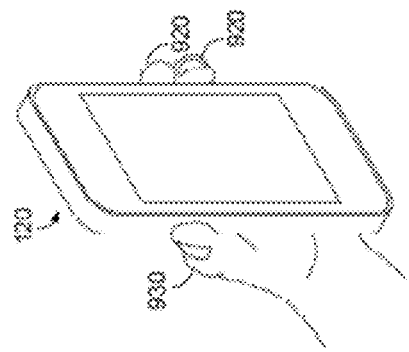
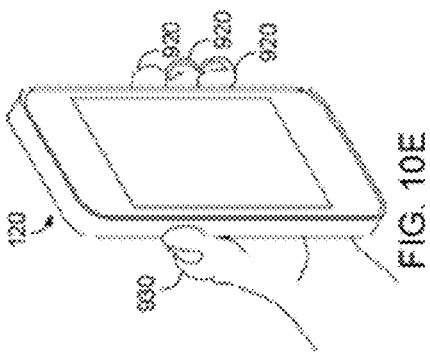
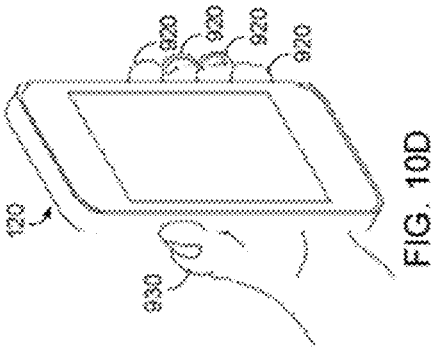

GRIP DETECTION AND CAPACITIVE GESTURE SYSTEM FOR MOBILE DEVICES

CROSS REFERENCE TO RELATED APPLICATIONS

This application is a Continuation under 35 U.S.C. §120 of a copending International (PCT) application PCT/US2013/057736, filed Aug. 30, 2013 (published as WO 2014/036532 A1, referenced herein as "The PCT Application"), entitled "ENVIRONMENT DETECTION AND CAPACITIVE GESTURE SYSTEM FOR MOBILE DEVICES". The PCT application, having the same inventor as this application, is hereby incorporated by reference in its entirety.

The PCT application claims priority to or receives benefit from earlier US patent applications, including U.S. Provisional Application 61/696,121 (filed on 31 Aug. 2012), U.S. Provisional Application 61/750,349 (filed on 8 Jan. 2013), U.S. Non-Provisional application Ser. No. 13/794,363 (filed on 11 Mar. 2013, now issued as U.S. Pat. No. 8,744,418), and U.S. Provisional Application 61/868,661 (filed on 22 Aug. 2013). These referenced earlier US patent applications are also hereby incorporated by reference in its entirety.

TECHNICAL FIELD OF THE DISCLOSURE

The disclosed technology relates to electronic systems, and more particularly, to environment detection and a capacitive gesture system that could be applicable to any type of computing device.

DESCRIPTION OF RELATED TECHNOLOGY

Capacitive sensing is a technology based on capacitive coupling which takes human body capacitance as input. Capacitive sensing is used in many different types of sensors, including those to detect and measure proximity, position or displacement, humidity, fluid level, and acceleration. Capacitive sensing as a human interface device (HID) technology (for example, to replace the computer mouse) has become more popular. Capacitive touch sensors are used in many devices such as laptop trackpads, digital audio players, computer displays, mobile phones, mobile devices, tablets etc. Design engineers continue to choose capacitive sensors for their versatility, reliability and robustness, unique human-device interface, and cost reduction over mechanical switches.

Capacitive sensors generally detect anything that is conductive or has a dielectric different than that of air. While capacitive sensing applications can replace mechanical buttons with capacitive alternatives, other technologies such as multi-touch and gesture-based touchscreens are also premised on capacitive sensing.

In a separate endeavor, mobile devices have surpassed the standard desktop computer. A mobile device can take the form of, for example, a tablet, a smartphone (inclusive of Android™ phones, i-Phones™), an i-Pad™, a Google Nexus™, a Microsoft Surfacer™, a personal computer, a video processing component, a laptop computer (inclusive of any type of notebook), any type of touch-enabled input device, a portable media platform (PMP), etc. Some mobile devices are powered by a battery, and some mobile devices are capable of being powered by an external power source such as an alternating current (AC) outlet. Many mobile devices support wired and/or wireless communication for telephony, video conferencing, and/or data transfer.

Mobile devices can be used in a variety of environments. For example, a user can hold a mobile device to his ear or at arm's length. Mobile devices can be placed on a surface such as a table, desk, or counter. A user can place a mobile device in an enclosed space such as a drawer, purse, or pocket. Some mobile devices can be equipped with a protective case. Some mobile devices can be placed in a stand or docking station, which can facilitate charging or wired communication with another device.

The environment around a mobile device may change over time. For example, the mobile device may be moved between environments (such as from a table to a purse). People or objects may move in the vicinity of the mobile device. Atmospheric conditions in the vicinity of the mobile device can change. For a variety of reasons, it can be desirable to ascertain environmental conditions in the immediate vicinity of a mobile device.

SUMMARY OF THE DISCLOSURE

Various implementations of systems, methods and devices within the scope of the appended claims each have several aspects, no single one of which is solely responsible for the desirable attributes described herein. Without limiting the scope of the appended claims, some prominent features are described herein.

In at least one embodiment, a capacitive gesture system is provided that allows the same gestures that are used on touch screens to be used in arbitrary locations within range of a mobile device. One aspect of the architecture relates to a suite of algorithms that work in conjunction with a chip that can perform capacitive sensing. In certain examples, the chip takes readings off capacitive sensors and performs functions of gesture sensing, etc. In addition, the human operator can gesticulate around, in front, behind, on the side, etc. of the device, and the algorithms enable picking up changes in capacitance and interpreting gestures accordingly.

Changes in capacitance may be interpreted as gestures which correspond to e.g., different environment characteristics, contexts, actions and/or user inputs, such that an appropriate characteristic of the mobile device may be adjusted. The interpretation of changes in capacitance (e.g., mapping of the changes in capacitance to one or more characteristics/contexts/actions/inputs) may be done in various ways. One way to interpret changes in capacitance is through classification, e.g., using statistical methods and/or machine learning methods. According to one aspect, a Naïve Bayesian classifier is used for classifying an observed change(s) in capacitance to determine which one or more appropriate changes to the characteristic(s) of the mobile device correspond to the observed change(s) in capacitance. A Naïve Bayesian classifier is advantageous because it is relatively accurate but yet relatively simple to implement. Simplicity of the classifier provides added advantages such as power savings and relatively short processing time to allow for real-time processing.

Certain features of the present disclosure may include (but are not limited to):
  Stylus/finger material detection for absolute position scaling: scales along X-Y axis (in a single plane);
  Stylus material recognition for extended application level use (e.g., a game recognizes a certain stylus and could enable access to a new character). The algorithm could communicate with applications and interpret gestures accordingly. Thus, a specific gesture in one application can mean a different action in another application.
  Gesture recognition can occur from the sides, top, bottom, front, or back of a device.

In one implementation, a three-electrode sensing array is used.

Certain examples include a differential feed line cancelation. Normally, the feed line between a sensor and a chip is also sensing, and this can present a problem. Certain algorithms of the present disclosure cancel the effects of the feed line.

Certain embodiments include a differential side nonnormal (fringe) cancelation.

Electrodes can be placed on the screen. The electrodes (comprising 3 arrays (potentially in three different planes)) are connected to the chip. The sensor can be unidirectional.

Multi-planar gestures can be accommodated (e.g., writing a note on the surface of a table, then dragging your finger off of the table and to the left to advance to the next page of the notebook). Certain embodiments are not necessarily true 3D. The 3D space is spliced into several 2D planes. A sensor watches/senses on each plane and combines sensing results to give 3D result.

Absolute positioning (e.g. clicking on apps) and Relative positioning (e.g., swipes, scrolls, etc.) are supported.

Another aspect of the disclosure provides a method of managing characteristics of a mobile device based upon capacitive detection of materials proximate the mobile device. The method includes receiving a first capacitive sensor measurement with a first capacitive sensor of the mobile device. The method further includes determining a value indicative of a material adjacent to the mobile device based on a correspondence between the first capacitive sensor measurement and stored values corresponding to different materials. The method further includes sending instructions to adjust a characteristic of the mobile device based on the determined value indicative of the material adjacent to the mobile device.

Another aspect of the disclosure provides a method of sensing an environment of a mobile device. The method includes taking a measurement with a first capacitive sensor of the mobile device. The method further includes determining an environmental characteristic based on a correspondence between the measurement and the environmental characteristic. The method further includes adjusting a characteristic of the mobile device based on the determined environmental characteristic. In an embodiment, the determined environmental characteristic can include a dielectric constant of an object proximate to the mobile device. In an embodiment, the determined environmental characteristic can include a material type of an object proximate to the mobile device. In some embodiments, the mobile device can be in motion relative to a proximate object or the proximate object can be in motion relative to the mobile device. The method can further include determining a change in measurement caused at least in part by the relative movement. The method can further include determining the characteristic of the object based on the change in measurement.

In an embodiment, the method can further include measuring an indicator of a change in position of the mobile device. The method can further include determining the characteristic of the object based further on the indicator. In an embodiment, the method can further include determining a variability in measurement caused by an object in the proximity of the mobile device. The method can further include determining whether the object is human based on the variability in measurement.

In an embodiment, the method can further include taking a measurement with a second capacitive sensor of the mobile device. The method can further include determining a spatial relationship between the mobile device and the material adjacent to the mobile device based on the measurements taken from the first and second capacitive sensors. The determined spatial relationship can include a manner in which a hand grips the mobile device.

In an embodiment, the determined environmental characteristic can include a spatial relationship between the mobile device and an object proximate to the mobile device. The method can further include taking a measurement with a second capacitive sensor of the mobile device. The method can further include determining the spatial relationship based on the measurements taken from the first and second capacitive sensors.

In various embodiments, sending instructions to adjust the characteristic can include sending instructions to adjust a radio frequency (RF) communication characteristic based on the determined value indicative of the material adjacent to the mobile device. Sending instructions to adjust the characteristic of the mobile device can include adjusting a transmit power of the mobile device. Sending instructions to adjust the characteristic of the mobile device can include adjusting a tuning of an antenna. Sending instructions to adjust the characteristic of the mobile device can include transmitting information related to the measurement.

In various embodiments, sending instructions to adjust the characteristic of the mobile device can include recording an updated correspondence between the first capacitive sensor measurement and the value indicative of the material adjacent to the mobile device in the stored values corresponding to different materials. Sending instructions to adjust the characteristic of the mobile device can include adjusting a user interface output. In an embodiment, determining the value indicative of the material adjacent to the mobile device can include determining a value that corresponds to a conductivity classification.

In an embodiment, the determined spatial relationship can include a manner in which a hand grips the mobile device. In an embodiment, adjusting the characteristic of the mobile device can include recording an updated correspondence between the measurement and the environmental characteristic. In an embodiment, adjusting the characteristic of the mobile device can include a transmit power of the mobile device.

In an embodiment, adjusting the characteristic of the mobile device can include a tuning of an antenna. In an embodiment, adjusting the characteristic of the mobile device can include adjusting a user interface output. In an embodiment, adjusting the characteristic of the mobile device can include transmitting information related to the measurement.

In various embodiments, when the mobile device is in motion relative to the material adjacent to the mobile device, the method can further include determining a change in measurement by the first capacitive sensor caused at least in part by the relative movement of the mobile device. The method can further include determining the value indicative of the material adjacent to the mobile device based on the change in measurement. The method can further include measuring an indicator of a change in position of the mobile device. The method can further include determining the value indicative of the material adjacent to the mobile device based further on the indicator.

In an embodiment, the method can further include determining a variability over time in measurement by the first capacitive sensor caused by the material adjacent to the mobile device. The method can further include determining whether the material is human based on the variability in measurement.

In an embodiment, the method can further include measuring a case or housing, or a change thereof, with the first capacitive sensor. The method can further include calibrating the first capacitive sensor based on the measurement.

In an embodiment, adjusting the characteristic of the mobile device can include logging data. In an embodiment, adjusting the characteristic of the mobile device can include building a relational database. In an embodiment, adjusting the characteristic of the mobile device can include establishing patterns of mobility and patterns of expected use cases. The relational database may be used as training data for classifying observed changes in capacitance. In particular, further data (i.e., information which corresponds logged data to one or more classes, provided manually or through clustering algorithms or some combination of both) may be provided with the logged data to provide training data for supervised learning. In some embodiments, the data being logged may be sourced from one or a plurality of mobile devices (or relational databases). For instance, patterns may be determined through clustering algorithms, and the clusters may be used as data for supervised and/or unsupervised learning in training classification algorithms used for classifying observed changes as one or more patterns. The patterns may also be used to improve existing probability distributions.

Another aspect of the subject matter described in the disclosure provides a system configured to sense an environment of a mobile device. The system includes a first capacitive sensor configured to provide a measurement related to a material adjacent to the mobile device. The system further includes a memory configured to store a correspondence between one or more measurements from the first capacitive sensor and one or more values indicative of the material adjacent to the mobile device. The system further includes one or more processors configured to receive the measurement. The one or more processors are further configured to determine a corresponding value indicative of the material adjacent to the mobile device based on the measurement. The one or more processors are further configured to modify a state of the mobile device based on the determined value indicative of the material adjacent to the mobile device.

Another aspect of the subject matter described in the disclosure provides a system configured to sense an environment of a mobile device. The system includes a first capacitive sensor. The system further includes a memory. The system further includes one or more processors configured to take a measurement from the first capacitive sensor. The one or more processors are further configured to determine an environmental characteristic based on a correspondence between the measurement and the environmental characteristic. The one or more processors are further configured to adjust a characteristic of the mobile device based on the determined environmental characteristic.

In various embodiments, the system can further include a second capacitive sensor of the mobile device. The one or more processors can be further configured to determine a spatial relationship between the mobile device and the material adjacent to the mobile device based on measurements received from the first and second capacitive sensors. The determined spatial relationship can include a manner in which a hand grips the mobile device.

In various embodiments, the one or more processors can be configured to modify the state by modifying a radio frequency (RF) communication characteristic based on the determined value indicative of the material adjacent to the mobile device. The one or more processors can be configured to adjust a transmit power of the mobile device based on the determined value indicative of the material adjacent to the mobile device. The one or more processors can be configured to adjust a tuning of an antenna based on the determined value indicative of the material adjacent to the mobile device. The system can further include a transmitter, configured to transmit information related to the measurement, based on the determined value indicative of the material adjacent to the mobile device.

In various embodiments, the one or more processors can be configured to record an updated correspondence between the measurement and the material, adjust a user interface output, and/or log data based on the determined value indicative of the material adjacent to the mobile device. The value indicative of the material adjacent to the mobile device can include a dielectric constant of the object proximate to the mobile device. The value indicative of the material adjacent to the mobile device can correspond to a conductivity classification.

In various embodiments, when the mobile device is in motion relative to the material, the one or more processors can be further configured to determine a change in measurement by the first capacitive sensor caused at least in part by the relative movement of the mobile device. The one or more processors can be further configured to determine the value indicative of the material adjacent to the mobile device based on the change in measurement. The system can further include an accelerometer configured to measure an indicator of a change in position of the mobile device. The one or more processors can be further configured to determine the value indicative of the material adjacent to the mobile device based on the indicator.

In an embodiment, the one or more processors can be further configured to determine a variability over time in measurement by the first capacitive sensor caused by the material adjacent to the mobile device. The one or more processors can be further configured to determine whether the material is human based on the variability in measurement.

In an embodiment, the received measurement can correspond to a case or housing of the mobile device. The one or more processors can be further configured to calibrate the first capacitive sensor based on the received measurement or a change thereof.

Another aspect of the subject matter described in the disclosure provides an apparatus for sensing an environment of a mobile device including means for receiving a measurement related to a material adjacent to the mobile device. The apparatus further includes means for determining a value indicative of the material adjacent to the mobile device based on a correspondence between the measurement and the value. The apparatus further includes means for modifying an aspect of the mobile device based on the determined value indicative of the material adjacent to the mobile device.

Another aspect of the subject matter described in the disclosure provides a non-transitory computer-readable medium including code that, when executed, causes an apparatus to take a measurement with a first capacitive sensor of a mobile device. The medium further includes code that, when executed, causes the apparatus to look up a correspondence between the measurement and one or more values indicative of a material adjacent to the mobile device. The medium further includes code that, when executed, causes the apparatus to modify a state of the mobile device based on the correspondence.

Another aspect of the subject matter described in the disclosure provides an apparatus for sensing an environment of a mobile device. The apparatus includes means for taking a capacitive measurement. The apparatus further includes means for determining an environmental characteristic based on a correspondence between the measurement and the environmental characteristic. The apparatus further includes means for adjusting a characteristic of the mobile device based on the determined environmental characteristic.

Another aspect of the subject matter described in the disclosure provides a non-transitory computer-readable medium comprising code that, when executed, causes an apparatus to take a measurement with a first capacitive sensor of a mobile device. The medium further includes code that, when executed, causes the apparatus to determine an environmental characteristic based on a correspondence between the measurement and the environmental characteristic. The medium further includes code that, when executed, causes the apparatus to adjust a characteristic of the mobile device based on the determined environmental characteristic.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWING

FIGS. 5A-5D are schematic diagrams showing exemplary sensor placements within the mobile device of FIG. 2, according to various embodiments.

FIGS. 6A-6D are schematic diagrams showing exemplary horizontal sensor placements within the mobile device of FIG. 2, according to various embodiments.

FIGS. 10A-10E are perspective views of the exemplary grips of FIGS. 9A-9E.

DESCRIPTION OF THE DISCLOSURE

Figure 1:
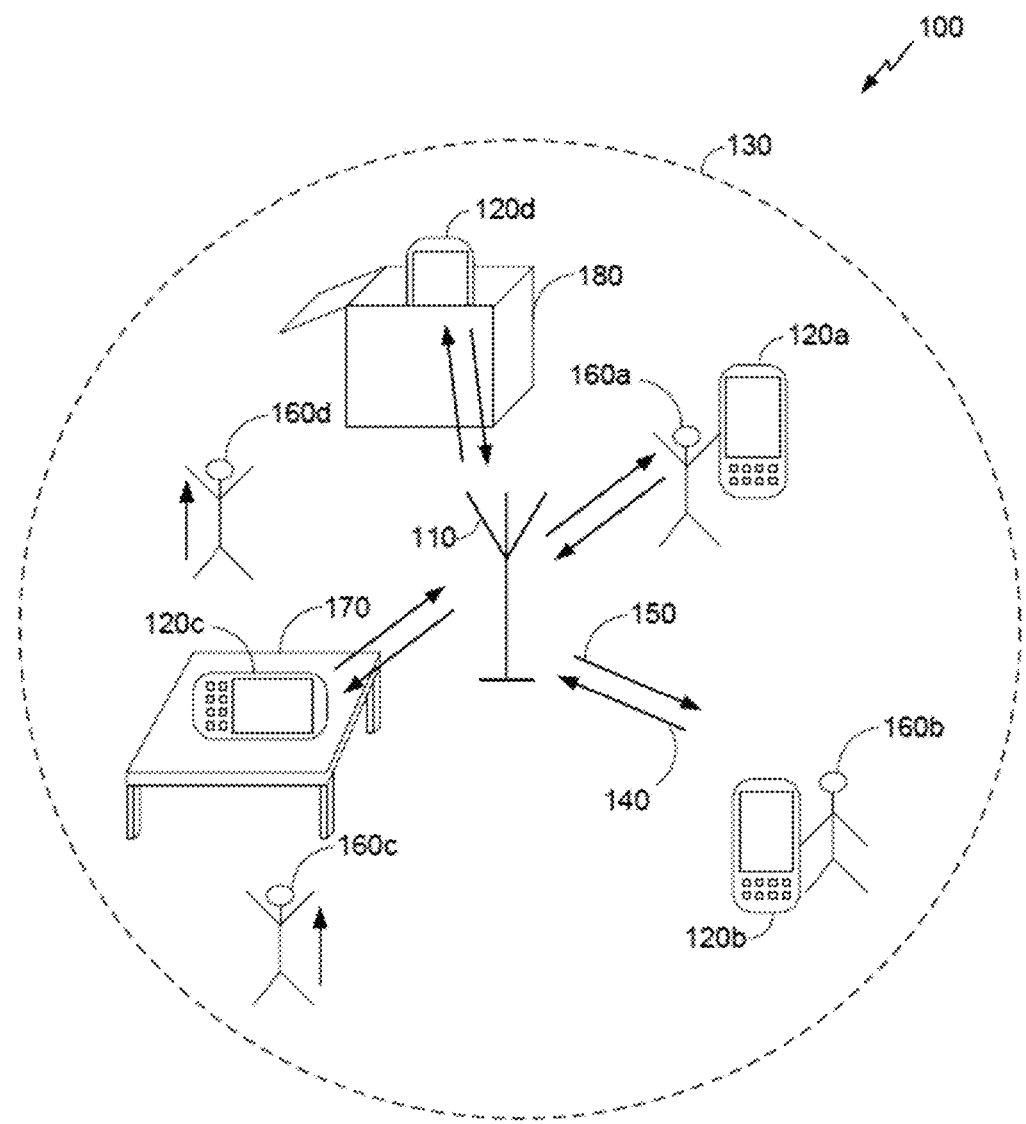
FIG. 1 shows an exemplary wireless communication system in which aspects of the present disclosure can be employed.

The following detailed description of certain embodiments presents various descriptions of specific embodiments of the inventions. However, the inventions can be embodied in a multitude of different ways as defined and covered by the claims. In this description, reference is made to the drawings where like reference numerals indicate identical or functionally similar elements.

As discussed above, it can be desirable to ascertain environmental conditions surrounding mobile devices. In one particular example, the mobile device can be configured for wireless communication. The environment surrounding the wireless mobile device may affect radio transmission and/or reception. The mobile device can be configured to detect a characteristic of the environment, or a change thereof, and adjust a characteristic of radio transmission and/or reception based on the detected characteristic. In other applications, in response to detection of environmental conditions, the mobile device can affect other changes, such as altering displayed images or text on the mobile device screen; transmitting data related to the detected environmental characteristics; logging data, building relational databases; establishing patterns of mobility; and establishing patterns of expected use cases.

Environmental detection, such as determining a specific type of material near a device, can be quite difficult to perform. Typically current sensors can only detect whether something is touching a device. Capacitive sensing involves measuring changes in electric fields near the sensor. Just like a balloon that has been rubbed on a cloth and has a static charge can attract a person's hair when passing nearby, capacitive sensors can detect changes based on interactions of objects and their electrical fields. Most capacitive sensing methods provide minimal information, such as simple binary decisions based on threshold readings. It has been quite problematic in the past to obtain much more information from capacitive sensors. The present disclosure teaches apparatuses and structures employing capacitive sensing to obtain detailed, reliable, and sophisticated information about multiple environmental characteristics.

Figure 2:
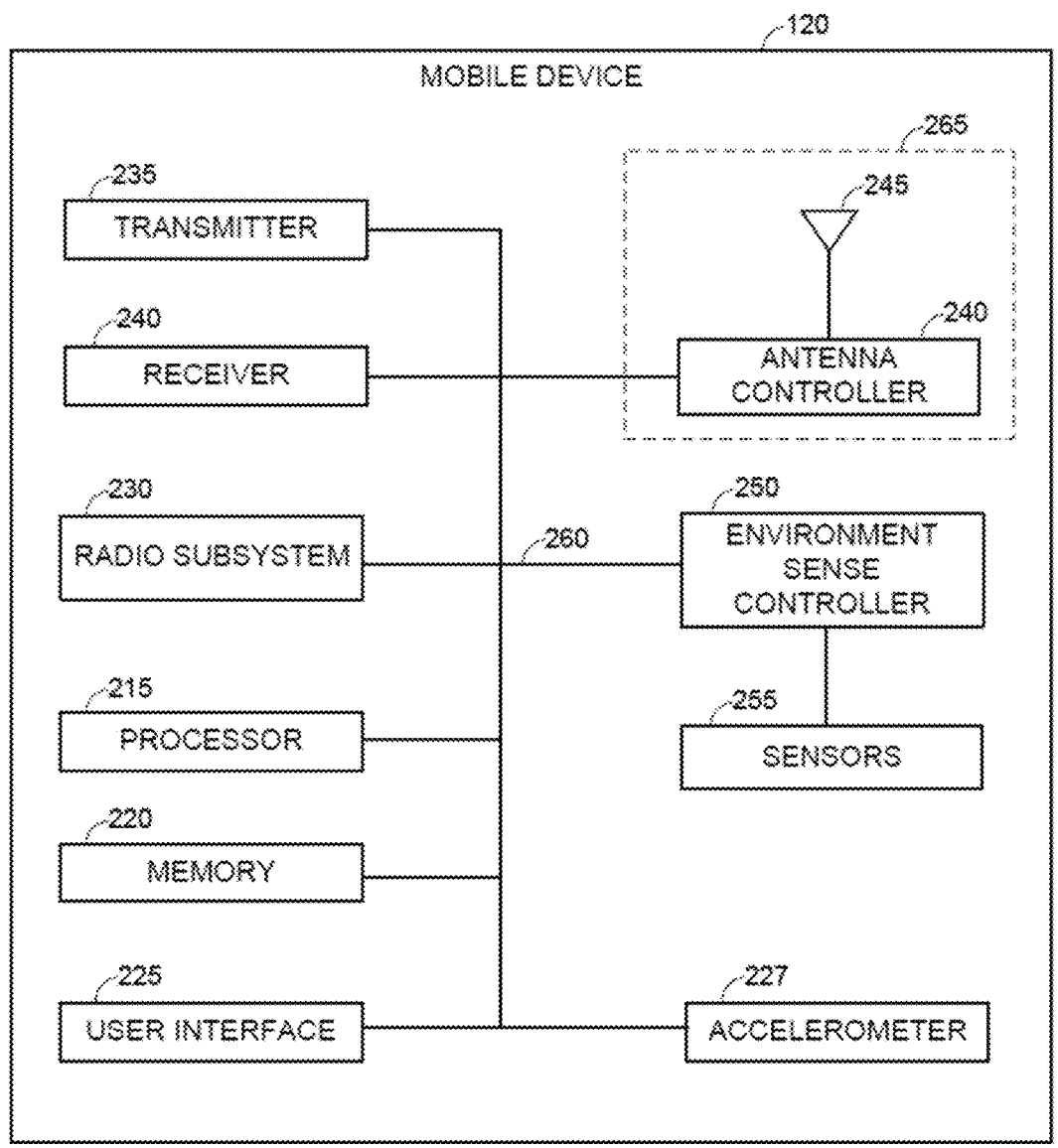
FIG. 2 is a block diagram of a mobile device that can be employed in the wireless communication system of FIG. 1.

FIG. 1 shows an exemplary wireless communication system 100 in which aspects of the present disclosure can be employed. FIG. 2 schematically illustrates and mobile device 120. The wireless communication system 100 can include a base station 110 and one or more mobile devices 120 (FIG. 2), such as 120a-120d, within a service area 130.

The wireless communication system 100 can employ a wireless standard such as, for example, a cellular voice and/or data standard.

In various embodiments, the base station 110 can communicate with the one or more mobile devices 120 according to one or more wireless standards including, but not limited to, GSM, GPRS, EDGE, UMTS, CDMA2000™, W-CDMA, 3GPP, HSPA, WIMAX™, IEEE 802.11x, and BLUETOOTH™. The base station 110 can transmit data to the mobile devices 120 on a downlink 150, and can receive data from the mobile devices 120 on an uplink 140.

The mobile devices 120 can include, for example, cell phones, wireless telephone handsets, personal digital assistants (PDAs), portable media platforms (PMPs), portable gaming devices, tablets, laptops, netbooks, portable computers, speakers or headphones, device peripherals (such as keyboards, mice, graphics tablets, remote controls, and the like), wearable devices (such as glasses, wristwatches, heads-up displays (HUDs), pacemakers or other medical devices, and the like), pagers, electronic books, wireless e-mail devices, etc., all of which can be capable of wireless communication.

As discussed above, the mobile devices 120 can be used in a variety of environments. For example, a user 160a can hold the mobile device 120a in his left hand. Accordingly, the user's hand may affect a characteristic of the mobile device 120a such as a radio characteristic of the uplink 140 and/or the downlink 150. For example, the user's hand may at least partially block the signal between at least one antenna 245 (FIG. 2) of the mobile device 120a and an antenna of the base stations 110. As another example, the user's 160a hand may at least partially detune the antenna 245 of the mobile device 120a.

The proximity of the user's 160a hand to the mobile device 120a may increase the amount of radiation absorbed by the user 160a. In an embodiment, user 160a may hold the mobile device 120a near his head. For example, the user 140a may be talking on a cell phone. Accordingly, proximity of the user's 160a hand to the mobile device 120a may increase the amount of radiation absorbed by the user 160a. In an embodiment, radiation by the mobile device 120a may be limited according to voluntary thresholds, standards, rules, and/or regulations.

For example, the mobile device 120a may be licensed for operation by the Federal Communications Commission (FCC), which has adopted limits for safe exposure to radio frequency (RF) energy. The limits can be given in terms of a unit referred to herein as the specific absorption rate (SAR), which is a measure of the amount of radio frequency energy absorbed by the body when using a mobile phone. The mobile device 120a may be configured to comply with one or more limits for safe exposure. For example, the mobile device 120a may be configured to maintain a SAR level equal to or less than 1.6 watts per kilogram (1.6 W/kg).

Another user 160b can hold the mobile device 120b in his right hand. In an embodiment, the user 160b holds the mobile device 120b at arm's length. For example, the user 160b may be using the mobile device 120b to browse the Internet. Accordingly, the user's hand may affect a characteristic of the mobile device 120a such as a radio characteristic of the uplink 140 and/or the downlink 150. For example, the user's 160b hand may at least partially block the signal between at least one antenna 245 (FIG. 2) of the mobile device 120b and an antenna of the base station 110. As another example, the user's hand may at least partially detune the antenna 245 of the mobile device 120a.

Due to the relative positions of the hands of the user 160a and 160b and the mobile devices 120a and 120b, the right-handed user 160b may affect the mobile device 120a in a different manner than the left-handed user 160a. For example, an antenna 245 (FIG. 2) in the mobile device 120b may be tuned or detuned by the positioning and/or orientation of a nearby hand. As described in greater detail below with respect to FIGS. 9A-9F, the mobile devices 120 can be configured to detect whether the users 120 are holding the mobile devices 120a-120d in a left or right hand. Moreover, the mobile devices 120a-120d can be configured to detect a particular manner in which the users 160a-160d are holding the mobile devices 120a-120d, or whether the mobile devices 120a-120d are being held at all. In an embodiment, mobile devices 120a and 120b may be configured to predictively tune the antenna 245 (FIG. 2) based, for example, on a detected grip type.

The mobile devices 120a-120d can be placed on a surface such as a table, desk, or counter. For example, the mobile device 120c is on a table 170. The mobile devices 120a-120d can be placed in an enclosed space such as a drawer, purse, pocket, or protective case. For example, the mobile device 120d is in a box 180. Objects near the mobile devices, including the users 160a-160c, the table 170, and the box 180, can include one or more materials, each of which can have a specific dielectric constant, and may affect radio waves via any of electromagnetic coupling, reflection, refraction, diffraction, absorption, polarization and scattering.

In an embodiment, the mobile devices 120a-120d can detect one or more characteristics of one or more nearby objects 160a-160d, 170 and/or 180 such as, for example, its dielectric constant and position relative to the mobile device 120a-120d. In an embodiment, the mobile device 120a-120d can predict how the objects 160a-160d, 170 and/or 180 will affect the mobile device 120a-120d. The mobile device 120a-120d can analyze the one or more detected characteristics to determine whether the nearby objects 160a-160d, 170, and/or 180 are human or likely to be human.

For example, the mobile devices 120a and 120b can determine that detected objects are human users 160a and 160b, for example, based on their dielectric constant and/or changes in their capacitance over time. The mobile devices 120a and 120b may be configured to adjust (for example, by reducing) a radio transmission power based, for example, on the detected dielectric constant. The mobile devices 120a and 120b may be configured to predictively tune an antenna 245 (FIG. 2) based, for example, on the detected dielectric constant. In particular, the mobile devices 120a and 120b can use open-loop tuning. In some embodiments, the mobile devices 120a and 120b can use closed-loop tuning.

The mobile device 120b may determine that the user 160b is not between the mobile device 120b and an antenna of the base station 110. Accordingly, the mobile device 120b may cause a steerable antenna 245 (FIG. 2) to radiate towards the base station 110. On the other hand, the mobile device 120a may determine that the user 160a is between the mobile device 120a and the base station 110. Accordingly, the mobile device 120a may cause the steerable antenna 245 to radiate omnidirectionally, isotropically, or in another direction. For example, the mobile device 120a may connect to a second antenna of the base station 110, and may cause the antenna 245 to radiate towards the second network antenna.

On the other hand, the mobile devices 120c and 120d can determine that the nearby objects 170 and 180 are not likely to be human, for example, based on their dielectric constant and/or changes in their capacitance over time. The mobile devices 120c and 120d may be configured to adjust (for example, by increasing or decreasing) a radio transmission power based, for example, on the detected dielectric constant. In an embodiment, the mobile devices 120c and 120d may be configured to adjust the radio transmission power based on a network command based on the detected environment characteristic. The mobile devices 120c and 120d may be configured to predictively tune an antenna 245 (FIG. 2) based, for example, on the detected dielectric constant.

The environment around the mobile devices 120 may change over time. For example, the user 160c may place the mobile device 120a on the table 170, and may carry away the mobile device 120c. Likewise, the user 160c may approach the mobile device 120c, and the user 160c may move away from the mobile device 120c. The user 160b may bring the mobile device 120b to his ear from a starting position at arm's length.

The mobile devices 120a-120d may be configured to detect a characteristic of the nearby objects 160a-160d, 170, and/or 180 as they move relative to those objects. For example, the mobile device 120b can be configured to detect a dielectric constant of the head of the user 160b head as the user 160b brings the mobile device 120b to his ear. As another example, the mobile device 120c can be configured to detect a dielectric constant of the table 170 as the user 160c moves the mobile device 120c away from the table.

As described in greater detail described herein, the mobile devices 120a-120d can be configured to detect one or more characteristics of their environment. For example, the mobile devices 120a-120d can be configured to detect one or more environmental characteristics such as, without limitation, one or more of an object's capacitance, dielectric constant, type of material, conductivity, conductivity classification (i.e., conductive or not conductive), solidity, aliveness, location, distance, and orientation (including, for example, whether the mobile device 120a-120d is being held in a hand, whether the hand is a left-hand or right-hand, ambient light, SSIDs present, time of day, day of week, duration of stay, and/or how the hand is gripping the mobile device 120a-120d). The mobile devices 120a-120d can be configured to detect changes to the foregoing characteristics over time. The mobile devices 120a-120d can be configured to correlate two or more characteristics. For example, the mobile device 120a-120d can be configured to correlate a particular dielectric constant with a type of material and to further correlate the detection of that material with one or more changes to the status of the mobile device. As another example, the mobile devices 120a-120d can be configured to correlate a particular degree of solidity vs. fluidity with aliveness. In various embodiments, the mobile devices 120a-120d can be configured to create a lookup table and/or database with any number of cross-correlations and/or heuristics for determining any environmental characteristic. In some embodiments, the mobile devices 120a-120d can be configured with one or more classification algorithms, such as a Naïve Bayesian classification algorithm for determining correlation between an observed characteristic of the environment and one or more changes to the status/characteristic of the mobile device.

Moreover, the mobile devices 120a-120d can be configured to adjust one or more characteristics of the mobile device 120a-120d based, at least in part, on the detected and/or correlated environmental characteristics. Characteristics of the mobile device can include one or more of an antenna tuning, an antenna direction, a transmit power, a receiver state, a radio frequency, a transmission encoding, a content of data transmission, a power state, a display state, a display content, a vibration, an audio signal, data stored in a memory, internal signaling, and any other state, configuration, and/or adjustment of any component or element of the mobile device 120a-120d. By way of non-limiting example, the mobile device 120a can detect a dielectric constant of the user 160a, and can determine that the user 160a is likely to be human based on a lookup table. In some cases, the mobile device 120a can observe a dielectric constant in the environment, and use a classification algorithm such as the Naïve Bayesian classifier to determine that the observed dielectric constant is likely to be human. Based on the determination, the mobile device 120a can reduce a transmit power.

Although the mobile devices 120a-120d are described herein as wireless devices, certain systems, methods, and apparatuses described herein can be used with non-wireless devices. Moreover, the certain systems methods, and apparatuses described herein can be used with devices not designed to be moved. A person having ordinary skill in the art will appreciate that the environment detection described herein can be used with any suitable device.

FIG. 2 is a block diagram of a mobile device 120, which can be employed in the wireless communication system 100 of FIG. 1. The mobile device 120 includes a processor 215, a memory 220, a user interface 225, an accelerometer 227, a radio subsystem 230, a transmitter 235, a receiver 240, an antenna controller 240, an antenna 245, an environment sense controller 250, one or more sensors 255, and a bus 260. In an embodiment, the antenna controller 240 and the antenna 245 can be combined in an antenna module 265.

Many mobile devices include additional functions and interfaces not shown. For example, a mobile phone may include a mobile phone front-end receiver module that allows connectivity to a cellular network such as a GSM, EDGE, or 3G network, a display, a keyboard, headphones, speakers, microphones, multiple accelerometers, temperature sensors, pressure sensors, infrared sensors, a power management system, a camera, an audio/video/image codec and player, and the like. Other interfaces such as WLAN, BLUETOOTH™, GPS, USB, HDMI, and the like, not shown in FIG. 2, may also be present. In some embodiments, one or more of the components can be combined or commonly implemented, and each component can be implemented using one or more separate elements.

The processor 215 serves to control operation of the mobile device 120. In some embodiments, the processor 215 can include one or more processing elements such as, for example, central processing units (CPUs), digital signal processors (DSPs), application-specific integrated circuits (ASICs), field-programmable gate arrays (FPGAs), etc. The processor 215 can read instructions and data from the memory 220, and can write data to the memory 220. In an embodiment, the processor 215 can execute instructions that cause the mobile device to perform one or more methods described herein.

The memory 220 serves to store instructions and data for use by at least the processor 215. In various embodiments, other components of the mobile device 120 can directly access the memory 220 such as by, for example, a direct memory access (DMA) architecture via the bus 260. The memory 220 can include one or more of read-only memory (ROM) and random access memory (RAM), and non-volatile random access memory (NVRAM). In various embodiments, the memory 220 can include removable or fixed machine-readable media such as, for example, a hard disk, flash memory, CD-ROM, etc.

The user interface 225 serves to receive human input and provide human-perceivable output. In various embodiments, the user interface 225 can include one or more buttons, lights, microphones, speakers, cameras, displays, heat sensors, touch sensors, proximity sensors, vibration modules, etc. For example, the user interface 225 can include a resistive or capacitive touchscreen display, a keyboard and/or a voice command system.

The accelerometer serves to detect acceleration along one or more axes. In an embodiment, the accelerometer can include one or more gyroscopic sensors such as, for example, a Hall Effect sensor. The accelerometer can include one or more magnetic sensors such as, for example, an electronic compass. In an embodiment, the accelerometer can include an ADXL345, ADXL346, or ADXL362 3-axis digital accelerometer, sold by Analog Devices, Inc., of Norwood, Mass.

The radio subsystem 230 serves to provide radio communication in conjunction with the transmitter 235 and the receiver 240, which facilitate transmission and reception of data, respectively. The radio subsystem 230 can include, for example, a cellular subsystem configured to provide cellular communication between the mobile device 120 and the base station 110. In an embodiment, the radio subsystem 230 can include a WI-FI™ subsystem, a BLUETOOTH™ subsystem, a GPS subsystem, an AM subsystem, and FM subsystem, a ZIGBEE™ system, etc.

The transmitter 235 and the receiver 240 are configured to transmit and receive data via the antenna 245, which can be controlled by the antenna controller 240. In various embodiments, the mobile device 120 can include a plurality of antennas, a plurality of transmitters, and/or a plurality of receivers. The antenna 245 can include a steerable antenna such as, for example, a phased array or smart antenna configured for one or more of electronically steerable directionality, beamforming, multiple-input and multiple-output (MIMO) communication, space-time coding, and the like. The antenna 245 can be a tunable antenna.

The antenna controller 240 serves to electronically control the antenna 245, according at least in part to one or more instructions from the processor 215, the radio subsystem 230, and/or the environment sense controller 250. For example, the antenna controller 240 can electronically steer the antenna 245 based on sensor readings and/or calculation at the environment sense controller 250. The antenna controller 240 can be configured to perform active impedance matching for the antenna 245. The antenna controller 240 can be configured to tune the antenna 245 based on an external command, for example, from the processor 215.

In an embodiment, the antenna 245 and the antenna controller 240 can be combined in the antenna module 265. In an embodiment, the antenna module 265 can include an integrated adaptive antenna solution such as, for example, the EtherSmart LTE 1.0™ antenna module sold by Ethertronics Inc. of San Diego, Calif. In an embodiment, the antenna module 265 can include the EtherBook LTE 1.0™ antenna module sold by Ethertronics Inc. of San Diego, Calif.

The environment sense controller 250 serves to read environmental information from the one or more sensors 255. In an embodiment, the environmental information can be derived, at least in part, from one or more capacitive readings. In an embodiment, the environment sense controller 250 can be configured to independently perform one or more readings, and computations on the readings. The readings and/or derivations of the readings may be referred to as observed capacitances. The environment sense controller 250 can be configured to perform the readings and/or computations in response to one or more detected environmental changes. Based on the observed capacitances, the environment sense controller 250 may be configured with a classification algorithm, such as a Naïve Bayesian classifier to process one or more observed capacitances to determine one or more characteristics of the environment.

In various embodiments, the environment sense controller 250 can provide the readings and/or computation results to the processor 215, the radio subsystem 230, and/or the memory 220. The environment sense controller 250 can be configured to provide one or more control signals to the antenna controller 240 based on the readings and/or computation results.

The environment sense controller 250 can be a proximity detection module for use in applications such as tablet PCs, cell phones, and other portable devices. For example, the environment sense controller 250 can include a capacitive sensor with sub-fF resolution, and integrated temperature compensation abilities, thereby enabling more reliable proximity detection in handheld devices. The environment sense controller 250 can include an integrated capacitance-to-digital converter (CDC) with on-chip environmental calibration. The CDC can be capable of sensing changes in the capacitance of sensors 255 and registering a sensor activation. The environment sense controller 250 can be configured for use with single or multiple electrode capacitance sensors, mutual capacitance or self capacitance sensors. The environment sense controller 250 can include an active shield output to reduce noise pickup in the sensor 255 and to control the directional sensitivity of the capacitive measurement. The environment sense controller 250 can include on-chip calibration logic to compensate for changes in the ambient environment. The environment sense controller 250 can perform a calibration sequence automatically and at continuous intervals when the sensors 255 are not activated. Accordingly, the environment sense controller 250 can reduce or eliminate false or non-registering sensor activations due to a changing environment. In an embodiment, the environment sense controller 250 can include the Cap-Touch™ programmable controller sold by Analog Devices, Inc., of Norwood, Mass.

The sensors 255 serve to detect a characteristic of the environment around the mobile device 120. For example, the sensors 255 can include electrodes configured to facilitate capacitive readings. As discussed below with respect to FIGS. 4A-B, the sensors 255 can include an electrode on a single or multiple-layer printed circuit board (PCB), a flex circuit, printed carbon, and/or any other single or multiple layer conductor-insulator stack. In various embodiments, the sensors 255 can include photo-diodes, thermal sensors, etc. The sensors 255 can connect to the environment sense controller 250 via a shielded trace, wire, cable, optical link, and/or wireless link.

The bus 260 serves to provide communication between the various components of the mobile device 120. In various embodiments, the bus 260 can include one or more data lines, power lines, control lines, status lines, etc. Additionally, or alternatively, the various components of the mobile device 120 can be connected by another mechanism such as, for example, individual end-to-end links, a hierarchical or switched network, etc. Although various connections are illustrated in FIG. 2, a person skilled in the art will understand that other arrangements are possible, and any component may be connected to any other component.

Figure 3:
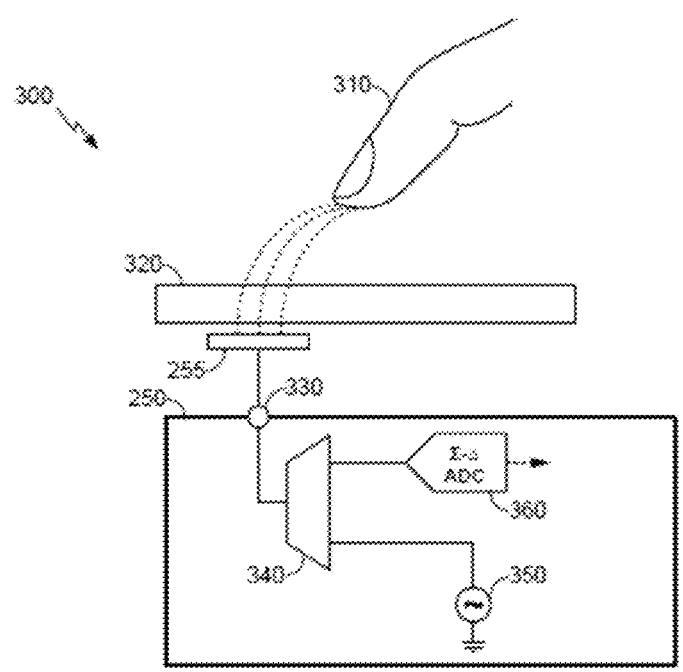
FIG. 3 is a schematic diagram of an environment sense system, according to an embodiment.

FIG. 3 is a schematic diagram of an environment sense system 300, according to an embodiment. In an embodiment, the environment sense system 300 can be employed in the wireless communication system 100, discussed above with respect to FIG. 1. In an embodiment, the environment sense system 300 can be implemented, at least in part, by one or more components of the mobile device 120, discussed above with respect to FIGS. 1 and 2. The environment sense system 300 can serve to sense one or more characteristics of the environment around the mobile device 120. For example, the environment sense system 300 can be configured to detect the proximity of a finger or other object 310.

In the illustrated embodiment, the environment sense system 300 includes the environment sense controller 250, at least one sensor 255, and a dielectric 320. In an embodiment, the dielectric 320 can include at least part of a housing (not shown) of the mobile device 120 (FIG. 2). In an embodiment, the dielectric 320 can include a plastic cover.

As shown in FIG. 3, the environment sense controller 250 includes at least a measurement pin 330, a switch matrix 340, an excitation source 350, and a sigma-delta ($\Sigma$-$\Delta$) analog-to-digital converter (ADC) 360. In various embodiments, the environment sense controller 250 can include additional components not shown, and may omit one or more components shown. For example, the environment sense controller 250 can implement a successive approximation register (ADC) architecture instead of, or in addition to, the $\Sigma$-$\Delta$ architecture. In various embodiments where the $\Sigma$-$\Delta$ ADC 360 is configured to read and convert capacitive measurements, the $\Sigma$-$\Delta$ ADC 360 can be referred to as a capacitance-to-digital converter (CDC) or a $\Sigma$-$\Delta$ CDC.

The measurement pin 330 serves to connect the sensor 255 to the environment sense controller 250. Although one measurement pin 330 is shown, the environment sense controller 250 can include additional pins 330. Each pin 330 can be connected to a separate sensor 255, a shield trace, a reference voltage, etc. In an embodiment, the environment sense controller 250 can include 13 pins 330. Accordingly, in an embodiment, the environment sense controller 250 can interface with up to 13 sensors 255.

Figure 7:
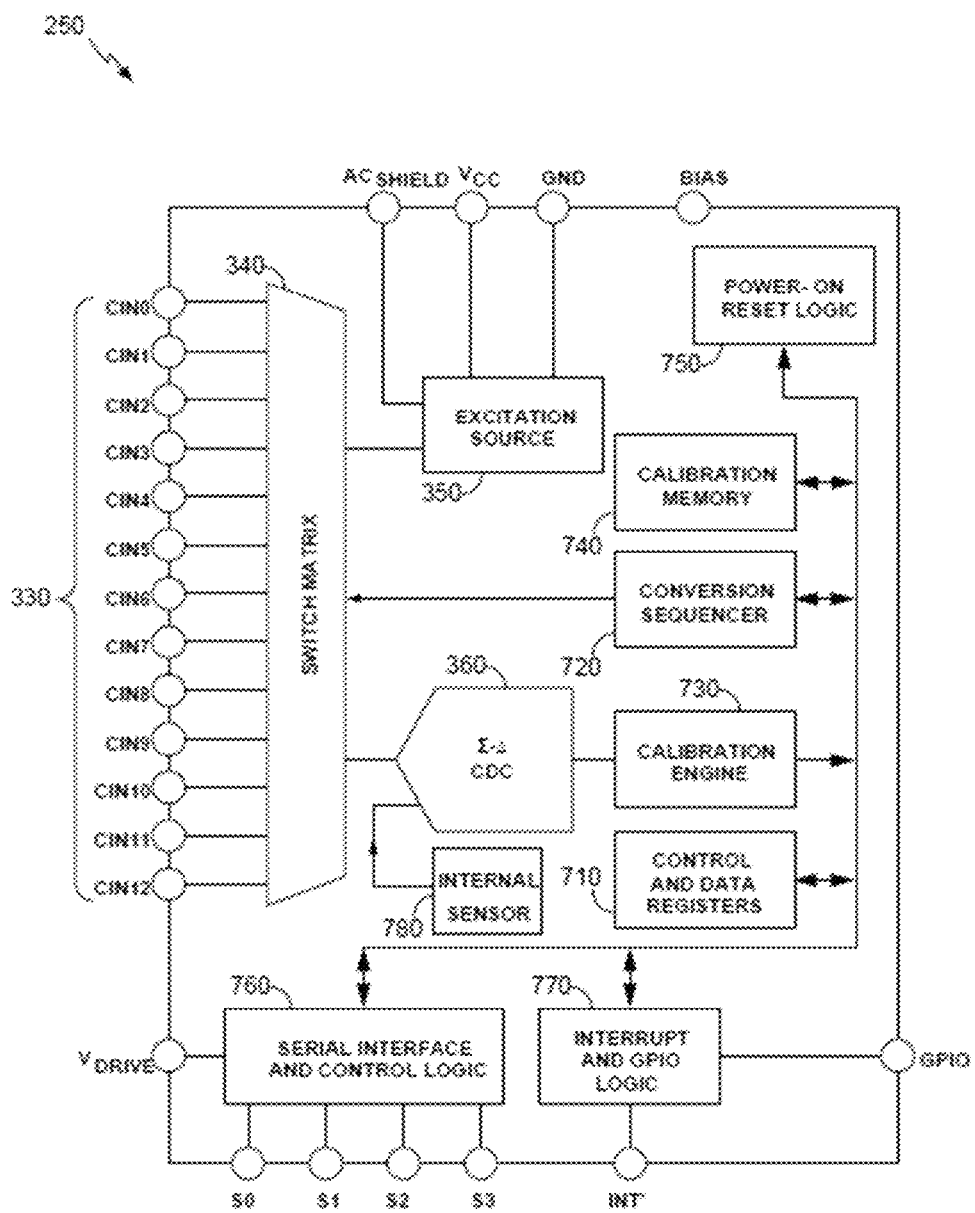
FIG. 7 is a schematic view of the environment sense controller of FIGS. 2 and 3, according to an embodiment.

The switch matrix 340 serves to selectively route the measurement pin 330 to the $\Sigma$-$\Delta$ ADC 360 and the excitation source 350. As will be discussed in greater detail below with respect to FIG. 7, the switch matrix 340 can be configured to route any set of input sensors 255 by programming one or more on-chip registers 710 (FIG. 7). The registers can also be programmed to control functions such as averaging, offsets, and gains for each of the sensors 255. An on-conversion sequencer 720 (FIG. 7) can control how each of the capacitance inputs is polled.

In the illustrated embodiment, the environment sense controller 250 is configured to measure capacitance readings from the sensor 255. As discussed below with respect to FIGS. 4A-B, the sensors 255 can include a single electrode on a single- or multiple-layer printed circuit board (PCB)), flex circuit, and/or printed conductor. In the environment sense system 300, the sensor electrode on the PCB comprises one plate of a virtual capacitor. The other plate of the capacitor is provided by an external object 310, such as a user's finger, which is grounded with respect to the sensor input.

The excitation source 350 serves to output an excitation signal to the pin 330. In an embodiment, the excitation signal is 250 kHz. Accordingly, when the switch matrix 340 connects the excitation source 350 to the pin 330, the excitation signal charges the plate of the capacitor formed by the sensor 255. When the object 310 comes close to the sensor, the virtual capacitor is formed, with the object 310 acting as the second capacitor plate.

The $\Sigma$-$\Delta$ ADC 360 serves to change a capacitive input signal into a digital value sample. Accordingly, when the switch matrix 340 connects the $\Sigma$-$\Delta$ ADC 360 to the pin 330, the $\Sigma$-$\Delta$ ADC 360 digitizes the virtual capacitance formed by the sensor 255 and the object 310, based on the charge at the sensor 255. In an embodiment, the $\Sigma$-$\Delta$ ADC 360 can be a 16-bit modulator. Accordingly, the $\Sigma$-$\Delta$ ADC 360 can be configured to output a 16-bit data stream. In an embodiment, the $\Sigma$-$\Delta$ ADC 360 can include a differential amplifier (not shown). Accordingly, the $\Sigma$-$\Delta$ ADC 360 can be configured with a positive and a negative input. The switch matrix 340 can be configured to route any set of input sensors 255, the internal sensor 780, or any other signal or node, to either the positive and/or the negative input of the $\Sigma$-$\Delta$ ADC 360.

In an embodiment, the excitation source 350, in conjunction with the switch matrix 340, is configured to apply a square wave excitation to the pin 330. The $\Sigma$-$\Delta$ ADC 360 is configured to sample the charge at the pin 330. The output of the $\Sigma$-$\Delta$ ADC 360 can be further processed via a digital filter (not shown), and the resulting digital data can be stored in a register (not shown).

In an embodiment, when the object 310 approaches the sensor 255, the environment sense controller 250 can measure a change in the total capacitance associated with that sensor 255. For example, if the change in total capacitance exceeds a threshold, the environment sense controller 250 can interpret the change as a sensor "activation." The environment sense controller 250 can include one or more threshold limits to determine when a sensor activation occurs.

Figure 4A:
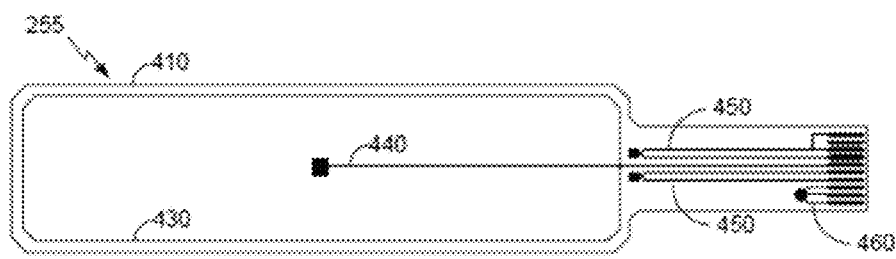
FIGS. 4A-4B show an exemplary sensor that can be employed in the environment sense system of FIG. 3.
Figure 4B:
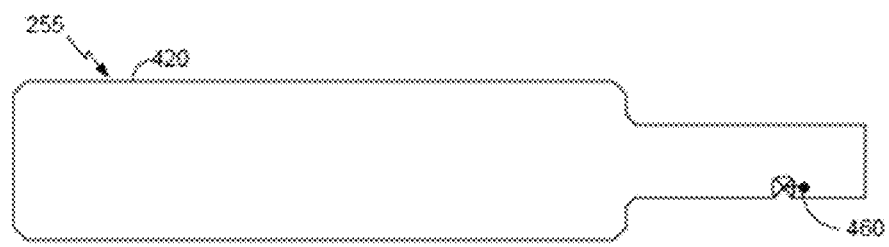

FIGS. 4A-4B show an exemplary sensor 255 that can be employed in the environment sense system 300 of FIG. 3. The illustrated sensor 255 includes two PCB layers. FIG. 4A shows a top layer 410 of the sensor 255, according to an embodiment. FIG. 4B shows a bottom layer 420 of the sensor 255, according to an embodiment.

In the illustrated embodiment of FIG. 4A, the top layer 410 of the sensor 255 includes a sensor plate 430, such as copper, signal trace 440, one or more shield traces 450, and one or more second layer plane traces 460. The signal trace 440 contacts the sensor plate 430, and runs from the sensor 255 to a measurement pin 330 (FIG. 3) of the environment sense controller 250 (FIGS. 2-3). The shield traces 450 and/or second layer plane traces 460 can also connect to other measurement pins 330 of the environment sense controller 250, can be grounded, or can be connected to a bias voltage. In an embodiment, the traces 440, 450, and 460 can be connected as shown below in FIG. 8.

In the illustrated embodiment of FIG. 4B, the bottom layer 420 of the sensor 255 forms a second layer plane. The second layer plane extends under the entire sensor plate 430. The bottom layer 420 can connect, via the second layer plane traces 460, to a measurement pin 330 of the environment sense controller 250, can be grounded, or can be connected to a bias voltage. In general, a sensor with a larger area provides a larger electrical field with which the user can interact and, therefore, provides a greater response when activated.

With reference to FIGS. 4A-4B, the sensor 255 can include any PCB material suitable for capacitance sensor design. In an embodiment, the sensor can be manufactured using industry-standard techniques. The sensor 255 can include one or more of FR4, flexible printed circuit (FPC), polyethylene terephthalate (PET), glass, etc. In various embodiments, the sensor plate 430 and/or the bottom layer 420 can include one or more of copper, indium tin oxide (ITO), silver, and carbon.

In an embodiment, one or more of the traces 440, 450, and 460 has a width of about 0.1-0.3 mm such as about 0.2 mm. In an embodiment, one or more of the traces 440, 450, and 460 has a minimum clearance between traces of 0.15 mm. In an embodiment, one or more of the traces 440, 450, and 460 has a length less than 10 cm. In an embodiment, the sensor plate 430 can have a length (laterally in FIG. 4A) of about 5-15 mm such as about 10 mm. In an embodiment, the sensor plate 430 can have a width of about 1-4 mm such as about 2 mm.

FIGS. 5A-5D are schematic diagrams showing exemplary sensor placements within the mobile device 120 of FIG. 2, according to various embodiments. As shown in FIGS. 5A-5D, the mobile device 120 includes the environment sense controller 250, described above with respect to FIGS. 2-3, and two or more sensors 255. Although various numbers of sensors 255, and configurations thereof, are shown, a person having ordinary skill in the art will appreciate that other numbers of sensors can be used, and the sensors 255 can be placed in additional configurations not shown. In the illustrated embodiments of FIGS. 5A-5D, the sensors 255 are vertically oriented, with the sensor plates 430 (FIG. 4A) parallel to left and right faces 521 and 522 of the mobile device 120. In various embodiments, the sensors 255 can have mixed orientations, and have orientations other than the illustrated vertical and horizontal orientations.

Multiple sensors 255 may be distributed around a device, for example, to provide greater granularity and increase signal to noise ratio. In an embodiment, the processor 215 (FIG. 2) can average the readings of multiple sensors 255 that are configured to sense the same surface. The processor 215 can determine that one or more sensors 255 are configured to sense the same surface, for example, by comparing time averaged magnitudes from each sensor 255. The processor 215 can time-average the readings of each sensor 255, for example, to reduce potential amplitude variations introduced by various parasitic stimulus sources.

FIG. 5A is a schematic plan view of an embodiment of the mobile device 120 with two sensors 255: a left sensor 255a, and a right sensor 255b. The left sensor 255a can be located on a left side of the mobile device 120, facing the left face 521 of the mobile device 120. The right sensor 255b can be located on a right side of the mobile device 120, facing the right face 522 of the mobile device 120. The left and right sensors 255a and 255b can be at a position along the left and right faces 521 and 522, respectively, approximately one-third to one-half (such as one-quarter) of the way from a bottom face 524 to a top face 525. As discussed above with respect to FIGS. 4A-4B, the sensors 255a and 255b can have a length in the x-direction of about 5-15 mm and a width in the z-direction (FIG. 5D) of about 1-3 mm.

FIG. 5B is a top view of an embodiment of the mobile device 120 with two sensors 255: the left sensor 255a, and the right sensor 255b. The left sensor 255a can be located on a left side of the mobile device 120, facing the left face 521 of the mobile device 120. The right sensor 255b can be located on a right side of the mobile device 120, facing the right face 522 of the mobile device 120. The left and right sensors 255a and 255b can be at a position along the left and right faces 521 and 522, respectively, substantially extending from a bottom face 524 to a top face 525. As discussed above with respect to FIGS. 4A-B, the sensors 255a and 255b can have a width of about 1-3 mm. The sensors 255a and 255b can have a length of about 70-90% of height of the mobile device 120 such as, for example, about 70-100 mm.

FIG. 5C is a schematic plan view of an embodiment of the mobile device 120 with three sensors 255: the left sensor 255a, the right sensor 255b, and a top sensor 255c. The left sensor 255a can be located on a left side of the mobile device 120, facing the left face 521 of the mobile device 120. The right sensor 255b can be located on a right side of the mobile device 120, facing the right face 522 of the mobile device 120. The top sensor 255c can be located on a top side of the mobile device 120, facing the top face 525 of the mobile device 120. The left and right sensors 255a and 255b can be at a position along the left and right faces 521 and 522, respectively, approximately centered between the bottom face 524 to a top face 525. The top sensor 255c can be at a position along the top face 525, approximately halfway between the left face 521 and the right face 522. As discussed above with respect to FIGS. 4A-B, the sensors 255a, 255b, and 255c can have a length of about 5-15 mm and a width of about 1-3 mm. In various embodiments, the sensors 255a, 255b, and 255c can have a length of between approximately 5 mm and approximately 100 mm.

FIG. 5D is a schematic end view of the embodiment of the mobile devices 120 shown in FIGS. 5-5C. As shown, the left and right sensors 255a and 255b can be at a position along the left and right faces 521 and 522, respectively, approximately centered between a back face 526 and a front face 527.

FIGS. 6A-6D are schematic diagrams showing exemplary horizontal sensor placements within the mobile device 120 of FIG. 2, according to various embodiments. As shown in FIGS. 6A-D, the mobile device 120 includes the environment sense controller 250, described above with respect to FIGS. 2-3, and two or more sensors 255. Although various numbers of sensors 255, and configurations thereof, are shown, a person having ordinary skill in the art will appreciate that any number of sensors can be used, and the sensors 255 can be placed in additional configurations not shown. In the illustrated embodiments of FIGS. 6A-6D, the sensors 255 are horizontally oriented, with the sensor plates 430 (FIG. 4A) parallel to front and back faces 527 and 526 (FIG. 6D) of the mobile device 120.

FIG. 6A is a schematic plan view of an embodiment of the mobile device 120 with two sensors 255: the left sensor 255a, and the right sensor 255b. The left sensor 255a can be located on a left side of the mobile device 120, facing the back face 526 of the mobile device 120. The right sensor 255b can be located on a right side of the mobile device 120, facing the back face 526 of the mobile device 120. The left and right sensors 255a and 255b can be at a position along (e.g., within about 0-1.5 mm of) the left and right faces 521 and 522, respectively, and proximate (e.g., within about 0-1.5 mm) one of the front and back faces 527 and 526. As discussed above with respect to FIGS. 4A-B, the sensors 255a and 255b can have a length in the x-direction of about 5-15 mm and a width in the y-direction (FIG. 6D) of about 1-3 mm.

FIG. 6B is a schematic plan view of an embodiment of the mobile device 120 with two sensors 255: the left sensor 255a, and the right sensor 255b. The left sensor 255a can be located on a left side of the mobile device 120, facing the back face 526 of the mobile device 120. The right sensor 255b can be located on a right side of the mobile device 120, facing the back face 526 of the mobile device 120. The left and right sensors 255a and 255b can be at a position along the left and right faces 521 and 522, respectively, extending from the bottom face 524 to the top face 525. As discussed above with respect to FIGS. 4A-B, the sensors 255a and 255b can have a width of about 1-3 mm. The sensors 255a and 255b can have a length approximately equal to about 70-99% of a length of the mobile device 120 such as, for example, approximately 70-100 mm.

FIG. 6C is a schematic plan view of an embodiment of the mobile device 120 with three sensors 255: the left sensor 255a, the right sensor 255b, and a top sensor 255c. The left sensor 255a can be located on a left side of the mobile device 120, facing the back face 526 of the mobile device 120. The right sensor 255b can be located on a right side of the mobile device 120, facing the back face 526 of the mobile device 120. The top sensor 255c can be located on (e.g., within about 0-1.5 mm) a top side of the mobile device 120, facing the back face 526 of the mobile device 120. The left and right sensors 255a and 255b can be at a position along the left and right faces 521 and 522, respectively, approximately centered between the bottom face 524 to a top face 525. The top sensor 255c can be at a position along the top face 525, approximately centered between the left face 521 and the right face 522. As discussed above with respect to FIGS. 4A-4B, the sensors 255a, 255b, and 255c can have a length of 5-10 mm and a width of 1-3 mm. In various embodiments, the sensors 255a, 255b, and 255c can have a length of between approximately 5 mm and approximately 100 mm.

FIG. 6D is a schematic end view of the embodiment of the mobile device 120 shown in FIG. 6A. As shown, the left and right sensors 255a and 255b can be at a position along the left and right faces 521 and 522, respectively, substantially against (e.g., within about 0-1.5 mm) of the back face 526. In an embodiment, one or more sensors 255 can be substantially against (e.g., within about 0-1.5 mm) of the front face 527.

In various embodiments, the sensors 255 can be located within the mobile device 120 such that there is an air gap between the sensor 255 and the housing of the mobile device 120. The air gap can be relatively small, for example, smaller than a dimension of the sensor 255. In an embodiment, the sensor 255 can be attached to, be placed nearby, or embedded in the internal surfaces of the mobile device's 120 housing material. In some embodiments, there may be no air gap.

In one embodiment, the sensor 255 can be attached using Adhesive Transfer Tape 467MP (double-sided tape), sold by 3M Company of St. Paul, Minn., or similar. In an embodiment, the mobile device 120 can include a housing material having a thickness between 1 mm and 2 mm. In an embodiment, the dielectric constant of the housing material affects the sensitivity of the sensors 255. For example, the higher the dielectric constant of the covering material, the greater the magnitude response can be from the sensors 255. For embodiments of the mobile device 120 that include a metal chassis, the sensors 255 may be located without constraint, and can include appropriate shielding in accordance with application requirements.

FIG. 7 is a schematic view of the environment sense controller 250 of FIGS. 2 and 3, according to an embodiment. As described above, with respect to FIG. 3, the environment sense controller 250 includes measurement pins 330 corresponding to a plurality capacitance measurement inputs CIN0-CIN12 (13 shown), the switch matrix 340, the excitation source 350, and the sigma-delta ($\Sigma$-$\Delta$) analog-to-digital converter (ADC) 360. In the illustrated embodiment, the environment sense controller further includes control and data registers 710, a conversion sequencer 720, a calibration engine 730, calibration memory 740, power-on reset logic 750, serial interface and control logic 760, interrupt and general-purpose input/output (GPIO) logic 770, an internal sensor 780, and a plurality of additional input/output pins, illustrated as $AC_{SHIELD}$, $V_{CC}$, $V_{DRIVE}$, GND, BIAS, S0-S3, INT', and GPIO. In various embodiments, the environment sense controller 250 can include additional components not shown, and may omit one or more components shown.

As described above with respect to FIG. 3, the capacitance measurement inputs 330 serve to connect one or more sensors 255 (FIGS. 2-6D) to the environment sense controller 250. Each of the capacitance measurement inputs 330 can be connected to a separate sensor 255, a shield trace, a reference voltage, etc. The illustrated environment sense controller 250 can interface with up to 13 sensors 255.

As described above with respect to FIG. 3, the switch matrix 340 serves to selectively route the measurement pin 330 to the $\Sigma$-$\Delta$ ADC 360 and the excitation source 350. Each input pin 330 can be tied to either a negative or positive input on the $\Sigma$-$\Delta$ ADC 360, can be left floating, and can be internally connected to the pin BIAS to reduce cross-coupling. In an embodiment, unconnected pins of the plurality of pins 330 measurement can be connected to the pin BIAS.

Moreover, each input connection or pin 330 from the external capacitance sensors 255 (FIGS. 2-6D) to the $\Sigma$-$\Delta$ ADC 360 of the environment sense controller 250 can be uniquely configured by using stage configuration registers in the control and data registers 810. The stage configuration registers can be used to configure the input pin 330 connection setups, sensor offsets, sensor sensitivities, and sensor limits. Multiple configurations can be stored in the control and data registers 710. In an embodiment, each configuration can be referred to as a stage. Rules for data handling for each sensor 255 can be individually configured in each stage. For example, a sensor 255 can have different sensitivity and offset values in two different stages.

As described above with respect to FIG. 3, the excitation source 350 serves to output an excitation signal to one or more of the measurement pins 330, according to the configuration of the switch matrix 340. In an embodiment, the excitation signal is at 250 kHz.

As described above with respect to FIG. 3, the $\Sigma$-$\Delta$ ADC 360 serves to change a capacitive input signal into a digital value sample. In an embodiment, the $\Sigma$-$\Delta$ ADC 360 implements a $\Sigma$-$\Delta$ architecture with 16-bit resolution. The switch matrix 340 can connect any of the measurement input pins 330 to the $\Sigma$-$\Delta$ ADC 360. The $\Sigma$-$\Delta$ ADC 360 can operate at a sampling frequency of 250 kHz.

The control and data registers 710 can control the decimation rate, or oversampling ratio, of the $\Sigma$-$\Delta$ ADC 360. In an embodiment, the $\Sigma$-$\Delta$ ADC 360 can be configured for a decimation rate, or oversampling ratio, of 64, 128, or 256, with an output period of 0.768 ms, 1.536 ms, or 3.072 ms, respectively. The $\Sigma$-$\Delta$ ADC 360 can employ an averaging decimation process, wherein the $\Sigma$-$\Delta$ ADC 360 takes a number of samples and outputs an averaged result.

The decimation process can reduce the amount of noise present in the final $\Sigma$-$\Delta$ADC 360 result. However, the higher the decimation rate, the lower the output rate per stage. Accordingly, there is a trade-off possible between the amount of noise in the $\Sigma$-$\Delta$ ADC 360 output and the speed of sampling.

In an embodiment, the environment sense controller 250 can include two programmable digital to analog converters (DACs) (not shown). The DACs can compensate for any parasitic capacitances included in the $\Sigma$-$\Delta$ ADC 360 measurement. Offsets can be caused by, for example, stray capacitance to ground. As discussed in greater detail herein, the DACs can subtract a capacitance of a housing of the mobile device 120.

The control and data registers 710 can serve to store preferences and configurations used to control one or more of the switch matrix 340, the Σ-Δ ADC 360, the conversion sequencer 720, the calibration engine 730, the power-on reset logic 750, the serial interface and control logic 760, the interrupt and GPIO logic, 770, etc. In various embodiments, the control and data registers 710 can be organized into one or more register banks, and individual registers and/or sets of registers can be implemented separately. In various embodiments, the control and data registers 710 can include one or more of read-only memory (ROM), random access memory (RAM), and non-volatile random access memory (NVRAM).

The conversion sequencer 720 serves to implement conversion control for the input channels corresponding to the measurement pins 330. In an embodiment, up to 12 conversion configurations and calculations, or stages, can be performed in one sequence. For example, each of the 12 conversion stages can measure the input from a different sensor 255 (FIGS. 2-6D). The control and data registers 710 can store unique configurations for each stage and can support multiple capacitance sensor 255 interface requirements. For example, a slider sensor can be assigned to a first subset of stages, and a button sensor can be assigned to a second subset of stages. For each conversion stage, the switch matrix 340 that selectively connects the inputs CIN0-CIN12 to the converter can have a unique setting.

The calibration engine 730 serves to automatically adjust one or more aspects of the environment sense controller 250, to environmental conditions that have an effect on the ambient levels of the sensors 255 (FIGS. 2-4). In various embodiments, the output levels of the capacitance sensors 255 can be sensitive to temperature, humidity, and, in some cases, solid contaminants. The calibration engine 730 can provide enhanced reliability of sensor 255 performance by continuously, periodically, and/or intermittently monitoring Σ-Δ ADC 360 ambient levels and compensating for any environmental changes by adjusting one or more threshold sensitivity values in the control and data registers 710. As referred to herein, the Σ-Δ ADC 360 ambient level is defined as the output level of the capacitance sensor 255 during periods when a measurement target is not approaching or in contact with the sensor 255.

After the environment sense controller 250 is initially configured, the calibration engine 730 can run compensation logic automatically with each conversion at the Σ-Δ ADC 360, when a measurement target is not approaching or in contact with the sensor 255 (FIGS. 2-6D). Accordingly, the calibration engine 730 can compensate for rapidly changing environmental conditions. In an embodiment, the control and data registers 710 can include ambient compensation control registers configured to provide the calibration engine 730 with access to general setup and controls for the compensation algorithm.

By way of example, an uncalibrated capacitance sensor 255 (FIGS. 2-6D) can create sensor detection errors when the ambient levels drift over time due to changing environmental condition. Environmental conditions can change when, for example, the mobile device 120 (FIGS. 1-2) is moved from one location to another, placed on a different surface, picked up, etc. Without calibration, initial threshold levels may remain constant while the ambient levels drift upward or downward. Accordingly, without calibration, the environment sense controller 250 may fail to detect, for example, a user contact.

In an embodiment, the calibration engine 730 can execute an adaptive calibration configured to reduce or prevent the sensor detection errors described above. The calibration engine 730 can monitor the Σ-Δ ADC 360 ambient levels and adjust one or more parameters in the control and data registers 710. Exemplary parameters include conversion offsets, sensitivity thresholds, and the like. In an embodiment, the calibration engine 730 can continuously, periodically, or intermittently monitor the output levels of each sensor 255 (FIGS. 2-6D), and can automatically rescale threshold levels in proportion to the sensor area covered by a detected object. As a result, the calibration engine 730 can maintain threshold and sensitivity levels for all users regardless of, for example, the size of their finger (see object 310 of FIG. 3). As referred to herein, the threshold level can be referenced from the ambient level, and can be defined as the Σ-Δ ADC 360 output level that must be exceeded before a valid sensor contact can be registered. The sensitivity level can be defined as how sensitive the sensor 255 must be before a valid contact can be registered.

In an embodiment, the calibration engine 730 can track the average maximum and minimum values measured from each sensor 255 (FIGS. 2-6D). The average maximum and minimum values can provide an indication of how the user is interacting with the sensor 255. A large object 310 (FIG. 3) can cause relatively large average maximum or minimum values, whereas a small finger 310 can cause relatively smaller values. When the average maximum or minimum value changes, the calibration engine 730 can rescale the threshold levels as appropriate for the current environment. The adaptive calibration can include a closed-loop to enhance the reliability and repeatable operation of every sensor 255 connected to the environment sense controller 250, even when subject to dynamic environmental conditions.

The calibration memory 740 serves to store compensation data for each conversion stage, as well as setup information specific for each stage. In an embodiment, the calibration engine 730 can be configured to write the compensation data and/or setup information to the calibration memory 740. In an embodiment, the calibration memory 740 can include one or more of read-only memory (ROM) random access memory (RAM), and non-volatile random access memory (NVRAM).

The power-on reset logic 750 serves to control power and reset behavior of the environment sense controller 250. For example, environment sense controller 250 can have three operating modes. In a full power mode, the environment sense controller 250 can remain fully powered. The full power mode can be suited for applications where power is not a concern (for example, mobile devices configured with an AC power supply). In a low power mode the environment sense controller 250 can automatically power down when no sensor 255 (FIGS. 2-6D) is active. The low power mode can provide power savings compared with full power mode, and can be suited for mobile applications, where power is limited. In a shutdown mode, the environment sense controller 250 can shut down completely.

In an embodiment of the full power mode, all sections of the environment sense controller 250 remain fully powered and converting at all times. While a sensor 255 (FIGS. 2-6D) is activated (for example, by being touched or approached by an object 310 as in FIG. 3), the Σ-Δ ADC 360 can process the sensor data. When no sensor 255 is activated (for example, not touched or approached), the calibration engine 730 can measure the ambient capacitance level and perform compensation. In full power mode, the Σ-Δ ADC 360 can be configured to convert at a constant rate.

In an embodiment of the low power mode, the environment sense controller 250 remains in a reduced power state while no sensor 255 (FIGS. 2-6D) is activated. In the reduced power state, for example, the Σ-Δ ADC 360 can reduce its conversion frequency, thereby reducing its power consumption. The Σ-Δ ADC 360 can perform a conversion after a preset or adjustable delay, and the calibration engine 730 and power-on reset logic 750 can use the conversion result to update compensation parameters and determine whether the sensors 255 are active. In an embodiment, the variable delay can be in the range of about 100 ms to 1 s, such as one of 200 ms, 400 ms, 600 ms, and 800 ms. In an embodiment, the delay before the environment sense controller 250 transitions from the full power mode to the low power mode, after the sensor 255 is no longer activated, is configurable.

The serial interface and control logic 760 serves to provide serial communication between the environment sense controller 250 and another device. For example, the environment sense controller 250 can use the serial interface and control logic 760 to transfer conversion results to the processor 215 (FIG. 2). In the illustrated embodiment, the serial interface and control logic 760 uses the pins $V_{DRIVE}$, and S0-S3. In an embodiment, the serial interface and control logic 760 can implement an industry standard, such as the 2-wire I²C serial interface protocol, serial peripheral interface (SPI), RFEE, or any other serial or parallel interface. For example, the environment sense controller 250 can operate as a slave device on the bus 260 (FIG. 2), which can include an I²C serial bus. Accordingly, the pins S0-S3 can correspond to I²C signals SDA, SCLK, and address select pins ADD0, and ADD1, respectively.

The pin $V_{DRIVE}$ serves to provide a supply voltage for one or more pins associated with the serial interface such as, for example, S0-S3, INT', and GPIO. In an embodiment, the pin $V_{DRIVE}$ can allow the environment sense controller 250 to interface directly with other devices that have a supply voltage less than a minimum operating voltage of the environment sense controller 250, without external level-shifters. In an embodiment, the pin $V_{DRIVE}$ can be connected to arbitrarily low voltage supplies and as high as VCC. For example, the pin $V_{DRIVE}$ can be above 1.65 V.

The interrupt and GPIO logic 770 serves to provide general-purpose input, output, and interrupt capabilities to the environment sense controller 250. The GPIO pin can be configured as an input or an output, and can be disabled (for example, set to high-impedance). In an embodiment, the control and data registers 710 can store the configuration of the GPIO pin. When the pin GPIO is configured as an output, the voltage level on the pin can be set to either a low level or a high level. Moreover, the pin GPIO can be configured as active high or active low, as well as either edge triggered or level triggered.

The pin INT' serves to provide an interrupt output that can be connected to another device. For example, the environment sense controller 250 can use the pin INT' to notify the processor 215 (FIG. 2) that an interrupt event has occurred. In an embodiment, the environment sense controller 250 can be configured for three types of interrupt events: a conversion-complete interrupt, a sensor-touch interrupt, and a GPIO interrupt. Each interrupt can include one or more enable and status registers, for example, in the control and data registers 710. The conversion-complete and sensor-touch (sensor-activation) interrupts can be enabled on a per-conversion-stage basis.

During a conversion-complete interrupt, the INT' signal can assert low to indicate the completion of a Σ-Δ ADC 360 conversion stage and that new conversion result data is available in the control and data registers 710. The conversion-complete interrupt can be independently enabled for each conversion stage. During a sensor-active interrupt, the INT' signal can assert when the environment sense controller 250 detects that a sensor 255 (FIGS. 2-6D) is activated (for example, by being touched or approached) and again when the sensor 255 is no longer activated. When the GPIO pin is configured as an input, the pin INT' can be controlled by the GPIO pin.

The internal sensor 780 serves to compensate for internal changes on the environment sense controller 250. In an embodiment, the internal sensor 780 can provide a temperature measurement as a capacitance value. The Σ-Δ ADC 360 can measure the capacitance value provided by the internal sensor 780, and can subtract the capacitance of the internal sensors 780 from the capacitance of an external sensor 255 (FIGS. 2-6D), thereby mitigating the effect of internal temperature drift on the sensor 255. In an embodiment, the Σ-Δ ADC 360 can perform the subtraction by connecting the external sensor 255 to the positive terminal of the Σ-Δ ADC 360, and connecting the internal sensor 780 to the negative terminal. Configured in this manner, the Σ-Δ ADC 360 result can reduce or eliminate the effect of temperature changes on the internal circuitry of the environment sense controller 250.

In an embodiment, measuring the capacitance from the internal sensor 780 can cause input paths to both Σ-Δ ADC 360 terminals to be matched. Accordingly, power supply rejection of the Σ-Δ ADC 360 can be improved. Moreover, any drift due to temperature may not affect the Σ-Δ ADC 360 result, because the internal sensor 780 can counteract the drift.

The pin BIAS serves to provide a bias reference to the environment sense controller 250. In an embodiment, the pin BIAS is connected internally to a bias node (not shown) of the environment sense controller 250. In an embodiment, a 100 nF capacitor can be connected between the pin BIAS and ground. The bias node can be configured such that the voltage at the pin BIAS is half of $V_{CC}$.

The pin $AC_{SHIELD}$ serves to reduce or eliminate capacitance-to-ground pickup. Because the environment sense controller 250 can be configured to measure the capacitance between one or more of the measurement pins 330 and ground, any capacitance to ground on the signal path between the measurement pins 330 and the sensors 255 (FIGS. 2-6D) can be included in the Σ-Δ ADC 360 conversion result. Accordingly, to reduce stray capacitance to ground, the $AC_{SHIELD}$ signal can be used to shield the connection between the sensor 255 and the measurement pin 330. The plane around the sensors can also be connected to the pin $AC_{SHIELD}$.

In an embodiment, the $AC_{SHIELD}$ output is the same signal waveform as the excitation signal. Therefore, there is little or no AC current between one or more excited pins CIN and $AC_{SHIELD}$, and any capacitance between these pins may not affect charge transfer. In an embodiment, the sensors 255 can be located less than 10 cm from the environment sense controller 250. The environment sense controller 250 can be placed on a separate PCB from that of the sensors 255. In some embodiments implementing proximity detection applications, the pin $AC_{SHIELD}$ may not be used. Instead, in some embodiments, the internal bias node (which can be connected to the pin BIAS) can be connected to any shield layers or traces, using the switch matrix 340.

In an embodiment, the environment sense controller 250 can be configured to perform wake-up proximity detection.

This feature can provide the ability to detect when a user or other object is approaching a mobile device 120. For example, the Σ-Δ ADC 360 can continuously, periodically, and/or intermittently monitor all capacitance sensors 255 (FIGS. 2-6D) for first-order proximity detection. In an embodiment, the first-order proximity can be determined by a fast filter in conjunction with one or comparators configured to detect when a user or other object is approaching or leaving a sensor, and/or when an object hovers over a sensor or approaches a sensor very slowly. When the Σ-Δ ADC 360 detects first-order proximity detection, the calibration engine 730 can cease calibration measurements, and the Σ-Δ ADC 360 can be automatically configured into a more aggressive mode to detect a valid sensor activation (for example, a second-order detection).

In certain situations, when an object hovers over a sensor 255 (FIGS. 2-6D) for a long time, the Σ-Δ ADC 360 can detect first-order proximity for a long period. The calibration engine 730 can suspend environmental calibration while proximity is detected, but changes may still occur to the ambient capacitance level during the proximity event. Accordingly, the ambient value stored in the calibration memory 740 may no longer represent the actual ambient value. In this case, even when the object is not in close proximity to the sensor 255, the Σ-Δ ADC 360 may continue to detect first-order proximity due to a lack of calibration. For example, user interaction can create moisture on the sensor 255, causing the new sensor ambient value to be different from the expected value. In an embodiment, the calibration engine 730 can automatically force a recalibration internally, for example when the Σ-Δ ADC 360 detects first-order proximity for an amount of time surpassing a recalibration timeout. Accordingly, the ambient values can be recalibrated, regardless of how long the object over the sensor 255. A recalibration can increase environment sense controller 250 performance.

In an embodiment, the calibration engine 730 recalibrates automatically when the measured Σ-Δ ADC 360 value exceeds the stored ambient value by an preset or adjustable recalibration threshold for a set period of time, referred to herein as the recalibration timeout. In an embodiment, the recalibration timeout can be based on the recalibration threshold. For example, the recalibration timeout can be the recalibration threshold multiplied by the time for one conversion sequence.

Figure 8A:
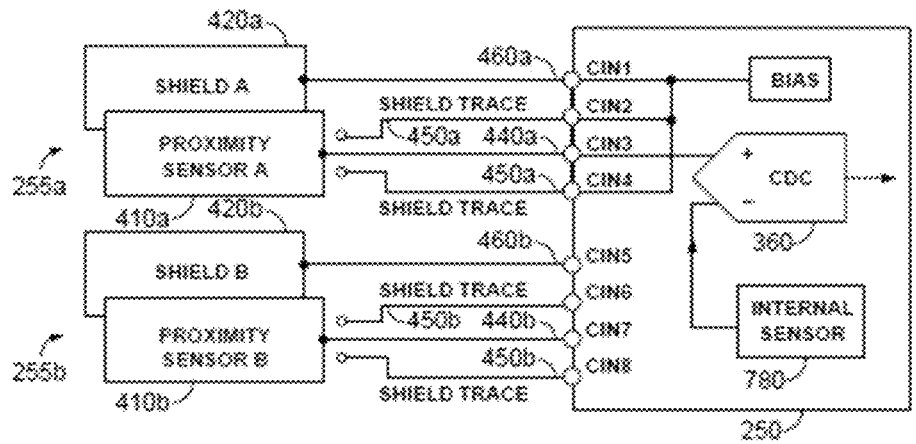
FIGS. 8A-C show exemplary configurations of sensors and the environment sense controller of FIG. 2, according to various embodiments.
Figure 8B:
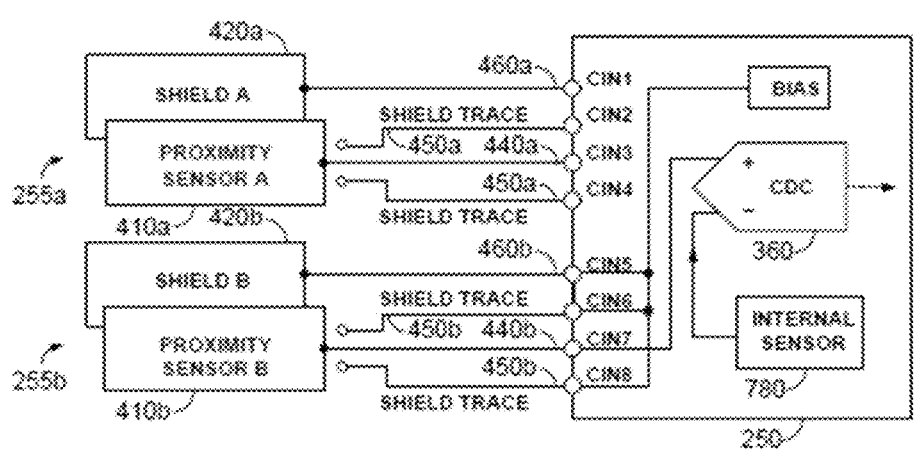
Figure 8C:
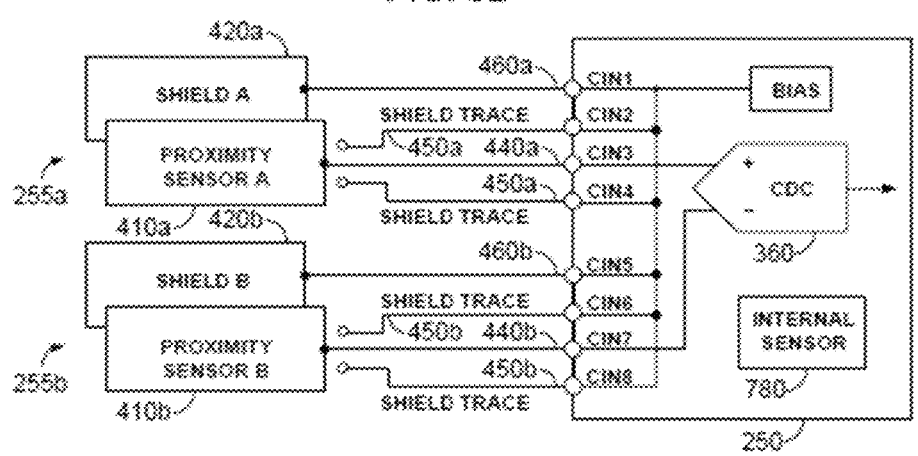

FIGS. 8A-C show exemplary configurations of sensors 255 and the environment sense controller 250 of FIG. 2, according to various embodiments. As discussed above with respect to FIG. 7, the conversion sequencer 720 can configure the switch matrix 340 in a plurality of routing configurations at different times. In various embodiments, the conversion sequencer 720 can change the configurations among the configurations shown in FIGS. 8A-C, or any other configuration.

FIG. 8A shows the environment sense controller 250 configured to measure the capacitance at the left sensor 255a (see also FIGS. 4A-4B). The left sensor 255a includes a sensor 410a and a shield 420a. The sensor 410a is connected to the pin CIN3 via the signal line 440a. The switch matrix 340 (FIG. 7) is configured to route the pin CIN3 to the positive terminal of the differential amplifier front-end to the Σ-Δ ADC 360. The signal line 440a is shielded by the shield traces 450a, which are connected to the pins CIN2 and CIN4. The switch matrix 340 is configured to route the pins CIN2 and CIN4 to the BIAS node, which can be connected to the pin BIAS (FIG. 7). The shield 420a is connected to the pin CIN1 via the second-layer plane trace 460a. The switch matrix 340 (FIG. 7) is configured to route the pin CIN1 to the BIAS node. The switch matrix 340 is configured to connect the internal sensor 780 to the negative terminal of the differential amplifier front-end to the Σ-Δ ADC 360.

FIG. 8B shows the environment sense controller 250 configured to measure the capacitance at the right sensor 255b. The right sensor 255b includes a sensor 410b and a shield 420b. The sensor 410b is connected to the pin CIN7 via the signal line 440b. The switch matrix 340 (FIG. 7) is configured to route the pin CIN7 to the positive terminal of the differential amplifier front-end to the Σ-Δ ADC 360. The signal line 440b is shielded by the shield traces 450b, which are connected to the pins CIN6 and CIN8. The switch matrix 340 is configured to route the pins CIN6 and CIN8 to the BIAS node, which can be connected to the pin BIAS (FIG. 7). The shield 420b is connected to the pin CIN5 via the second-layer plane trace 460b. The switch matrix 340 (FIG. 7) is configured to route the pin CIN5 to the BIAS node. The switch matrix 340 (FIG. 7) is configured to connect the internal sensor 780 to the negative terminal of the differential amplifier front-end to the Σ-Δ ADC 360.

FIG. 8C shows the environment sense controller 250 configured to measure the differential capacitance between the left sensor 255a and the right sensor 255b. The left and right sensors 255a and 255b are connected to the pins CIN1-CIN8, as described above with respect to FIGS. 8A-B. In the illustrated embodiment of FIG. 8C, the switch matrix 340 (FIG. 7) is configured to route the pin CIN3 to the positive terminal of the differential amplifier front-end to the Σ-Δ ADC 360. The switch matrix 340 (FIG. 7) is configured to route the pin CIN7 to the negative terminal of the differential amplifier front-end to the Σ-Δ ADC 360. The switch matrix 340 (FIG. 7) is configured to route the pins CIN2, CIN4, CINE, and CIN8 to the BIAS node, which can be connected to the pin BIAS (FIG. 7).

Grip Detection

As described above with respect to FIG. 1, the mobile device 120 can be configured to detect whether the mobile device 120 is being held in a hand, whether the hand is a left-hand or right-hand, and/or how the hand is gripping the mobile device 120. In an embodiment, the mobile device 120 can determine one or more of the foregoing environmental characteristics based on, for example, readings from one or more of the sensors 255 (FIG. 2). Particularly, the processor 215 (FIG. 2) can configure the environment sense controller 250 (FIG. 2) to perform one or more environmental measurements using at least one sensor 255. The processor 215 can determine a spatial relationship between the mobile device 120 and material adjacent to the mobile device based on the measurements. The spatial relationship can include a type of grip, such as those discussed herein with respect to FIGS. 9A-9F. The processor 215 can compare the measurements to one or more reference measurements, for example, via a lookup table, in order to determine a type of grip. In some embodiments, the processor 215 can process the measurements (e.g., observed capacitance(s)) using a classification algorithm such as a Naïve Bayesian classifier to determine the corresponding type of grip.

In various embodiments, the sensors 255 can be configured as shown and described above with respect to FIGS. 5A-6D. Other configurations may be used, including any combination of sensors 255 in various orientations. For example, it may be desirable for the mobile device 120 to include at least one sensor 255 substantially parallel to and proximate one or more housing features by which a user may hold the mobile device 120.

In one embodiment, the environment sense controller 250 can perform three different measurements using the left sensor 255a and the right sensor 255b (see FIGS. 5A-6D). In an embodiment, the processor 215 can configure the conversion sequencer 720 (FIG. 7) of the environment sense controller 250 to perform the three measurements in succession. In various embodiments, the measurements can be performed in any order, additional measurements may be included, and some measurements can be omitted.

The first measurement can be a differential capacitance measurement between the left sensor 255a and the right sensor 255b. In an embodiment, in a first conversion stage, the conversion sequencer 720 (FIG. 7) can configure the switch matrix 340 to route the environment sense controller according to FIG. 8C. As shown in FIG. 8C, the left sensor 255a is connected to the positive input of the $\Sigma$-$\Delta$ ADC 360, and the right sensor 255b is connected to the negative input of the $\Sigma$-$\Delta$ ADC 360. In another embodiment, the left and right inputs can be reversed. The $\Sigma$-$\Delta$ ADC 360 can measure the differential capacitance between the left sensor 255a and the right sensor 255b. In various embodiments, the $\Sigma$-$\Delta$ ADC 360 can store the result in a memory, or the processor 215 (FIG. 2) can retrieve the result from the environment sense controller 250, for example, via the serial interface 760 (FIG. 7).

The second measurement can be a single-ended capacitance measurement of the left sensor 255a. In an embodiment, in a second conversion stage, the conversion sequencer 720 (FIG. 7) can configure the switch matrix 340 to route the environment sense controller according to FIG. 8A. As shown in FIG. 8A, the left sensor 255a is connected to the positive input of the $\Sigma$-$\Delta$ ADC 360, and the internal sensor 780 is connected to the negative input of the $\Sigma$-$\Delta$ ADC 360. In various embodiments, the inputs can be reversed, or the internal sensor 780 can be disconnected, and the un-used input can be tied to GND, $V_{CC}$, BIAS, or another reference voltage. The $\Sigma$-$\Delta$ ADC 360 can measure the capacitance at the left sensor 255a. In various embodiments, the $\Sigma$-$\Delta$ ADC 360 can store the result in a memory, or the processor 215 (FIG. 2) can retrieve the result from the environment sense controller 250, for example, via the serial interface 760 (FIG. 7).

The third measurement can be a single-ended capacitance measurement of the right sensor 255b. In an embodiment, in a third conversion stage, the conversion sequencer 720 (FIG. 7) can configure the switch matrix 340 to route the environment sense controller according to FIG. 8B. As shown in FIG. 8B, the right sensor 255b is connected to the positive input of the $\Sigma$-$\Delta$ ADC 360, and the internal sensor 780 is connected to the negative input of the $\Sigma$-$\Delta$ADC 360. In various embodiments, the inputs can be reversed, or the internal sensor 780 can be disconnected, and the un-used input can be tied to GND, $V_{CC}$, BIAS, or another reference voltage. The $\Sigma$-$\Delta$ ADC 360 can measure the capacitance at the right sensor 255b. In various embodiments, the $\Sigma$-$\Delta$ ADC 360 can store the result in a memory, or the processor 215 (FIG. 2) can retrieve the result from the environment sense controller 250, for example, via the serial interface 760 (FIG. 7).

In embodiments where the mobile device 120 includes more than two sensors 255, the environment sense controller 250 can be configured to perform differential capacitance measurements between any combinations of two sensors 255 and/or single-ended capacitance measurements for any number of sensors 255. For example, in the three-sensor 255 embodiments shown in FIGS. 5C and 6C, the environment sense controller can be configured to perform differential capacitance measurements between one or more of the following pairs: the left sensor 255a and the top sensor 255c, the right sensor 255b and the top sensor 255c, and between the left sensor 255a and the right sensor 255b, in addition to single-ended capacitance measurements for any of the sensors 255a, 255b, and 255c. In an embodiment, one or more sensors (such as the sensor 255c) can be oriented so as to determine whether a screen of the device is facing towards or away from a user's palm.

Referring back to FIG. 2, after the environment sense controller 250 performs the three foregoing measurements, the interrupt and GPIO logic 770 (FIG. 7) can send an interrupt to the processor 215. The processor 215 can then retrieve the results from the environment sense controller 250. In an embodiment, the processor 215 can access a two-dimensional lookup table, which can be stored in the memory 220. On a first axis, the processor 215 can look up the magnitude of the differential capacitance measurement. On a second axis, the processor 215 can look up the sum of the two single-ended capacitance measurements. When indexing into the table, the processor 215 can choose the closest index value.

The intersection of the two indexed look-ups can contain information indicating a type of grip, which will be described below with respect to FIGS. 9A-9F. Alternatively or additionally, the look-up table can include a predicted antenna tuning corresponding to the measurements. Different grip positions can de-tune the antenna via mutual coupling between a hand and the antenna. A first set of measurements may indicate, for example, that a matching filter of the antenna 245 should be adjusted by a particular impedance value. The processor 215 (FIG. 2) can be configured to send a tuning adjustment to the antenna controller 240, which can be configured to retune the antenna based on the look-up table and/or the measurements.

The look-up table can be pre-populated based one or more of a mobile device 120 geometry, antenna 240 position, one or more calibration measurements, etc. In an embodiment, the processor 215 can receive tuning information from the antenna controller 240 and/or the radio subsystem 230, and can populate the look-up table based on the tuning information and one or more measurements by the environment sense controller 250. For example, the antenna 245 may be de-tuned despite the predictive re-tuning based on the look-up table. The processor 215 may adjust the look-up table to correct the disparity between the predicted amount of de-tuning indicated in the look-up table and the actual amount of de-tuning.

In various embodiments, the look-up table can include one or more dimensions. For example, the look-up table can include one dimension per measurement. The look-up table can include additional dimensions corresponding to one or more other characteristics of the mobile device 120 and/or sensor locations. The memory 220 can include multiple look-up tables. In other embodiments, the look-up table can be replaced with one or more alternative structures of machine learning including, but not limited to, decision tree learning, association rule learning, artificial neural networks, genetic programming, inductive logic programming, support vector machines, clustering, Bayesian networks, reinforcement learning, representation learning, and sparse dictionary learning.

FIGS. 9A-9F are schematic diagrams showing exemplary grips of the mobile device 120 of FIG. 5A, according to various embodiments, although the grip detection can be performed with any of a variety of sensor placements. Each grip can be associated with one or more antenna 245 tunings, game actions, transmission power settings, etc. Although FIGS. 9A-9F show left-handed grips, equivalent right-handed grips are mirror images. The grips shown in FIGS. 9A-9F are not intended to be exhaustive, and a person having ordinary skill in the art will appreciate that other grip configurations can be used in the context of this disclosure.

Figure 9A:
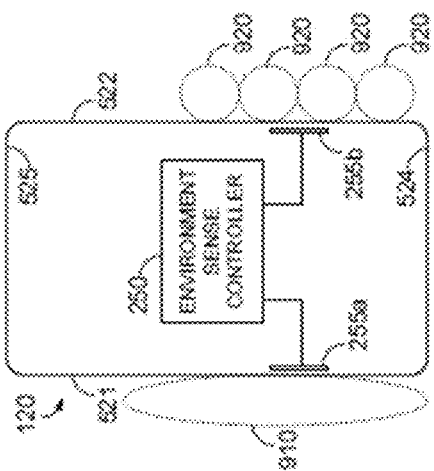
FIGS. 9A-9F are schematic diagrams showing exemplary grips of the mobile device of FIG. 5A, according to various embodiments.

FIG. 9A shows a first exemplary grip, referred to herein as a "palm grip," wherein a user grips the mobile device 120 between part of a palm 710 on the left side 521, and four digits 920 on the right side 522. When a user holds the mobile device in a palm grip, the environment sense controller 250 will likely record a differential capacitance measurement showing a value above or below the ambient capacitance value by a small amount. The environment sense controller 250 will likely record a left-side 521 single-ended capacitance measurement, from the left sensor 255*a*, showing a relatively large value. The environment sense controller 250 will likely record a right-side 522 single-ended capacitance measurement, from the right sensor 255*b*, showing a relatively large value. In the left-handed grip shown in FIG. 9A, the left-side 521 single-ended capacitance measurement will likely be larger than the right-side 522 single-ended capacitance measurement. In a right-handed grip (now shown), the left-side 521 single-ended capacitance measurement will likely be smaller than the right-side 522 single-ended capacitance measurement.

Figure 9B:
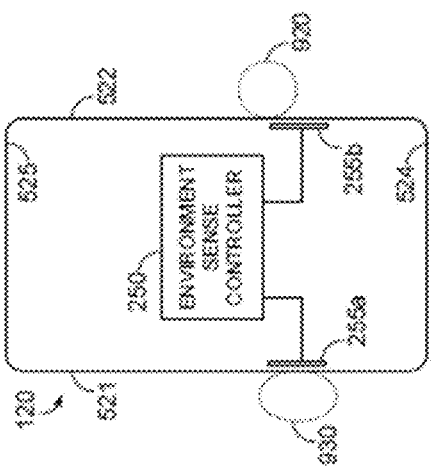

FIG. 9B shows a second exemplary grip, referred to herein as a "side pinch," wherein a user grips the mobile device 120 between a thumb 930 on the left side 521, and one digit 920 on the right side 522. When a user holds the mobile device in a side pinch, the environment sense controller 250 will likely record a differential capacitance measurement showing a value approximately the same as the ambient capacitance value. The environment sense controller 250 will likely record a left-side 521 single-ended capacitance measurement, from the left sensor 255*a*, showing a moderate to small value. The environment sense controller 250 will likely record a right-side 522 single-ended capacitance measurement, from the right sensor 255*b*, showing a moderate to small value. In the left-handed grip shown in FIG. 9B, the left-side 521 single-ended capacitance measurement will likely be larger than the right-side 522 single-ended capacitance measurement. In a right-handed grip (not shown), the left-side 521 single-ended capacitance measurement will likely be smaller than the right-side 522 single-ended capacitance measurement.

Figure 9C:
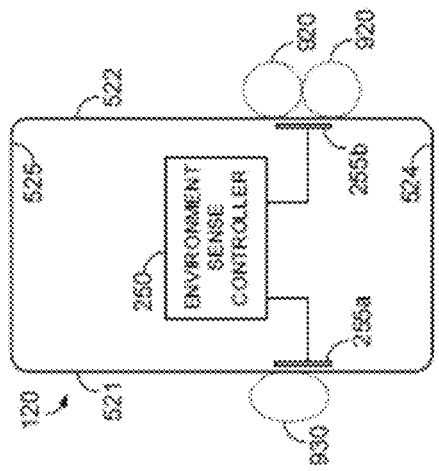

FIG. 9C shows a third exemplary grip, referred to herein as a "double pinch," wherein a user grips the mobile device 120 between a thumb 930 on the left side 521, and two digits 920 on the right side 522. When a user holds the mobile device in a double pinch, the environment sense controller 250 will likely record a differential capacitance measurement consistently favoring one side. In the left-handed grip shown in FIG. 9C, the differential capacitance measurement will likely favor the right sensor 255*b* due to the typical size of the two digits 920 compared to the typical size of the thumb 930. In a right-handed grip (not shown), the differential capacitance measurement will likely favor the left sensor 255*a*.

In the left-handed grip shown in FIG. 9C, the environment sense controller 250 will likely record a right-side 522 single-ended capacitance measurement, from the right sensor 255*b*, showing a moderate value. The environment sense controller 250 will likely record a left-side 521 single-ended capacitance measurement, from the left sensor 255*a*, showing a value that is slightly greater than half of the value measured from the right sensor 255*b*. In a right-handed grip (not shown), the single-ended capacitance measurements, from the left and right sensors 255*a* and 255*b*, will likely be reversed.

Figure 9D:
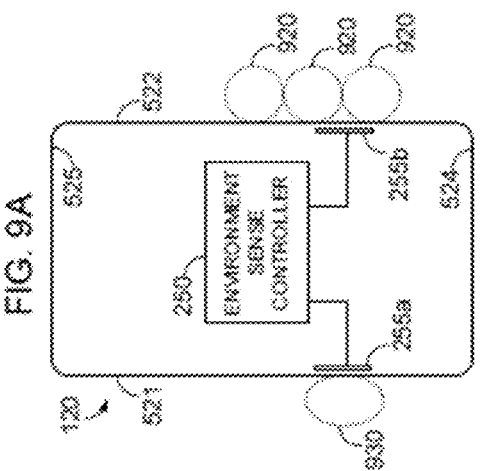

FIG. 9D shows a fourth exemplary grip, referred to herein as a "treble pinch," wherein a user grips the mobile device 120 between a thumb 930 on the left side 521, and three digits 920 on the right side 522. When a user holds the mobile device in a treble pinch, the environment sense controller 250 will likely record a differential capacitance measurement consistently favoring one side, with a higher magnitude than would be measured when the user holds the mobile device 120 in the double pinch, discussed above with respect to FIG. 9C. In the left-handed grip shown in FIG. 9C, the differential capacitance measurement will likely favor the right sensor 255*b* due to the typical size of the three digits 920 compared to the typical size of the thumb 930. In a right-handed grip (not shown), the differential capacitance measurement will likely favor the left sensor 255*a*.

In the left-handed grip shown in FIG. 9D, the environment sense controller 250 will likely record a right-side 522 single-ended capacitance measurement, from the right sensor 255*b*, showing a moderate value. The environment sense controller 250 will likely record a left-side 521 single-ended capacitance measurement, from the left sensor 255*a*, showing a value that is slightly greater than one-third of the value measured from the right sensor 255*b*. In a right-handed grip (not shown), the single-ended capacitance measurements, from the left and right sensors 255*a* and 255*b*, will likely be reversed.

Figure 9E:
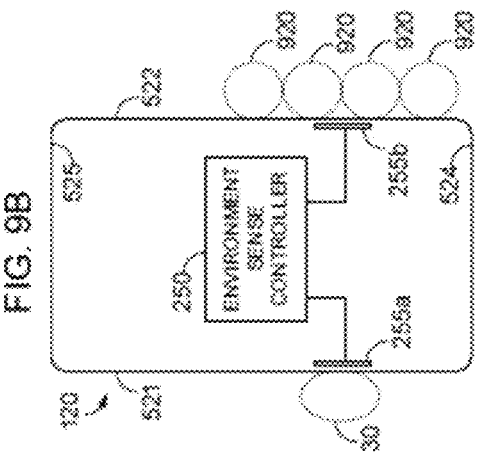

FIG. 9E shows a fifth exemplary grip, referred to herein as a "concave palm," wherein a user grips the mobile device 120 between a thumb 930 on the left side 521, and four digits 920 on the right side 522. When a user holds the mobile device in a concave palm, the environment sense controller 250 will likely record a large differential capacitance measurement showing a value consistently favoring one side, with a higher magnitude than would be measured when the user holds the mobile device 120 in the treble pinch, discussed above with respect to FIG. 9D. In the left handed grip shown in FIG. 9E, differential capacitance measurement will likely favor the right sensor 255*b* due to the typical size of the four digits 920 compared to the typical size of the thumb 930. For example, the environment sense controller 250 may record a left-side 521 single-ended capacitance measurement, from the left sensor 255*a*, showing a value that is slightly greater than one-fourth of the value measured from the right sensor 255*b*. In a right-handed grip (not-shown), the differential capacitance measurement will likely favor the left sensor 255*a*.

In the left-handed grip shown in FIG. 9E, the environment sense controller 250 will likely record a right-side 522 single-ended capacitance measurement, from the right sensor 255*b*, showing a relatively large value. The environment sense controller 250 will likely record a left-side 521 single-ended capacitance measurement, from the left sensor 255*a*, showing a moderate value. The single-ended capacitance measurements will be unbalanced, favoring either the left or right side. In a right-handed grip (not shown), the single-ended capacitance measurements, from the left and right sensors 255*a* and 255*b*, will likely be reversed.

Figure 9F:
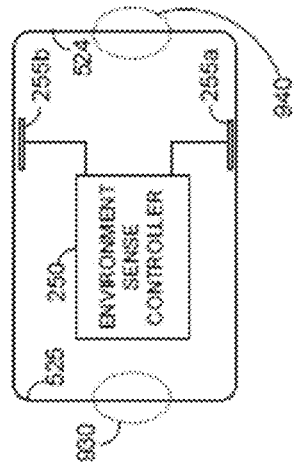

FIG. 9F shows a sixth exemplary grip, referred to herein as a "widescreen grip," wherein a user grips the mobile device 120 between a thumb 930 on the left side 521, and another thumb 940 on the right side 522. The thumbs 930 and 940 may overlap with the front of the mobile device 120, with an opposing digit 920 on the back side of the mobile device 120. When a user holds the mobile device in a widescreen grip, the environment sense controller 250 will likely record a differential capacitance measurement near the ambient capacitance value and relatively unstable. The environment sense controller 250 will likely record a right-side 522 single-ended capacitance measurement, from the right sensor 255b, showing a relatively small value. The environment sense controller 250 will likely record a left-side 521 single-ended capacitance measurement, from the left sensor 255a, showing a relatively small value. It will be understood that the numbers and sizes of digits, thumbs, and/or palms detected on either end may indicate a wide screen grip.

FIGS. 10A-10E are perspective views of the exemplary grips of FIGS. 9A-9E. FIGS. 10A-10E show the placements of the palm 910, digits 920, and thumb 930 on the mobile device 120, in various configurations. It will be understood that the locations of placements of the palm 910, digits 920, and thumb 930 are exemplary, and may vary within the scope of each grip description.

Figure 11:
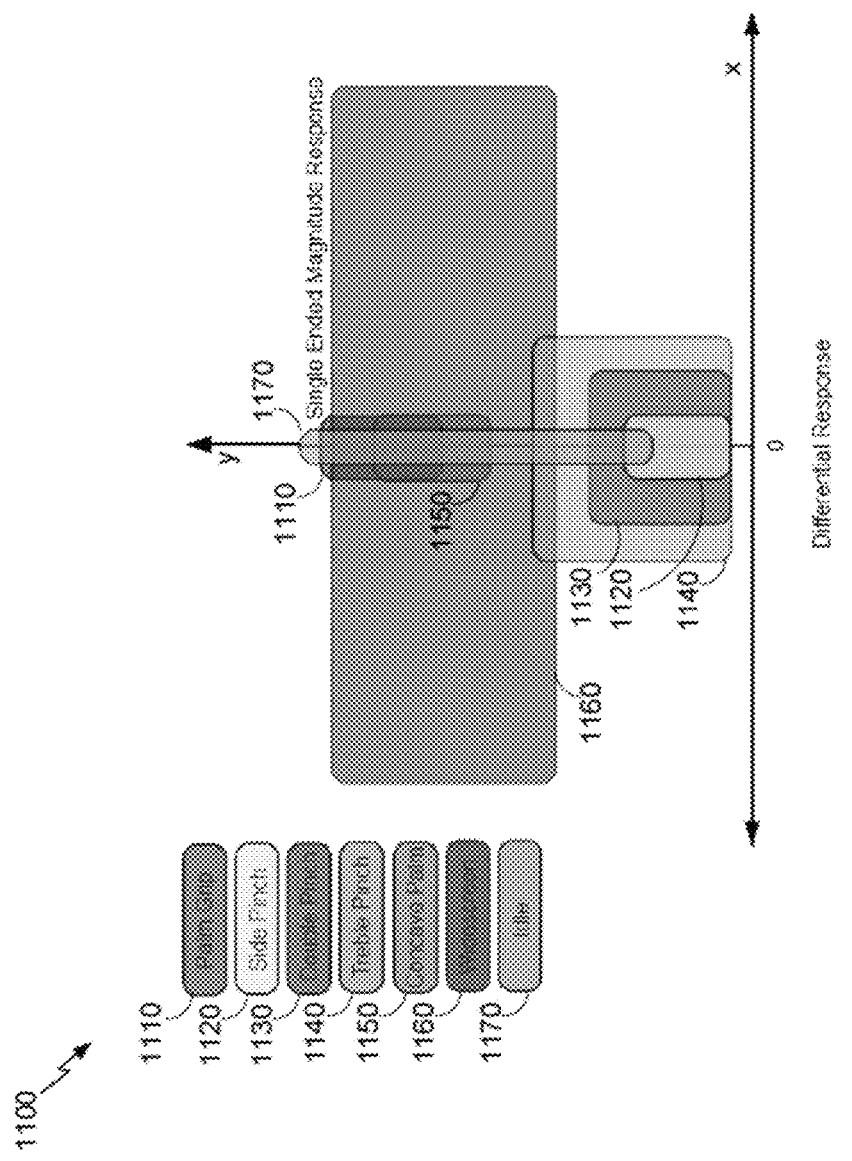
FIG. 11 is a chart showing relative differential and single-ended magnitude responses expected for each of the grips shown in FIGS. 9A-9F.

FIG. 11 is a chart 1100 showing relative differential and single-ended magnitude responses expected for each of the grips shown in FIGS. 9A-9F. The x-axis shows differential response, and the y-axis shows single-ended magnitude response. The shaded area 1110 corresponds to the range of likely differential and single-ended magnitude responses corresponding to the palm grip, described above with respect to FIGS. 9A and 10A.

Referring still to FIG. 11, the shaded area 1120 corresponds to the range of likely differential and single-ended magnitude responses corresponding to the side pinch, described above with respect to FIGS. 9B and 10B. The shaded area 1130 corresponds to the range of likely differential and single-ended magnitude responses corresponding to the double pinch, described above with respect to FIGS. 9C and 10C. The shaded area 1140 corresponds to the range of likely differential and single-ended magnitude responses corresponding to the treble pinch, described above with respect to FIGS. 9D and 10D.

Referring still to FIG. 11, the shaded area 1150 corresponds to the range of likely differential and single-ended magnitude responses corresponding to the concave palm, described above with respect to FIGS. 9E and 10E. The shaded area 1160 corresponds to the range of likely differential and single-ended magnitude responses corresponding to the widescreen grip, described above with respect to FIG. 9F. The shaded area 1170 corresponds to the range of likely differential and single-ended magnitude responses corresponding to an idle state, wherein the mobile device 120 (FIG. 2) may be resting on a flat surface.

Static Dielectric Detection

As described above with respect to FIG. 1, the mobile device 120 can be configured to detect one or more nearby objects 160a-160d, 170, and 180, and/or surfaces thereof. In an embodiment, the mobile device 120 can determine one or more characteristics based on the detection. For example, the mobile device 120 can determine one or more of type of a material, solidity, and being alive of a nearby object.

Referring back to FIG. 2, the mobile device 120 can detect a nearby surface based, for example, on readings from one or more of the sensors 255. Particularly, the processor 215 can configure the environment sense controller 250 to perform one or more environmental measurements using at least one sensor 255. The processor 215 can compare the measurements to one or more reference measurements, for example, via a lookup table and/or a classification algorithm, in order to determine a type of material.

In various embodiments, the sensors 255 (FIGS. 2-4) can be configured as shown and described above with respect to FIGS. 5A-6D. Other configurations may be used, including any combination of sensors 255 in various orientations. For example, it may be desirable for the mobile device 120 to include at least one sensor 255 substantially parallel to and proximate one or more housing faces upon which a user may set the mobile device 120. Although a particular embodiment is described herein with reference to the left sensor 255a (see FIGS. 5A-6D), other combinations of sensors 255 can be used. In an embodiment, the mobile device 120 can concurrently determine the dielectric constants (or any other characteristics, such as a conductivity classification) for a plurality of surfaces.

In an embodiment, the environment sense controller 250 (FIG. 7) can perform one or more capacitive measurements using the left sensor 255a. Particularly, the processor 215 (FIG. 2) can configure the conversion sequencer 720 (FIG. 7) to take continuous, periodic, or intermittent measurements using the $\Sigma$-$\Delta$ ADC 360. In embodiments using more than one sensor 255, the processor 215 can configure the conversion sequencer 720 to iterate through all the sensors 255 over time, for example, according to a round-robin sequence. In an embodiment, the processor 215 can determine an orientation of the mobile device 120 (for example, based on readings from the accelerometer 227), and can choose a subset of sensors 255 that are likely to be facing the surface to be measured. The processor 215 can choose the subset of sensors 255 based on information indicative of sensor 255 locations, which can be stored in the memory 220.

The conversion sequencer 720 (FIG. 7) can iterate through different sensor readings using, for example, the switch matrix 340, as described above with respect to FIG. 7. The processor 215 can read the measurement results from the environment sense controller 250 periodically or intermittently. For example, the processor 215 can read the measurement results after all conversion stages have completed. In an embodiment, the processor 215 can read the measurement results after each measurement, and can make periodic or intermittent measurement requests.

The processor 215 can store one or more measurement results in the memory 220. In an embodiment, the processor 215 can include one or more timestamps associated with the measurement results. The processor 215 can be configured to calculate one or more metrics on the measurement results such as, for example, an average, a weighted average, a moving average, a standard deviation, rate of change, direction of change, etc. The processor 215 can calculate the one or more metrics based on the X most recent measurement results, where X can be a preset or dynamically determined number. The processor 215 can calculate multiple sets of the metrics, based one or more subsets of recorded measurement results.

The processor 215 can determine a stability of the measurement results over time, based on one or more of the calculated metrics. In an embodiment, the processor 215 can compare a stability metric to a stability threshold. The stability threshold can be a preset or dynamically determined threshold indicating that the mobile device 120 is likely stationary with respect to a nearby surface. The stability threshold can be determined with respect to one or more calibration measurements and/or metrics.

If the stability metric is greater than the stability threshold, the processor 215 can determine that the mobile device 120 is likely stationary with respect to a nearby surface, and can proceed to determine the static dielectric constant of the surface. On the other hand, if the stability metric is not greater than the stability threshold, the processor 215 can determine that the mobile device 120 is not likely stationary with respect to a nearby surface, and may delay determining the static dielectric constant of the surface. In an embodiment, the processor 215 can use an accelerometer metric, as described below with respect to the section titled "Dynamic Dielectric Detection," in addition or as an alternative to the stability metric.

For example, the processor 215 can compare the standard deviation of the most recent 64 to 1024 measurements to the stability threshold. As another example, the processor 215 can compare the average of the most recent small number (e.g., 10) measurements to a stability threshold equal to the average of the most recent larger number (e.g., 1000) of measurements. As another example, the processor 215 can compare the slope of trend line of the most recent 100 measurements to a stability threshold indicating a threshold slope.

After determining the stability of the measurement results, the processor 215 can determine the dielectric constant of the nearby surface. In some embodiments, the processor 215 can determine the dielectric constant of the nearby surface only after the stability metric exceeds the stability threshold. In other embodiments, the processor 215 may not determine the stability metric, or may measure the dielectric constant of the nearby surface regardless of the determined stability.

The processor 215 can determine the presence of a conductor on a nearby surface (or a conductive surface) based on the one or more computed metrics. In general, the capacitance (C), the permittivity of free space ($\epsilon_0$), the dielectric constant or relative permittivity ($\epsilon_r$) of the surface, the area (A) of capacitive sensor, and the distance (d) between the sensor 255 and the surface, are related according to the parallel plate capacitor shown in Equation 1:

$$C = \frac{\epsilon_0 \cdot \epsilon_r \cdot A}{d} \quad (1)$$

Accordingly, the processor 215 can determine the dielectric constant of the surface when a conductor is present according to the rearranged Equation 2:

$$\epsilon_r = \frac{C \cdot d}{\epsilon_0 \cdot A} \quad (2)$$

In an embodiment, $\epsilon_0$, A, and d can be known calibration data. The processor 215 can retrieve the calibration data from the memory 220. Calibration data can include information indicating, for example, the location of each sensor 255 within a housing of the mobile device 120, the likely distance of each sensor 255 (through the housing) to a nearby surface in various device orientations, the area of each sensor 255, etc. For example, the likely distance of each sensor 255 can be calibrated based on an assumption that the housing of the mobile device 120 rests directly on the surface to be measured. In an embodiment, A, d, and $\epsilon_0$ can be included as a pre-calculated scale factor (k). Thus, in an embodiment, the processor 215 can determine the dielectric constant of the surface according to Equations 3 and 4:

$$k = \frac{d}{\epsilon_0 \cdot A} \quad (3)$$

$$\epsilon_r = C \cdot k \quad (4)$$

In some embodiments, the processor 215 can determine that the surface is conductive based on the determined dielectric constant, or based on a measurement indicative of the dielectric constant. For example, the processor 214 can determine that the surface is conductive when the determined dielectric constant is within a threshold range with respect to a baseline measurement. The baseline measurement can be, for example, a calibrated measurement, the dielectric constant of a housing of the mobile device 120, etc. In an embodiment, the processor 215 can classify the surface as conductive when the determined dielectric constant is within the threshold range, and can classify the surface as non-conductive when the determined dielectric constant is not within the threshold range.

Similarly, the processor 215 can determine the presence of a nearby non-conductive surface based on the one or more computed metrics. In an embodiment, a dielectric resting beneath the surface of the mobile device 120 can be formed of molecules, which are polarized by an electric field. The Σ-Δ ADC 360 can apply a voltage to a capacitive sensor 255, which will push charge onto the electrode of the sensor 255 in proportion to the external dielectric's ability to become polarized. The magnitude of the external bound charge displaced will be proportional to the charge accumulated on the electrode of the sensor 255. A constant drive voltage can be applied to the electrode of the sensor 255 during a polarization-charge accumulation event. The mobile device 120 can determine charge densities in external materials by measuring the uniform sheet of surface charge developed on the electrode of the sensor 255 by integrating the charge into an internal measurement capacitor in the Σ-Δ ADC 360. Thus, in an embodiment, the processor 215 can determine the dielectric constant of the surface according to Equations 5 and 6:

$$C = \frac{Q}{V} = \frac{\oint_s \epsilon_0 \cdot \epsilon_r \cdot E \cdot dS}{-\int_-^+ E \cdot dL} \quad (5)$$

$$E = \frac{\rho_s}{\epsilon_0 \cdot \epsilon_r} \quad (6)$$

E is the uniform field developed on the electrode of the sensor 255 and $\rho_s$ is the surface charge on the electrode, given in terms of charge per area, which can be dependent on the geometry of the sensor. Therefore, the processor 215 can determine $\epsilon_r$ for the surface based on a known potential difference of V applied by the Σ-Δ ADC 360, a measured value of Q by the Σ-Δ ADC 360, and a value of C calculated by the Σ-Δ ADC 360.

In an embodiment, the mobile device 120 can include a reference capacitor (not shown) to facilitate calibration. The environment sense controller 250 can measure the capacitance of the reference capacitor and store the result in the memory 220, for example with the calibration data. In various embodiments, the reference capacitor can include a portion of a housing or a protective case of the mobile device 120.

The calibration data can further include information indicating an effect of the housing or protective case on sensor readings. The processor 215 can subtract the effect of the housing or protective case when determining the dielectric constant of the surface. In some embodiments, the mobile device 120 can intermittently, periodically, or continuously recalibrate sensor readings with respect to the reference capacitor. For example, the mobile device 120 can detect a change in the protective case and compensate for the change.

In an embodiment, the processor 215 can access a single or multi-dimensional lookup table, which can be stored in the memory 220. The dimensions of the lookup table can correspond to one or more calculated metrics and/or sensor locations. The values in the look-up table can indicate one or more predicted characteristics of the measured surface. The characteristics can include, for example, a dielectric constant, type of material, solidity, being alive, location, distance, and orientation. Material types can include general categories such as wood, plastic, metal, liquid, etc., and/or specific materials such as oak, aluminum, polyvinyl chloride (PVC), water, etc.

The processor 215 can access the lookup table based on the one or more calculated metrics. For example, in a single-dimensional embodiment, the processor 215 can determine an average value of measured capacitance for the left sensor 255a (FIG. 6A). The processor 215 can look up the determined average in the table to determine an expected dielectric constant of the surface.

In an example including both the left sensor 255a (FIG. 6A) and the right sensor 255b (FIG. 6A), the processor 215 can determine an average value of measured capacitance for each sensor 255a and 255b. The processor 215 can look up the determined average for the left sensor 255a on a first dimension of the table, and can look up the determined average for the right sensor 255b on a second dimension of the table. The intersection of the two look-ups can indicate an expected dielectric constant of the surface. Based on the result of the look-up, the processor 215 can take one or more actions, such as changing a characteristic of the mobile device 120, as described below in the section titled "Exemplary Applications."

In another example, the processor 215 can determine an average value of measured capacitance for the left sensor 255a (FIG. 6A), and a standard deviation of the measured capacitance for the left sensor 255a. The processor 215 can look up the determined average for the left sensor 255a on a first dimension of the table, and can look up the determined standard deviation for the left sensor 255a on a second dimension of the table. The intersection of the two look-ups can indicate an expected material the surface. For example, the lookup table can indicate that the surface is likely wood. In one embodiment, the processor 215 can skip determination of the dielectric constant, and can directly relate a measured value (such as a voltage or current indicative of capacitance) to a type of material, or characteristic thereof. In other embodiments, additional metrics can be used, as discussed herein. Based on the determined material type or characteristic, the processor 215 can take one or more actions, such as changing a characteristic of the mobile device 120, as described below in the section titled "Exemplary Applications."

The look-up table can be pre-populated based one or more of a mobile device 120 geometry, antenna 240 position, one or more calibration measurements, etc. In an embodiment, the processor 215 can receive calibration information from the user interface 225, and can populate the look-up table based on the calibration information and one or more measurements by the environment sense controller 250. For example, with reference to FIGS. 1-2, the user 160c may place the mobile device 120c on the table 170. The user interface 225 can prompt the user to enter information about the surface. For example, the user 160c may indicate that the table 170 is a wooden coffee table in the living room, and can indicate the dielectric constant of the table 170 (for example, during a manufacturer calibration sequence). The processor 215 can adjust the look-up table based on the measurements taken, such the processor 120 can identify the table 170 as the wooden coffee table in the living room when the environment sense controller 250 records similar measurements in the future. In some embodiments, the processor 120 can identify the table 170 more generally such as, for example, wood.

In various embodiments, the look-up table can include one or more dimensions. For example, the look-up table can include one dimension per measurement. The look-up table can include additional dimensions corresponding to one or more other characteristics of the mobile device 120 and/or sensor locations. The memory 220 can include multiple look-up tables. In other embodiments, the look-up table can be replaced with one or more alternative structures of machine learning including, but not limited to, decision tree learning, association rule learning, artificial neural networks, genetic programming, inductive logic programming, support vector machines, clustering, Bayesian networks, reinforcement learning, representation learning, and sparse dictionary learning.

As discussed above, the mobile device 120 can be configured to subtract the effect of the housing or protective case when determining the dielectric constant of the surface. In the mobile device 120, which can include a cell phone or a tablet, the sensors 255 can be located within the housing, protective case, or device package. The housing material, and any material near the mobile device 120, can affect capacitive measurement. The housing can have a constant relative relationship in space with the sensors 255. Accordingly, a static housing can have a constant contribution to the capacitive measurement of the environment around the sensors 255.

In an embodiment, the housing capacitance can be accounted for via calibration data. The mobile device 120 can discover the parameters of the housing capacitance by taking capacitive measurements while suspended in air with no other objects nearby. In an embodiment, the environment sense controller 250 can be configured to cancel out the capacitive contribution of the housing, for example, prior to converting an analog sensor 255 measurement into a digital value. As discussed above with respect to FIG. 7, the environment sense controller 250 can include a pair of current DACs (not shown), which can be programmed to add or subtract an offset charge from the measurement. Accordingly, if the magnitude of the housing capacitance can be determined, then it can be removed from the measurement via the internal current DACs, allowing the $\Sigma$-$\Delta$ ADC 360 to digitize a larger environmental capacitance without clipping. In an embodiment, the magnitude of the housing capacitance can be used as a baseline in order to determine if a nearby object is conductive.

In an embodiment, the mobile device 120 can be housed in a material (such as plastic) having a dielectric constant that can vary due to changes in, for example, temperature and humidity. In an embodiment, the mobile device 120 can include one or more sensors configured to detect changes in temperature and/or humidity, and can perform a housing calibration upon detection of the changes. In some embodiments, however, the mobile device 120 may not include temperature and/or humidity sensors, or may not be configured to perform housing calibration upon detection of the changes.

In an embodiment, the mobile device 120 can be configured to cancel out the housing capacitance using differential measurements. The mobile device 120 can include a sensor 255 referred to as a "bias sensor." The bias sensor can include the same material used in the housing, and can be exposed to the same environment as the housing with respect to temperature and/or humidity. Unlike the housing, however, the bias sensor can be electrostatically shielded. Accordingly, the bias sensor can track changes in the housing dielectric changes, allowing the cancelation of the housing capacitance contribution in the differential capacitive measurement. The bias sensor can be connected to the negative terminal of the Σ-Δ ADC 360 (FIG. 7) in the environment sense controller 250 (FIG. 7), for example, by the switch matrix 240 (FIG. 7).

In an embodiment, the processor 215 can configure the sensor 255 that is configured as the bias sensor in a differential measurement configuration with another sensor 255, to discover sensor 255 connection breakage and/or or manufacturing defects. For example, the bias sensor can be connected to the negative terminal of the Σ-Δ ADC 360 (FIG. 7) in the environment sense controller 250 (FIG. 7), such as by the switch matrix 240 (FIG. 7). At the same time, a sensor 255 under test can be connected to the positive terminal of the Σ-Δ ADC 360. The processor 215 can read the differential measurement from the environment sense controller 250 and can compare the measurement to an expected differential imbalance. The expected differential imbalance can be included with calibration in formation in the switch matrix 340 or can be dynamically determined. If the differential measurement is outside a threshold range, the processor 215 can determine that the sensor 255 under test is defective.

The sensor 255 that serves as the bias sensor itself can be tested using a single ended measurement, as described above, because its capacitance value is likely to take on a smaller range of values than other sensors 255 exposed to external stimuli. The processor 215 can compare the measured capacitance of the bias sensor to a threshold range based on the maximum and minimum dielectric values of the bias sensor material, under expected temperature and humidity conditions.

Figure 12:
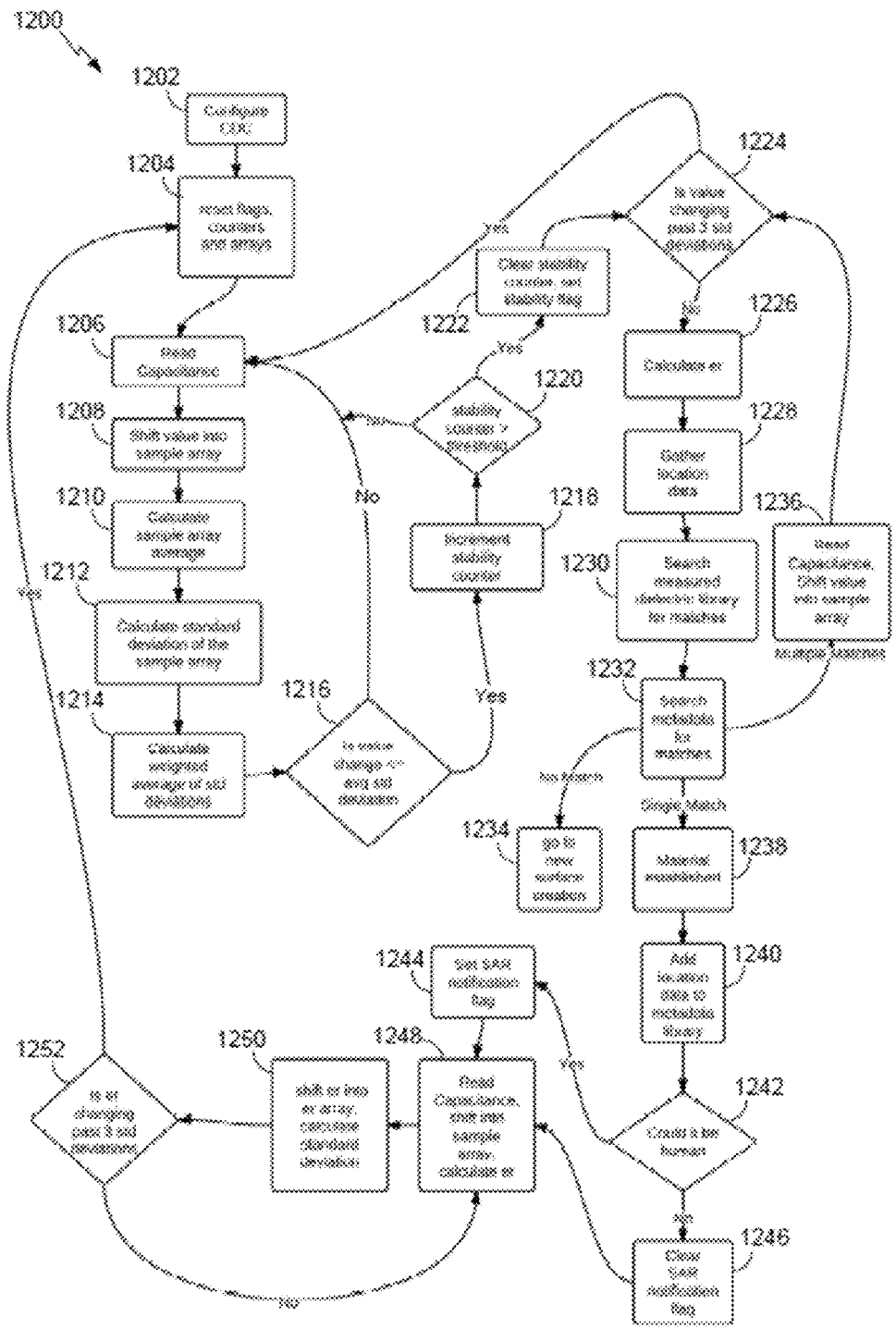
FIG. 12 is a flowchart of an exemplary method of environment detection, according to an embodiment.

FIG. 12 is a flowchart 1200 of an exemplary method of environment detection, according to an embodiment. The method of the flowchart 1200 uses static dielectric detection, as described herein. Although the method of the flowchart 1200 is described herein with reference to the mobile device 120, discussed above with respect to FIGS. 2 and 5A-6D, a person having ordinary skill in the art will appreciate that the method of the flowchart 1200 may be implemented by other suitable devices. In an embodiment, the steps in the flowchart 1200 may be performed by a processor or controller such as, for example, the processor 215 (FIG. 2), and/or the environment sense controller 250 (FIG. 2), in conjunction with one or more of the memory 220 (FIG. 2) and the sensors 255 (FIG. 2). Although the method of the flowchart 1200 is described herein with reference to a particular order, in various embodiments, blocks herein may be performed in a different order, or omitted, and additional blocks may be added.

First, at block 1202, the processor 215 configures the Σ-Δ ADC 360 (FIG. 7) in the environment sense controller 250. The Σ-Δ ADC 360 can also be referred to as a capacitance-to-digital converter (CDC), as indicated in the flow chart. For example, the processor 215 can set a decimation rate, offsets, and stage configurations. The processor 215 can configure the Σ-Δ ADC 360 to take one or more readings from the sensors 255.

Next, at block 1204, the processor 215 resets any flags, counters, and/or arrays related to environment detection. For example, the processor 215 can clear one or more of a sample array, a stability counter, a stability flag, a SAR notification flag, an $\in_r$ array, etc. The flags, counters, and/or arrays can be stored in one of the memory 220, the calibration memory (FIG. 7), the control and data registers 710 (FIG. 7), etc.

Then, at block 1206, the Σ-Δ ADC 360 reads a capacitance value from a sensor 255. At block 1208, the processor 215 shifts the measured capacitance value into the sample array. The sample array can store a first number of recent capacitance measurements. The sample array can be stored, for example, in the memory 220.

Thereafter, at block 1210, the processor 215 calculates the average of at least some values in the sample array. In an embodiment, the processor 215 calculates the average across all values in the sample array. In an embodiment, the processor 215 can store the result of each average calculation in an array of average calculations.

Subsequently, at block 1212, the processor 215 calculates the standard deviation of the values in the sample array. Alternatively, the processor 215 can calculate other indicators of variability in the samples. For example, the processor 215 can perform time domain magnitude and/or frequency domain analysis on the values in the sample array. The processor 215 can store the result of each standard deviation calculation in an array of standard deviations.

Next, at block 1214, the processor 215 calculates a weighted average of the standard deviation results in the array of standard deviations. The standard deviation results can be weighted by, for example, the array order, a time at which each result was calculated, etc. In an embodiment, the processor 215 can also calculate a change in the value of measured capacitance since the last measurement.

Then, at block 1216, the processor 215 determines if the change in value is less than or equal to the weighted average of standard deviations calculated at block 1214. If the value change is greater than to the weighted average of standard deviations, the processor 215 continues to read additional capacitance values block 1206. On the other hand, if the value change is less than or equal to the weighted average of standard deviations, the processor 215 proceeds to block 1218.

At block 1218, the processor 215 increments the stability counter. The stability counter can indicate a stability of the mobile device 120 with respect to a measurement surface. For example, the stability counter can indicate a variability of the capacitance measurements. The stability counter can be stored, for example, in the memory 220.

Thereafter, at block 1220, the processor 215 determines if the stability counter is greater than a stability threshold. The stability threshold can be stored and retrieved, for example, from the memory 220. The stability threshold can be based on calibration data or other adaptive threshold sources. The stability threshold can be indicative of a stability of the mobile device 120 sufficient to cause subsequent material determination to have an accuracy above an accuracy threshold. If the stability counter is less than or equal to the stability threshold, the processor 215 can continue to read additional capacitance values block 1206. On the other hand, if the stability counter is greater than the stability threshold, the processor 215 proceeds to block 1222.

At block 1222, the processor 215 clears the stability counter. The processor 215 can also set the stability flag. The stability flag can indicate that the mobile device 120 has a stability sufficient to begin determination of the dielectric constant of a nearby material.

At block 1224, the processor 215 determines if the last measured capacitance value is outside three standard deviations from the sample average determined in block 1210. In various embodiments, other metrics can be used to determine whether the last measured capacitance value is an outlier. For example, one standard deviation or two standard deviations can be used, or another measure of variability. If the last measured capacitance value is outside three standard deviations from the sample average, the processor 215 continues to read additional capacitance values block 1206. On the other hand, if the last measured capacitance value is within three standard deviations from the sample average, the processor 215 proceeds to block 1226.

At block 1226, the processor 215 calculates the dielectric constant ($\in_r$) of the material as described above with respect to equations 1-4. At block 1228, the processor 215 gathers location data such as, for example, GPS measurements, location services based on visible WiFi networks, etc. In an embodiment, the user can provide location data via the user interface 225.

Thereafter, at block 1230, the processor 215 searches a library of dielectric constants for matches. The library of dielectric constants can indicate a material type based on the calculated dielectric constant. In various embodiments, other libraries can be used, as described below in the section titled "Lookup Tables." For example, the processor 215 can skip block 1226, and can directly access a library that provides a material type based on a measured value indicative of capacitance.

Next, at block 1232, the processor 215 searches a metadata library for matches. The library of dielectric constants can indicate a material type based on the calculated dielectric constant and/or other information such as the location data. In various embodiments, the processor 215 can search the metadata library in addition to, or instead of the dielectric constant library. In various embodiments, other libraries can be used, as described below in the section titled "Lookup Tables." For example, the processor 215 can skip block 1226, and can directly access a library that provides a material type based on a measured capacitance value and/or the other metadata such as the location data determined at block 1228.

With continued reference to block 1232, if there is no match in the metadata library, the processor 215 continues to block 1234 where it creates a new entry in one or more libraries. For example, the processor 215 can store the measured capacitance, calculated dielectric constant, determined location data, and/or any other related information corresponding to the measured surface (such as a conductivity classification of the measured surface).

With continued reference to block 1232, if there are multiple matches in the metadata library, the processor 215 continues to block 1236, where the Σ-Δ ADC 360 reads an additional capacitance value from the sensor 255, at which the processor 215 shifts the capacitance into the sample array. The capacitance can be the already calculated sample array average from block 1210, or can be based on an additional measurement, as shown, to allow further discrimination between metadata entries. In an embodiment, block 1236 can include one or more actions from blocks 1206-1214.

With continued reference to block 1232, if there is a single match in the metadata library, the processor 215 proceeds to block 1238, whereby the matched material is established. Then, at block 1240, the processor 215 adds the location data, determined at block 1228, to the metadata library. The processor 215 can also add other metadata to correspond with the determined material.

Thereafter, at block 1242, the processor 215 determines if the material established at 1238 could be human. For example, the searched libraries may include materials such as skin and other potentially human features. If the material is determined to be possibly human (e.g., the "established" material is within a range of dielectric constants that encompasses human features), the processor 1244 sets the SAR notification flag at block 1244. On the other hand, if the material established at block 1238 is determined not to be human, the processor 1244 clears the SAR notification flag at block 1246. The processor 215, radio subsystem 230, and/or the antenna controller 240 can, for example, adjust a transmitter power based on the SAR notification flag.

Subsequently, at block 1248, the processor 215 reads a new capacitance value, shifts the value into the sample array, and calculates the dielectric constant ($\in_r$). The processor 215 can, for example, perform the actions of one or more of blocks 1206, 1208, and 1226. In an embodiment, the processor 215 can perform additional actions such as, for example, all of blocks 1206-1226.

Next, at block 1250, the processor 215 shifts the dielectric constant ($\in_r$) into a dielectric constant array, and calculates a standard deviation of the values in the array. In other embodiments, the processor can calculate another indication of variability.

Then, at block 1252, the processor determines whether the last calculated dielectric constant is outside three standard deviations from an average of calculated dielectric constants. In various embodiments, other metrics can be used to determine whether the last measured capacitance value is an outlier. For example, one standard deviation or two standard deviations can be used, or another measure of variability. If the last calculated dielectric value is outside three standard deviations from the average, the processor 215 begins a new material determination sequence at block 1204. On the other hand, if the last calculated dielectric value is within three standard deviations from the average, the processor 215 continues to monitor material and/or location changes at block 1248.

Dynamic Dielectric Detection

As described above with respect to FIG. 1, the mobile device 120 can be configured to detect a dielectric of one or more nearby objects 160a-160d, 170, and 180, and/or surfaces thereof, while in motion relative to the one or more nearby objects 160a-160d, 170, and 180. For example, the mobile device 120b can be configured to detect a dielectric constant of the user's 160b head as the user 160b brings the mobile device 120b to his ear. As another example, the mobile device 120c can be configured to detect a dielectric constant of the table 170 as the user 160a moves the mobile device 120c away from the table. In an embodiment, the mobile device 120 can determine one or more characteristics based on the detected dielectric. For example, the mobile device 120 can determine one or more of type of a material, solidity, and aliveness of a nearby object.

Referring back to FIG. 2, the mobile device 120 can detect a dielectric of a nearby surface in relative motion based on, for example readings from one or more of the sensors 255. Particularly, the processor 215 can configure the environment sense controller 250 to perform one or more environmental measurements using at least one sensor 255. The processor 215 can compare the measurements to one or more reference measurements, for example, via a lookup table, in order to determine a type of material.

In various embodiments, the sensors 255 (FIGS. 2-4) can be configured as shown and described above with respect to FIGS. 5A-6D. Other configurations may be used, including any combination of sensors 255 in various orientations. For example, it may be desirable for the mobile device 120 to include at least one sensor 255 substantially parallel to and proximate one or more housing faces upon which a user may set the mobile device 120. Although a particular embodiment is described herein with reference to the left sensor 255a (see FIGS. 5A-6D), other combinations of sensors 255 can be used. In an embodiment, the mobile device 120 can concurrently determine the dielectric constants (or any other characteristics) for a plurality of surfaces. Other characteristics can include, for example, a conductivity classification of the surfaces.

In an embodiment, the environment sense controller 250 (FIG. 7) can perform one or more capacitive measurements using the left sensor 255a. Particularly, the processor 215 (FIG. 2) can configure the conversion sequencer 720 (FIG. 7) to take continuous, periodic, or intermittent measurements using the Σ-Δ ADC 360. In embodiments using more than one sensor 255, the processor 215 can configure the conversion sequencer 720 to iterate through all the sensors 255 over time, for example, according to a round-robin sequence. In an embodiment, the processor 215 can determine an orientation of the mobile device 120 (for example, based on readings from the accelerometer 227), and can choose a subset of sensors 255 that are likely to be facing the surface to be measured. The processor 215 can choose the subset of sensors 255 based on information indicative of sensor 255 locations, which can be stored in the memory 220.

The conversion sequencer 720 can iterate through different sensor readings using, for example, the switch matrix 340, as described above with respect to FIG. 7. The processor 215 can read the measurement results from the environment sense controller 250 periodically or intermittently. For example, the processor 215 can read the measurement results after all conversion stages have completed. In an embodiment, the processor 215 can read the measurement results after each measurement, and can make periodic or intermittent measurement requests.

The processor 215 can store one or more measurement results in the memory 220. In an embodiment, the processor 215 can include one or more timestamps associated with the measurement results. The processor 215 can be configured to calculate one or more metrics on the measurement results such as, for example, an average, a weighted average, a moving average, a standard deviation, rate of change, direction of change, etc. The processor 215 can calculate the one or more metrics based on the X most recent measurement results, where X can be a preset or dynamically determined number. The processor 215 can calculate multiple sets of the metrics, based one or more subsets of recorded measurement results.

The processor 215 can determine that the mobile device 120 is in motion using the accelerometer 227. For example, the mobile device 120 can store one or more accelerometer 227 readings in the memory 220, and can compare the accelerometer 227 readings to a motion threshold. The processor 215 can use one or more accelerometer 227 metrics in a manner similar to that described above with respect to stability metrics. For example, if the accelerometer 227 metric is greater than the motion threshold, the processor 215 can determine that the mobile device 120 is likely moving with respect to a nearby surface, and can proceed to dynamically determine the dielectric constant of the surface, e.g., while the mobile device is in motion. On the other hand, if the accelerometer 227 metric is not greater than the motion threshold, the processor 215 can determine that the mobile device 120 is likely stationary with respect to a nearby surface, and may delay dynamically determining the dielectric constant of the surface until the mobile device 120 is in motion. In an embodiment, the processor 215 can use the stability metric, as described above, in addition or alternative to the accelerometer 227 metric.

As discussed above with respect to the section titled "Static Dielectric Detection," in general, the processor 215 can determine the dielectric constant according to the parallel plate capacitor shown in Equation 1. The processor 215 can determine a conductivity classification of the surface. When the mobile device 120 is in motion relative to a surface to be measured, however, the measured capacitance and the distance to the surface will change over time. In an embodiment, the processor 215 can determine the dielectric constant based on a change in measured capacitance over a first time period and a change in distance to the surface over the first time period, as shown in Equation 7:

$$\in_r = \Delta C \cdot \Delta d \cdot k \qquad (7)$$

In an embodiment, the processor 215 can determine the change in distance to the surface using the accelerometer 227. In some embodiments, the accelerometer 227 can include an integration function and can directly report distance traveled to the processor 215. In other embodiments, the processor 215 can determine the distance traveled over time based on the measured acceleration. For example, the processor 215 can sum the products of acceleration readings times the period between acceleration readings. In some embodiments, processor 215 can determine the change in distance to the surface using other positioning and/or ranging sensors such as, for example, ultrasonic, radar, and laser ranging sensors. In an embodiment, the processor 215 can calculate change in distance to the surface according to Equation 8, below, where $a_n$ is an acceleration vector measured at a first time, $a_{n-1}$ is an acceleration vector measured at a second time, and t is the time between the $a_n$ and $a_{n-1}$.

$$\Delta d = \frac{1}{2}[(a_n + a_{n-1}) \cdot t^2/2]t^2 \qquad (8)$$

While the mobile device 120 is in motion, the processor 215 can determine the dielectric constant of the nearby surface as described above with respect to static dielectric detection, except that while in motion the equation (5) employs changes in measured capacitance (in place of measured capacitance), and changes in distance to the surface (in place of distance to the surface). For example, the processor 215 can subtract the effect of the housing or protective case when determining the dielectric constant of the surface. The processor 215 can also access a single or multi-dimensional lookup table, which can be stored in the memory 220, and determine one or more characteristics of the surface based on the result. The processor 215 can adaptively update the look-up table, and the look-up table can be replaced with one or more alternative structures of machine learning.

As discussed herein the mobile device 120 can be configured to take capacitive measurements, process the measurements, and correlate the measurements to various materials, and/or correlate the materials to actions. During processing and/or correlation, the mobile device 120 can determine one or more intermediate values such as values indicative of a material adjacent the mobile device 120. For example, the outputs from any combination of the blocks 1206-1252 can be referred to herein as an intermediate value or value indicative of a material adjacent the mobile device 120.

Figure 13:
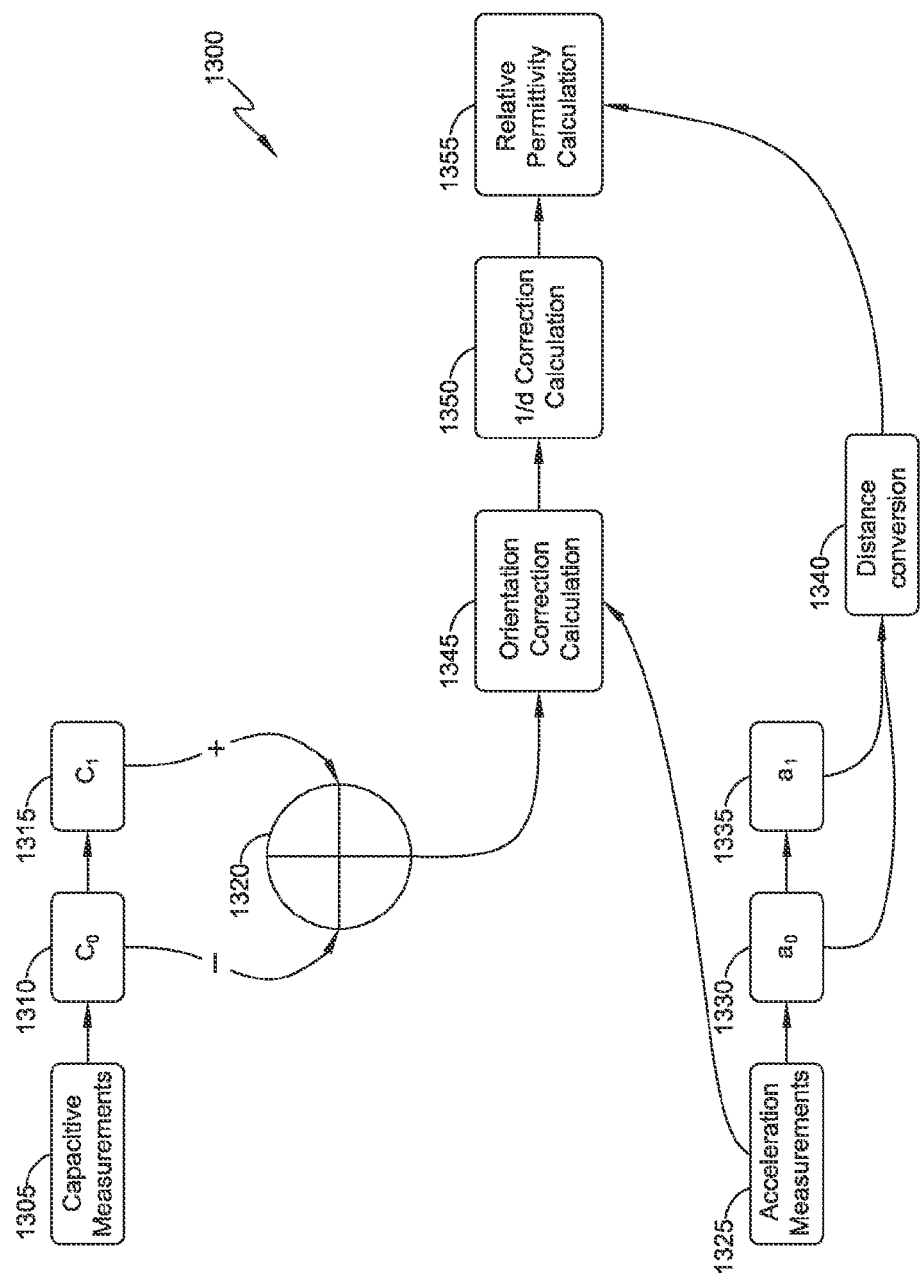
FIG. 13 is a flowchart of an exemplary method of environment detection, according to an embodiment.

FIG. 13 is a flowchart 1300 of an exemplary method of environment detection, according to an embodiment. The method of the flowchart 1300 uses dynamic dielectric detection, as described herein. Although the method of the flowchart 1300 is described herein with reference to the mobile device 120, discussed above with respect to FIGS. 2 and 5A-6D, a person having ordinary skill in the art will appreciate that the method of the flowchart 1300 may be implemented by other suitable devices. In an embodiment, the steps in the flowchart 1300 may be performed by a processor or controller such as, for example, the processor 215 (FIG. 2), and/or the environment sense controller 250 (FIG. 2), in conjunction with one or more of the memory 220 (FIG. 2) and the sensors 255 (FIG. 2). Although the method of the flowchart 1300 is described herein with reference to a particular order, in various embodiments, blocks herein may be performed in a different order, or omitted, and additional blocks may be added.

At block 1305, the mobile device 120 takes at least two capacitive measurements ($C_0$ at block 1310, and $C_1$ at block 1315). For example, the processor 215 can retrieve two capacitive measurements from the Σ-Δ ADC 360 (FIG. 7). At block 1320, the processor 215 can determine the difference (ΔC) between $C_0$ and $C_1$.

At block 1325, mobile device 120 takes at least two acceleration measurements ($a_0$ at block 1330, and $a_1$ at block 1335). For example, the processor 215 can retrieve two measurements from the accelerometer 227. The two acceleration measurements $a_0$ and $a_1$ can be taken at substantially the same time and separated by substantially the same time differential as the two capacitive measurements $C_0$ and $C_1$. For example, $a_0$ and $C_0$ can be measured within around 0-10 ms of each other, such as within around 5 ms. Moreover, $a_1$ and $C_1$ can be measured within around 0-10 ms of each other, such as within around 5 ms. At block 1340, the processor 215 can determine the distance traveled according to equation 6, above.

At block 1345, the processor 215 can be configured to perform an orientation correction calculation. In some embodiments, capacitive reading errors can result from planar misalignment of an electrode with a surface. The processor 215 can be configured to adjust dynamic dielectric calculations by synthetically aligning the mobile device 120 with an assumed surface orientation. In some embodiments the velocity vector of the mobile device 120 can be assumed to point directly to the center of a target to be sensed, and that the surface of that target is normal to the velocity vector of the mobile device 120. In some embodiments, the orientation of the accelerometer 227 relative to the capacitive electrode 255 is known. For example, the orientation and position of the accelerometer 227 relative to one or more sensors 255 can be stored in calibration data. In some embodiments, the accelerometer 227 is capable of sensing acceleration in three orthogonal axes.

Referring still to block 1345, the processor 215 can calculate the velocity vector from the accelerometer 227 data. The processor 215 can determine the plane that the capacitive electrode 255 lies on, for example, based on the accelerometer 227 orientation and the relative sensor(s) 255 orientation data stored in the memory 220. The processor 215 can calculate the differential between the velocity vector and the sensor normal vector, and compensate for the difference by mathematically rotating the sensor plane to be normal to the velocity vector. The processor 215 can calculate the magnitude response difference between a rotated sensor and a coplanar sensor, and apply reciprocal compensation to the capacitive measurement.

At block 1350, the processor 215 calculates, and corrects for, measurement error. In an embodiment, as distance between the mobile device 120 and an object changes, the magnitude of the capacitive measurement is expected to follow an inversely proportional response to the distance change. Using this expected response, the processor 215 can estimate a measurement error. The processor 215 can compare the differential capacitance change to expected values, based on a derivative of the function $C \propto 1/d$, and determine an approximate scaled value of d. The processor 215 can successively perform this calculation, at various rates according to various embodiments. As the mobile device 120 moves, the processor 215 can compare the average capacitive response at many points along the 1/d curve, and can estimate capacitive measurement error. The processor 215 can use the estimated error to scale, offset, and/or dither measurements and/or intermediate calculation results, thereby reducing error in the overall relative permittivity calculation.

At block 1355, the processor 215 calculates the relative permittivity or dielectric constant of the nearby material. The processor 215 can calculate the dielectric constant based on the corrected capacitive measurements determined at block 1350, and the distance traveled determined at block 1340. As discussed above, the processor 215 can calculate the dielectric constant as described above with respect to Equations 5 and 6. In an embodiment, the processor 215 can adjust a characteristic of the mobile device 120, based on the calculated dielectric constant. Various examples are included below, in the section titled "Exemplary Applications."

Human Detection

As discussed above with respect to FIG. 1, the mobile device 120 can be configured to determine whether a nearby object 160a-160d, 170, and 180 is likely to be human. As discussed above in the sections titled "Static Dielectric Detection" and "Dynamic Dielectric Detection," the mobile device 120 can determine one or more characteristics based on the detected dielectric. The mobile device 120 can heuristically predict whether a nearby object 160a-160d, 170, or 180 is human based on the determined characteristics such as, for example, a degree of solidity vs. fluidity. For example, the average dielectric value of a human may be similar to the average dielectric constant of other material compositions that are not human. The capacitive magnitude response measured at capacitive sensor 255 (FIG. 2) can be used as a rough filter to find a set of objects which may be human. Because the set of objects that may be human is smaller than the set of all objects, false positives can be reduced. In an embodiment, the mobile device 120 can set a first-order human proximity trigger based on a lookup table of likely values for different locations on a human body.

In general, solid dielectrics may behave differently than liquid dielectrics when an electrostatic force is applied. Liquid dielectrics can have molecules that are free to move, and are agitated by Brownian motion and other influencing forces. The molecules that are relatively free to move will change their distance from a static capacitive sensor 255, and thereby change the capacitance observed by the sensor 255. Solid dielectrics can have tightly bound molecules that do not appreciably vary their distance from a static sensor 255, when an electrostatic force is applied. By observing the variability (for example, by computing a standard deviation), of the capacitive charge, the mobile device 120 can reliably detect the difference between solids and liquids. Humans can be modeled as a hybrid of solids and liquids and will therefore exhibit different variability in capacitively sensed measurements, as compared to solid inanimate objects.

Referring back to FIG. 2, as discussed above, the processor 215 can be configured to calculate one or more metrics on the measurement results received from the environment sense controller 250. Particularly, the processor 215 can monitor the magnitude and/or variability of measurement results. For example, the processor 215 can store a plurality of capacitance measurements in the memory 220. The processor 215 can be configured to calculate the standard deviation across a plurality of the stored capacitance measurements. In other embodiments, the processor 215 can calculate a different indication of variability.

The processor 215 can calculate the standard deviation (or other measure of variability) multiple times, such as after each capacitance measurement, and can store the calculated standard deviation results in the memory 220. The processor 215 can calculate and store a running average of the standard deviation results over a time period that can be preset, or dynamically adjusted based on an application of the mobile device 120. The processor 215 can determine and store the lowest average standard deviation value, referred to herein as the "standard deviation floor." When new capacitance measurements, individually or on average, increase a threshold amount beyond the standard deviation floor, the processor 215 can flag a first-order human detection. The threshold can be preset, stored in calibration data, and/or dynamically determined. In various embodiments, the threshold can be between one and three standard deviations above the standard deviation floor, such as two standard deviations.

An example threshold can be determined as a user handles a device, and the instantaneous standard deviation for a set of samples is determined and exceeds the previously determined standard deviation floor. The ratio of the instantaneous standard deviation to the standard deviation floor can be set as an approximate threshold.

In an embodiment, the processor 215 can index into a two dimensional lookup table, based on a combined magnitude response and a standard deviation range. The processor 215 can match the capacitive magnitude to the calculated instantaneous standard deviation for the current set of measurements. The processor can scale the standard deviations in the lookup table by the standard deviation floor observed in the operating environment. If a match is discovered in the lookup table, then the processor 215 can determine a second-order human detection. The second-order human detection can imply a higher confidence that the nearby object is human.

In another embodiment, as discussed above, processor 215 can be configured to perform one or both of static and dielectric detection. The processor 215 can look up the detected dielectric constant in a lookup table. In an embodiment, the lookup table can be pre-populated with expected dielectric constants for external human features a determination of human versus solid object can be made. In another embodiment, the lookup table can be trained, or other machine learning techniques applied, as discussed above.

In various other embodiments, based on the results of the lookup table, the processor 215 can determine a confidence level that that the measured object is human. In an embodiment, the lookup table may contain probability values. In another embodiment, the lookup table can contain values indicating relative likelihood that a given reading and/or metric is derived from a human feature. In another embodiment, the processor 215 can determine that the measured object is human when the determined metric is within a threshold of any index value in the lookup table, and that the measured object is not human when the determined metric is not within the threshold.

Although human detection is described above with respect to magnitude and variability metrics, and the solidity characteristic, a person having ordinary skill in the art will appreciate that any metric and/or determined characteristic can be used in combination to determine whether a measured object is likely to be human. In an embodiment, the processor 215 can apply weights to a plurality of metrics. For example, the processor 215 can heavily weight the solidity characteristic and lightly weight the mobile device's orientation with respect to the measured object.

Figure 14:
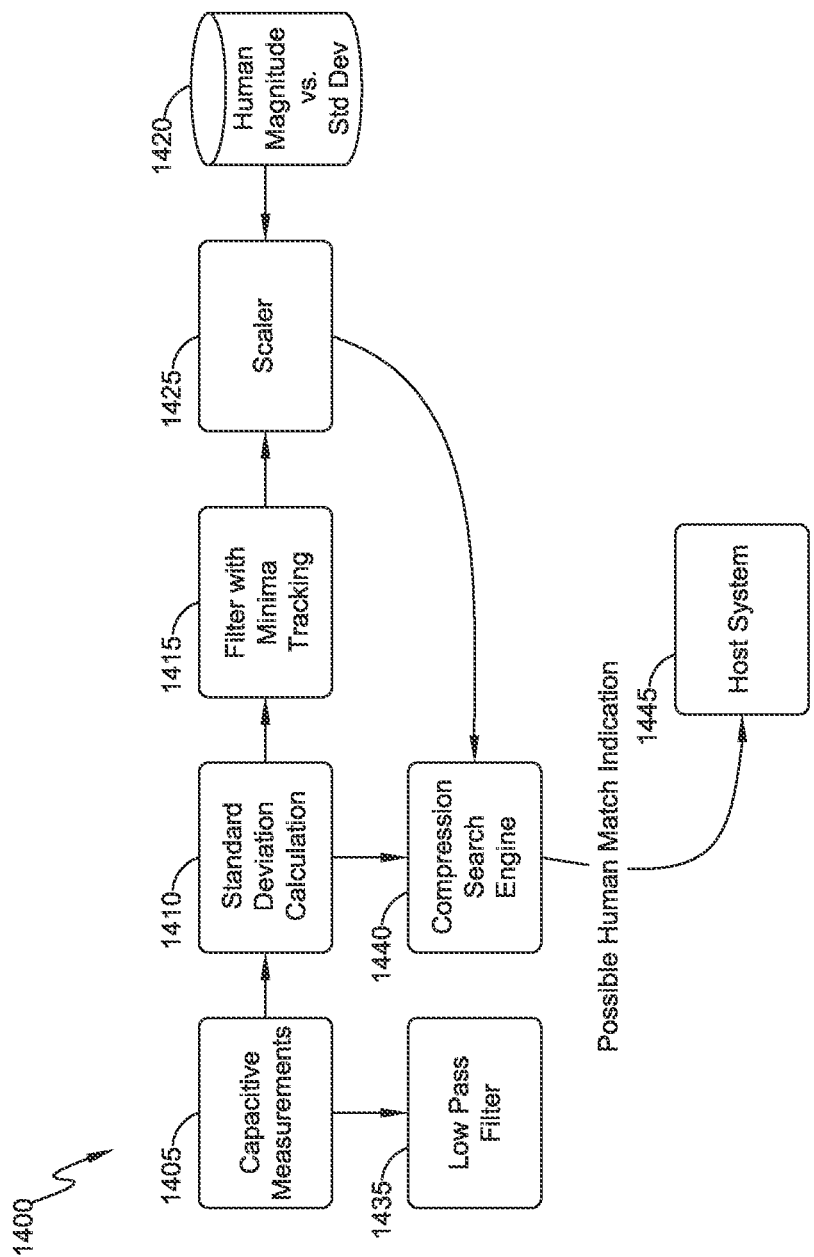
FIG. 14 is a flowchart of an exemplary method of environment detection, according to an embodiment.

FIG. 14 is a flowchart 1400 of an exemplary method of environment detection, according to an embodiment. The method of the flowchart 1400 uses static dielectric detection, as described herein. Although the method of the flowchart 1400 is described herein with reference to the mobile device 120, discussed above with respect to FIGS. 2 and 5A-6D, a person having ordinary skill in the art will appreciate that the method of the flowchart 1400 may be implemented by other suitable devices. In an embodiment, the steps in the flowchart 1400 may be performed by a processor or controller such as, for example, the processor 215 (FIG. 2), and/or the environment sense controller 250 (FIG. 2), in conjunction with one or more of the memory 220 (FIG. 2) and the sensors 255 (FIG. 2). Although the method of the flowchart 1400 is described herein with reference to a particular order, in various embodiments, blocks herein may be performed in a different order, or omitted, and additional blocks may be added.

First, at block 1405, the mobile device 120 takes a plurality of capacitive measurements. For example, the processor 215 can retrieve capacitive measurements from the $\Sigma$-$\Delta$ ADC 360 (FIG. 7). The processor 215 can store the capacitive measurements, for example in the memory 220, as an array.

At block 1410, the processor 215 calculates the standard deviation of the capacitive measurements. In an embodiment, the processor 215 can store the calculated standard deviations, for example in the memory 220, as an array. In other embodiments, the processor 215 can use another measure of variability.

At block 1415, the processor 215 filters the capacitive measurements via minima tracking. In an embodiment, the processor 215 can calculate and store a running average of the standard deviation results. The processor 215 can continually, periodically, or intermittently determine and store the standard deviation floor.

At block 1425, the processor 215 retrieves data from a lookup table, for example, from the memory 220. The lookup table can include two dimensions. The first dimension can include combined magnitude responses. The second dimension can include standard deviation ranges.

At block 1430, the processor 215 scales the standard deviations in the lookup table by the standard deviation floor observed in the operating environment. The processor 215 can store the scaled lookup table in the memory 220. The processor 215 can use the scaled lookup table during comparison search at block 1440.

At block 1435, the processor 1435 can run the capacitive measurements obtained in block 1405 through a low-pass filter. For example, the processor 215 can maintain a running average of recent capacitive measurements. As another example, the processor 215 can calculate a weighted average, giving higher weight to the most recent measurements. In an embodiment, the mobile device 120 can include a digital signal processor (DSP) configured to implement a low-pass filter.

At block 1440, the processor 215 indexes into the scaled lookup table obtained in block 1425. The processor 215 can index into the first dimension using the low-pass filtered magnitude capacitance measurements obtained in block 1435. The processor 215 can index into the second dimension using the standard deviation of capacitance measurements obtained in block 1410. The processor 215 can determine a possible human match indication based on the result of the lookup.

At block 1445, the processor 215 can signal the human match indication to a host application, the radio subsystem, or another component of the mobile device 120. The processor 215 can modify a characteristic of the mobile device based on the possible human match indication. For example, the processor 215 can reduce a transmit power at the antenna 245. As another example, the processor 215 can implement a program, application, or subroutine configured for human interaction via the user interface 225.

Lookup Tables

As discussed above with respect to the sections titled "Static Dielectric Detection," "Dynamic Dielectric Detection," "Human Detection," and "Grip Detection," the mobile device 120 can be configured to compare one or more sensor readings, or metrics based thereon, to one or more lookup tables (or other data structures) in order to determine one or more environmental characteristics. In some embodiments, the mobile device 120 can include one or more of the following lookup tables, or "libraries": a baseline library, a measured material constant library, and a metadata library. Each library can be stored in the memory 220.

The baseline library can be a pre-populated library of common dielectric constant measurements. The processor 215 can refer to the baseline library for a first-order material prediction when a mobile device 120 performs environmental measurements in a new geographic location. The baseline library can include the dielectric constants of common materials such as woods, water, plastics, and glass. The baseline library can also include one or more estimated human constants accounting for muscle, blood, and fat.

The measured material constant library can be a mobile device 120 populated library including measurements and calculated metrics for encountered materials. In an embodiment, the measured material constant library is user-populated and/or updated. In some embodiments, the measured material constant library can be populated by a manufacturer, either at manufacture or via an update. As discussed above, when the mobile device 120 encounters surfaces, the processor 215 can compare a time-averaged dielectric constant calculation to a listing of known dielectric constants. In some embodiments, the processor 215 can use additional characteristics, such whether a nearby object is conductive, for comparison. The processor 215 can concurrently record additional data regarding the measurements in the measured material constant library. For example, the processor 215 can record average minimum, average maximum, and mode values for each material measured. The processor 215 can store the predicted material type, derived from the baseline library, with the recorded measurements and/or metrics. Accordingly, over time, the measured material constant library can accumulate more accurate observed constants. For example, a given measurement may correspond to "wood" in the baseline library, and to "oak" in the measured material constant library.

In an embodiment, the mobile device 120 can be configured to prefer the measured material constant library to the baseline library. For example, the processor 215 can be initially configured to use the baseline library as a first-pass filter to determine whether to look up a measurement in the measured material constant library (or vice versa). In an embodiment, the processor 215 can be configured to prefer the measured material constant library after a threshold number of updates. Over time, the measured material constant library can refer first to the measured material constant library.

The metadata library can include additional data that can correspond to measurements, computed metrics, and/or the corresponding measurement and/or metric values stored in the baseline library and/or the measured material constant library. For example, the metadata library can include status entries such as, for example, indicating whether the mobile device 120 has been charged. The metadata library can include list entries such as, for example, lists of wireless networks in range of the mobile device 120. The metadata library can include statistical entries such as, for example, an amount of time the mobile device 120 has been on a particular surface. The metadata library can include averaged function entries such as, for example, a relationship between a dielectric constant and a temperature or time of day. The metadata library can include other data that can correspond to one or more measurements and/or metrics such as, for example, a time of day, a temperature, a location (e.g., user-indicated or derived from location-awareness functions), a light sensor reading, a list of available WI-FI™ service set identifiers (SSIDs), an amount of time the mobile device 120 has spent on a particular surface, whether charging has occurred and/or the time since the last charge, a user-indicated location description (e.g., "living room table"), etc. The processor 215 can use the metadata library to assist in an initial estimation of surfaces that have been previously encountered, and/or to increase the robustness of detection over in changing environments.

In an embodiment, the processor 215 can cross-reference and cross-correlate entries in the baseline library, the measured material constant library, and/or the metadata library. In an embodiment, the processor 215 can determine whether two entries are similar (for example, by comparing the entries to a threshold range). When a match is found, the processor 215 can infer one or more characteristics about the measured surface based on the library contents. For example, the processor 215 can determine that a measured surface is not human, can enter a different power mode, can trigger a software function, etc.

In various embodiments, the look-up table can be replaced or supplemented with one or more alternative structures of machine learning including, but not limited to, decision tree learning, association rule learning, artificial neural networks, genetic programming, inductive logic programming, support vector machines, clustering, Bayesian networks, reinforcement learning, representation learning, and sparse dictionary learning. In some embodiments, look-up tables can be implemented as computer code such as, for example, a set of instructions that relate one or more input values to one or more output values.

In various embodiments, the look-up tables or alternative structures can correlate values indicative of a material adjacent the mobile device 120 to actions for altering states or characteristics of the mobile device 120. Values indicative of the material can include raw or encoded environmental characteristics such as, without limitation, one or more of an object's capacitance, dielectric constant, type of material, conductivity, conductivity classification (i.e., conductive or not conductive), solidity, aliveness, location, distance, and orientation (including, for example, whether the mobile device 120 is being held in a hand, whether the hand is a left-hand or right-hand, and/or how the hand is gripping the mobile device 120). The values can be derived from capacitance measurements, as described herein. Look up tables can also include actions and/or device states that can be associated with any of the aforementioned measurements, values, and environmental characteristics.

Exemplary Applications

As discussed above with respect to the sections titled "Static Dielectric Detection," "Dynamic Dielectric Detection," "Human Detection," "Grip Detection," and "Lookup Tables," the mobile device 120 can determine one or more characteristics of a proximate material using one or more capacitive measurements. For example, the mobile device 120 can determine a dielectric of a proximate material using static dielectric detection and/or dynamic dielectric detection. The mobile device 120 can determine a solidity vs. liquidity of a nearby material, for example, based on a variability of the measurements. The mobile device 120 can determine a relative position and/or orientation of the nearby material based on the measurements from multiple sensors 255. The mobile device 120 can relate such measurements to one or more characteristics using one or more libraries.

Based on any combination of the determined characteristics described herein, the mobile device 120 can take some action such as, for example, adjusting a characteristic of the mobile device 120. By way of non-limiting example, the mobile device 120 can adjust a transmit power, transition to a different new power and/or behavior mode, and learn the materials corresponding to aspects of a user's common environment.

As discussed above with respect to FIG. 1, the mobile device 120 can be subject to one or more mandatory or voluntary rules, regulations, or standards, such as those regarding specific absorption rate of radio frequency energy (SAR), that can limit the amount of power that the mobile device 120 can radiate into nearby humans. When no human is within a critical proximity, the mobile device 120 can increase transmit power levels, potentially increasing communication performance. On the other hand, when a human is detected within a critical proximity, the mobile device can decrease the transmit power to a regulated maximum level. In various embodiments, the mobile device 120 can be capable of higher output than the regulated maximum level.

In some configurations, mobile devices may not determine human vs. non-human proximity. In other words, some mobile devices may only determine proximity to any object that can be registered, such as a table. In some configurations, mobile devices may attempt to determine whether a proximate object is human, but may do so poorly. For example, a mobile device may not have sufficient information to determine whether the proximate object is human.

In various embodiments, the mobile device 120 can be configured to more accurately detect whether a proximate object is human, for example, as discussed above. Accordingly, the mobile device 120 may experience a reduced number of false-positive proximity detections, thereby allowing increased transmission power when a human is not detected. Increased transmission power can increase communication performance.

In an embodiment, the mobile device 120 can be configured to perform one or more actions based on the detected material characteristics described above. For example, the mobile device 120 may be able to distinguish a particular material based on an adaptive library entry. The mobile device 120 can be configured to perform an action whenever it detects that particular material (or equivalent capacitive measurement), which may represent a user's kitchen counter, for example. For example, the mobile device 120 can be configured to set a profile that disables a BLUETOOTH™ radio and maximizes a ring tone volume. The foregoing state can be referred to as an "on counter" state, and can correspond to a scenario where the user does not expect to use BLUETOOTH™, and may be far from the mobile device 120.

In an embodiment, the mobile device 120 can adapt to changes in learned objects over time. For example, the mobile device 120 can be left a on a particular table routinely. Accordingly, the mobile device 120 can correlate the measurements obtained when on the table with, for example, an "on table" state, similar to the "on counter" state described above. The mobile device 120 can correlate the measurements using, for example, the material libraries. Over time, however, the table surface may become worn, changing the measurements obtained when the mobile device 12 is on the table. The mobile device 120 can be configured to account for small changes (e.g., below a threshold) in learned materials. For example, the mobile device 120 can update the learned material library with new measurement results every time it is placed on the table.

The mobile device 120 can further correlate additional environmental measurements with the table. For example, the dielectric constant of the table may change subject to a temperature coefficient, and room temperature can be correlated with the time of day. Accordingly, the mobile device 120 can determine expected measurement values based on the combination of time of day, temperature, and/or any other metadata. The ability to add environmental scenario data gathered over time can allow the mobile device 120 to perform environment recognition faster and/or more accurately.

In an embodiment, the mobile device 120 can adjust an output of the user interface 225 (FIG. 2) based on one or more detected environment characteristics. In some embodiments, the mobile device 120 can output an alert (e.g., audio or visual) and/or change a display (e.g., text, image, etc.). As an example, a camouflage application could associate certain material determinations with images of that material, and when placed on wood the screen can show an image of wood.

In an embodiment, the mobile device 120 can adjust a power state based on one or more detected environment characteristics. For example, the mobile device 120 can detect water and turn off the power to avoid short circuits. In an embodiment, the mobile device 120 can adjust a power state output of the antenna 245 based on one or more detected environment characteristics. For example, the mobile device 120 can transmit information about an encountered material to a networked database. In an embodiment, the mobile device 120 can adjust a characteristic of the memory 220 (FIG. 2) based on one or more detected environment characteristics. For example, the mobile device 120 can log information about an encountered material.

Figure 15:
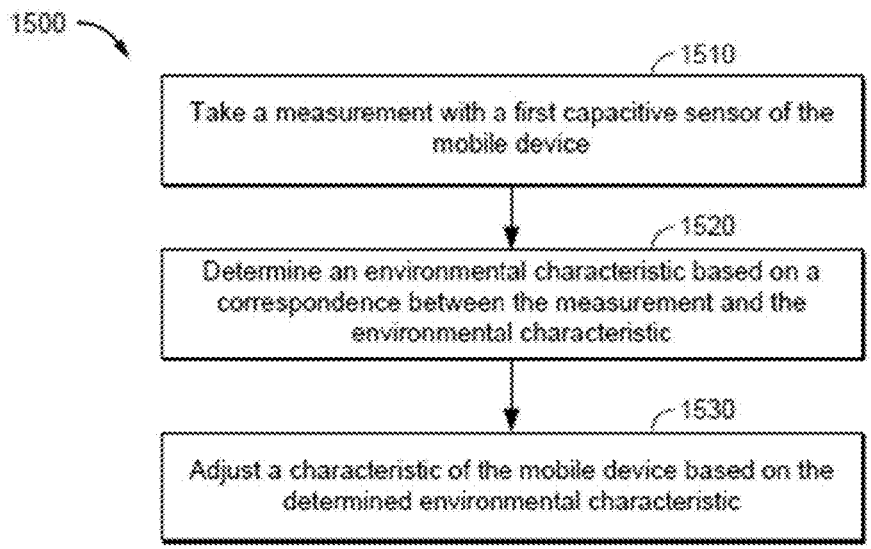
FIG. 15 is a flowchart of an exemplary method of sensing an environment of the mobile device of FIG. 2.

FIG. 15 is a flowchart 1500 of an exemplary method of sensing an environment of the mobile device 120 of FIG. 2. Although the method of flowchart 1500 is described herein with reference to the mobile device 120 discussed above with respect to FIG. 2, a person having ordinary skill in the art will appreciate that the method of flowchart 1500 can be implemented by another device described herein, or any other suitable device. In an embodiment, the steps in flowchart 1500 can be performed at least in part by a processor or controller such as, for example, the processor 215 (FIG. 2) and/or the environment sense controller 250 (FIG. 5). Although the method of flowchart 1500 is described herein with reference to a particular order, in various embodiments, blocks herein can be performed in a different order, or omitted, and additional blocks can be added.

First, at block 1510, the processor 215 takes a measurement with a first capacitive sensor of the mobile device 120. For example, the processor 215 can take a measurement with the capacitive sensor 255. The measurement can include a capacitance detected at one or more sensors 255, a charge on one or more sensors 255, a change thereof, etc., as discussed herein.

Next, at block 1520, the processor 215 determines an environmental characteristic based on a correspondence between the measurement and the environmental characteristic. In an embodiment, the determined environmental characteristic can include a dielectric constant of an object proximate to the mobile device 120. For example, the processor 215 can determine a dielectric constant of a nearby surface based on the charge on the sensors 255, as discussed above with respect to the section titled "Static Dielectric Detection." In various embodiments, the environmental characteristic can include a value indicative of a material adjacent the mobile device 120.

In an embodiment, the determined environmental characteristic at block 1520 can include a material type of an object proximate to the mobile device 120. For example, the processor 215 can determine a material type of a nearby material, as discussed above with respect to the section titled "Lookup Tables." In an embodiment, the determined environmental characteristic at block 1520 can include a conductivity classification of a proximate object.

In an embodiment, the mobile device 120 is in motion relative to a proximate object. The processor 215 can determine a change in measurement caused at least in part by the relative movement of the mobile device 120. The processor 215 can determine the characteristic of the object based on the change in measurement at block 1520. The processor 215 can measure an indicator of a change in position of the mobile device 120. The processor 215 can determine the characteristic of the object based further on the indicator. For example, the processor 215 can determine a dielectric constant of a nearby surface as discussed above with respect to the section titled "Dynamic Dielectric Detection."

In an embodiment, the processor 215 can determine a variability in measurement caused by an object in the proximity of the mobile device 120. The processor 215 can determine whether the object is human based on the variability in measurement at block 1520. For example, the processor 215 can determine an indication that a nearby object is a living object, as discussed above with respect to the section titled "Human Detection."

In an embodiment, the processor 215 can take a measurement with a second capacitive sensor of the mobile device 120. The processor 215 can determine the spatial relationship based on the measurements taken from the first and second capacitive sensors. The determined spatial relationship comprises a manner in which a hand grips the mobile device at block 1520. For example, the processor 215 can determine a grip type as discussed above with respect to the section titled "Grip Detection."

Then, at block 1530, the processor 215 adjusts a characteristic of the mobile device 120 based on the determined environmental characteristic. In various embodiments, the processor 215 can adjust the characteristic of the mobile device 120 as described above with respect to the section titled "Exemplary Applications." For example, adjusting the characteristic can include adjusting a characteristic of radio transmission and/or reception, displaying an image or text on the mobile device screen, transmitting data related to the detected environmental characteristics, logging data, building relational databases, establishing patterns of mobility, establishing patterns of expected use cases, etc.

In an embodiment, the processor 215 can record an updated correspondence between the measurement and the environmental characteristic at block 1530. In an embodiment, the processor 215 can adjust transmit power of the mobile device 120 at block 1530. In an embodiment, the processor 215 can adjust a tuning of an antenna at block 1530. In an embodiment, the processor 215 can adjust a user interface output at block 1530. In an embodiment, the processor 215 can transmit information related to the measurement at block 1530. In an embodiment, the processor 215 can log data at block 1530. In an embodiment, the processor 215 can build a relational database at block 1530. In an embodiment, the processor 215 can establish patterns of mobility and patterns of expected use cases at block 1530.

Figure 16:
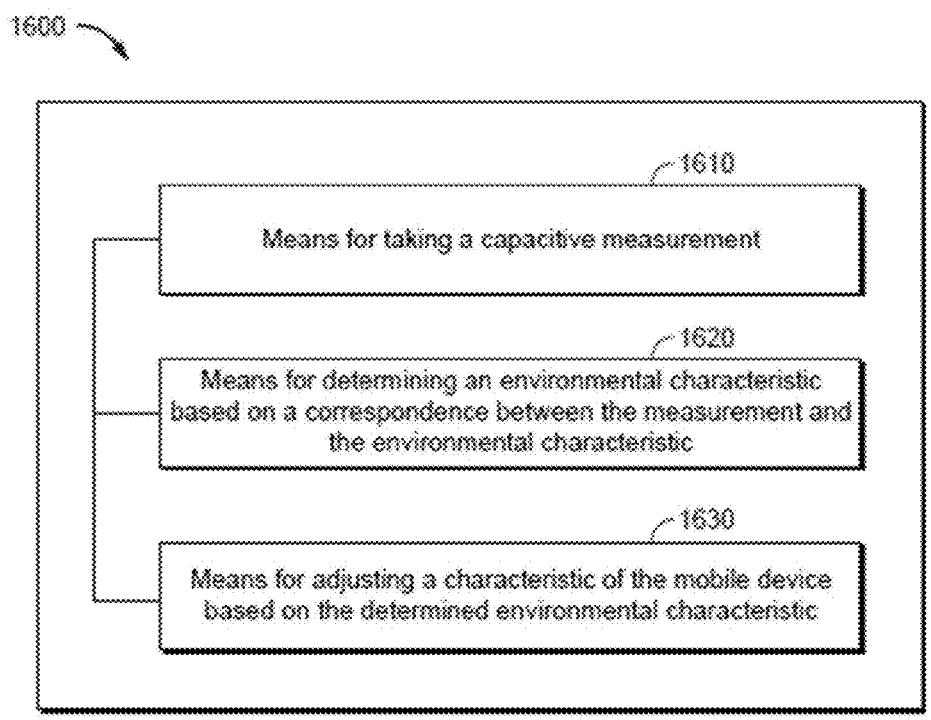
FIG. 16 is a functional block diagram of an apparatus for sensing an environment of the mobile device of FIG. 2, in accordance with an embodiment of the disclosure.

FIG. 16 is a functional block diagram of an apparatus 1600 for sensing an environment of the mobile device 120 of FIG. 2, in accordance with an embodiment of the invention. Those skilled in the art will appreciate that an apparatus for sensing an environment may have more components than the simplified apparatus 1600 shown in FIG. 16. The apparatus 1600 for sensing an environment shown includes only those components useful for describing some prominent features of implementations within the scope of the claims. The apparatus 1600 for sensing an environment includes means 1610 for taking a capacitive measurement, means 1620 for determining an environmental characteristic based on a correspondence between the measurement and the environmental characteristic, and means 1630 for adjusting a characteristic of the mobile device based on the determined environmental characteristic.

In an embodiment, means 1610 for taking a capacitive measurement can be configured to perform one or more of the functions described above with respect to block 1510 (FIG. 15). In various embodiments, the means 1610 for taking a capacitive measurement can be implemented by one or more of the environment sense controller 250 (FIG. 2), the sensors 255 (FIG. 2), and the Σ-Δ ADC 360 (FIG. 7).

In an embodiment, means 1620 for determining an environmental characteristic based on a correspondence between the measurement and the environmental characteristic can be configured to perform one or more of the functions described above with respect to block 1520 (FIG. 15). In various embodiments, the means 1620 for determining an environmental characteristic based on a correspondence between the measurement and the environmental characteristic can be implemented by one or more of the processor 215 (FIG. 2), the memory 220 (FIG. 2), the accelerometer 227, and the environment sense controller 250 (FIG. 2). In various embodiments, the environmental characteristic can include a value indicative of a material adjacent the mobile device 120.

In an embodiment, means 1630 for adjusting a characteristic of the mobile device based on the determined environmental characteristic can be configured to perform one or more of the functions described above with respect to block 1530 (FIG. 15). In various embodiments, the means 1630 for adjusting a characteristic of the mobile device based on the determined environmental characteristic can be implemented by one or more of the processor 215 (FIG. 2), the memory 220 (FIG. 2), the user interface 225, the antenna controller 240, the transmitter 235, and the radio subsystem 230.

Naïve Bayesian Classifier for Grip Detection

As discussed extensively above, the environment sense controller may take one or more capacitive measurements using one or more sensors to detect a grip on the mobile device. One way of determine the (kind of) grip based on the observed capacitive measurements is to use a look up table which associates grips with corresponding reference capacitive measurements. While a look up table is an efficient way to implement a grip detector, its accuracy may not be sufficient in properly detecting a grip. Furthermore, a look up table may lack flexibility in its implementation. Another way to determine the grip is to use a statistical method, for instance, a Naïve Bayesian Classifier.

A Naïve Bayesian Classifier is a statistical approach which calculates the posteriori probability for a plurality of classes, i.e., different kinds of grips $C_i$ for $1<i<Y$, where Y is the number of different types of grips, given one or more capacitive measurements X are observed (X may be a Z-dimensional vector having Z samples, $x_1, \ldots x_Z$, e.g., Z capacitive measurements from one or more sensors, $S_1, \ldots S_Z$). Such probability can be expressed as $P(C_i|X)$. The posteriori probabilities can be evaluated for different types of grips and the maximum posteriori probability would indicate which type of grip is most likely given the observed capacitive measurements. Using the Naïve Bayes theorem, the probability $P(C_i|X)$ can be evaluated as follows:

$$P(C_t | X) = \frac{P(X | C_t)P(C_t)}{P(X)} \quad (9)$$

$P(X)$ is the a priori probability of the observed capacitive measurements. Because the classifier is comparing the posteriori probabilities for different kinds of grips and the $P(X)$ terms is the same for all the posteriori probabilities, the term may be ignored or disregarded in the classifier.

$P(C_i)$ is the a priori probability of a grip. In some embodiments, it is assumed that the probability of individual types of grips are equally likely, $P(C_i)=P(C_{i+1})= \ldots =P(C_Y)$ $=1/Y$. In some embodiments, the a priori probabilities for the grips may be pre-determined, e.g., using empirical data indicating the frequency of observing a particular grip, and/or or manual input values based on prior knowledge.

$P(X|C_i)$ is the probability of observing the capacitive measurements, X, given a particular grip C. In some embodiments, the probability distribution of observing X given $C_i$ is known, and was previously determined from training data. It may be assumed in some embodiments that the samples in the capacitive measurements from the sensors are independent from each other, and $P(X|C_i)$ can be estimated by:

$$P(X|C_i) \approx \Pi_{k=1}^{X} P(x_k|C_i) \quad (10)$$

In some embodiments, the distribution used in the classifier representing the probability of observing the capacitive measurement X given a particular grip $C_i$, i.e., $P(X|C_i)$ is modeled using a normal distribution, and thus the probability distribution can be defined/parameterized by its mean and variance. By using a model, the classifier may mathematically evaluate probabilities for the observed capacitive measurements X efficiently using a well-defined function for the distribution. It is envisioned that other suitable distributions may be used, such as other generalized normal distributions.

Figure 17:
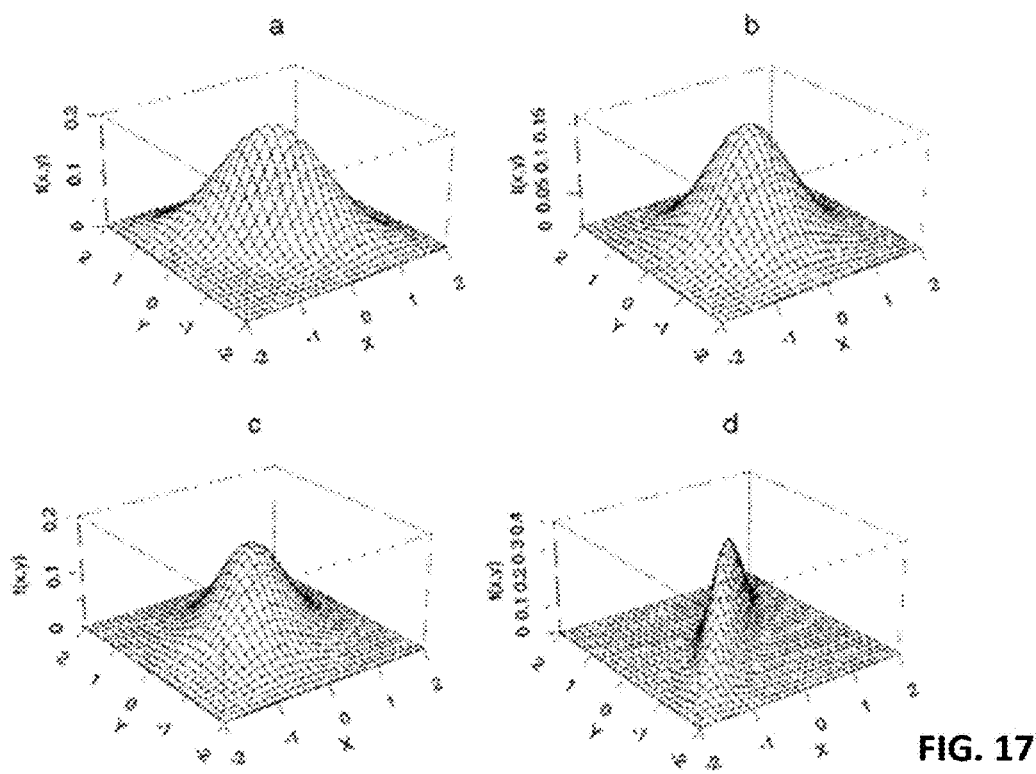
FIG. 17 shows four illustrative probability distributions with varying variances suitable for use in a Naïve Bayesian classifier, in accordance with some embodiments of the disclosure.

The training data includes labeled data associating capacitive measurements with corresponding grips. In some cases, the training data may be obtained by having a sufficiently large number of different users to hold the mobile device. The mobile device may then take capacitive measurements from the sensors as the users are holding the mobile phone with a particular grip. Then, capacitive measurements can be tagged with the particular grip (i.e., label). By allowing many users provide training data advantageously allow the classifier to be trained for a large range of users. In some cases, the training data may be obtained by prompting a user to label potential grips detected by the mobile phone. A user may also be asked to provide training data by prompting a user to provide a grip, and recording the capacitive measurements. In other words, a user of the mobile device may train the classifier by holding the phone using different grips and providing user input to label the capacitive measurements of a potential grip. The labeled data may be stored and the appropriate probability distributions may be computed therefrom, e.g., mean and variance of the distribution for each type of grip may be calculated for use in the probabilistic model. The probability distribution may then be defined using the computed mean and variance, and the probability $P(X|C_i)$ can be easily computed by providing the observed capacitive measurements as inputs. Exemplary probability distributions are shown in FIG. 17, where the variances in two dimensions are varied, causing the distribution to have a wider or narrower shape. The probability distributions may be two-dimensional, taking samples from two sensors as inputs to determine the probability of the observed capacitive measurements from the two sensors given a particular grip. If more sensors are used, the probability distributions may have a higher dimensionality. The probability distributions for the different grips may be composed into as a grip map, where grip probability distributions, e.g., ones seen in FIG. 17 are distributed according to the mean values of the probability distributions for the different grips.

In some embodiments, a scale factor may be applied to each probability distribution to normalize the peak (e.g., peak of the normal distribution) to some level, e.g., 1. In certain embodiments, the scale factor may be used to modify the probability distribution such that the accuracy of the classifier can be improved, especially when there are grips which exhibits similar capacitive measurements (e.g., the probability distributions are "nearby" in the grip map). As the variance of a probability distribution increases, the peak value of the probability distribution may decrease, which makes the grip corresponding to the probability distribution less likely (i.e., having a lower probability) than a "nearby" grip with a smaller variance. Normalizing the peaks to a particular value/constant may reduce the influence of low variance peaks being dominated (incorrectly) by other nearby grips. Especially rare grips may be further assisted by making the peak value of its probability distribution greater than the peak value of other distributions without unnecessarily encroaching on other grips' space in the grip map.

It is noted that a Naïve Bayesian classifier is particularly useful in detecting grips (such as the various grips discussed in relation to FIG. 10A-E) for mobile devices due to its ability to handle overlapping classes well (when compared to Support Vector Machines). Furthermore, the probability distributions may be scaled to better handle classes that are close to each other.

A mobile device may be equipped with two sensors, or more than two sensors (e.g., three or four sensors, or more). For grip detection, it is advantageously to have two or more sensors placed near locations where a user's hand(s) is likely to hold the device. For instance, the sensors may be placed on two sides of a mobile device and/or corners of the mobile device. Each sensor produces a capacitive measurement, and a plurality of sensors may provide a plurality of capacitive measurements as data vector X. The observed capacitive measurements from the sensors can be provided to the Naïve Bayesian classifier to determine the grip, i.e., a specific way the mobile device is being held.

In one embodiment, a single sample is collected from a sensor. In another embodiment, several samples are collected from a sensor and combined and/or averaged to form the observation for the sensor, which may be less prone to noise than collecting a single sample.

During operation, observed capacitive measurements are obtained, and can be used as inputs to the probability distributions for the various grips to determine which the most likely/probable grip is given the observed capacitive measurements using the Naïve Bayesian classifier framework described above. A computational loop may be used to iterate through the probability distributions for the various grips to compute the respective probabilities. The computational loop may select the most probable grip and provide an identifier for the grip as the result. For instance, an array may store the different grips, and the loop may provide the index of the most probable grip in the array as the result.

Various optimizations/simplifications may be made to the Naïve Bayes classifier to improve its performance. In some embodiments, the peak coordinates of the grips (e.g., mean coordinates) are stored as part of the data set, i.e., the mean values of the probability distributions are stored and made easily accessible (e.g., in an array). In one embodiment, the classifier first locates the nearest K peaks to the observed capacitive measurements (where K is less than Y), and the probabilities are computed only from the nearest K probability distributions. The maximum probability is then selected from the probabilities computed from the nearest K probability distributions.

In certain embodiments, the classifier may be optimized to report no recognized grips or no probable grips if all peaks coordinates (i.e., mean values of the probability distributions for the grips) fall outside of a defined radius from the observed capacitive measurements. In one embodiment, the classifier may be optimized to report the single grip which falls inside a radius as the most probable grip without calculating the probability from the probability distributions.

In some embodiments, any combination of grips is indistinguishable from each other, only the distance of the observed capacitive measurements from the peaks is calculated. In some embodiments, there is an augmentation to the grip map (i.e., the map of probability distributions for various grips). If the local minima of saddles between grip peaks are found, and a spline is generated to follow the minima. The spline that has been found in the saddles may be used to define a border between different grips in the grip map—the side of the border which exhibits the greatest sum of probable outcomes is the side that the grip resides on. A spline may easily allow the observed capacitive measurements to be classified as a particular type of grip simply by determining on which side of the border the observed capacitive measurements fall.

In summary, various optimizations and augmentations may be provided to reduce the computational complexity of the classifier. Calculating probabilities from the probability distributions usually involves multiple computationally expensive operations. Finding distances between points (e.g., between the observed capacitive measurement and peak coordinate(s)) or classifying a point using bordered areas in a grip map is less computationally complex. As computation decreases, power consumption of the device doing the computation decreases. By saving power, the classifier can be "always" on ("ambient sensing") or on for longer periods of time, even for mobile devices where computational resources and power are generally limited. Having a classifier that can detect grips at any time avoid the need to prompt the user for permission to turn the classifier on or off (e.g., to avoid draining the battery of the mobile device).

While static gestures may be detected from capacitive measurements taken at a given time using the classification methods disclosed herein, detecting a sequence of gestures using one or more finite state machines (FSMs) may allow the mobile device to detect more complex gestures. The detection of a complex gesture comprising a sequence of gestures may then be used to trigger a user input event. For instance, a short history of samples as data points may be kept in storage, and a point to point series of vectors (e.g., directional line segments) can be made between the data points. Every sample coordinate acquired after the first may create a line segment. The vector information for the line segments can be fed to a group of FSMs to detect a complex gesture that is composed of a sequence of gestures.

FSMs may be used to detect a sequence of gestures by capturing, e.g., the change in magnitude from the last change in magnitude and the angle from line segment to line segment. The group of FSMs may watch for a sequence of line segment characteristics to take place (i.e., leading the FSM to reach to a "detection" or "end" state). Once a sequence is satisfied then the FSM is reset and a user input event will be generated. If a sequence of gestures does not correspond to a known sequence, the sequence would either not get past the first transition to advance another state or would be reset with no action taking place. In some embodiments, if a sequence is partially satisfied (e.g., for several times, or often), the mobile device may push the FSM to reach the "detection" state or "end" state by prompting the user with a message to request further user input from the user to confirm a gesture, "Did you just try to tap-to-click" or any suitable prompt to verify the user is trying to trigger a sequence (but the default sequence expectation is not tailored well to their particular input).

In some embodiments, the FSMs may be used with a classifier which detects static gestures to detect complex gestures. Each sample (i.e., observed capacitive measurements for a given time or period of time) can successively generate a detected grip using the classifier to compose the sequence of detected grips. Each detected grip triggers a change in the finite state machine, e.g., to another state. A sequence of changes in the finite state machine may lead to a detection state (or "end" state) where a particular sequence of gestures has been detected to indicate the existence of the complex gesture.

Figure 18:
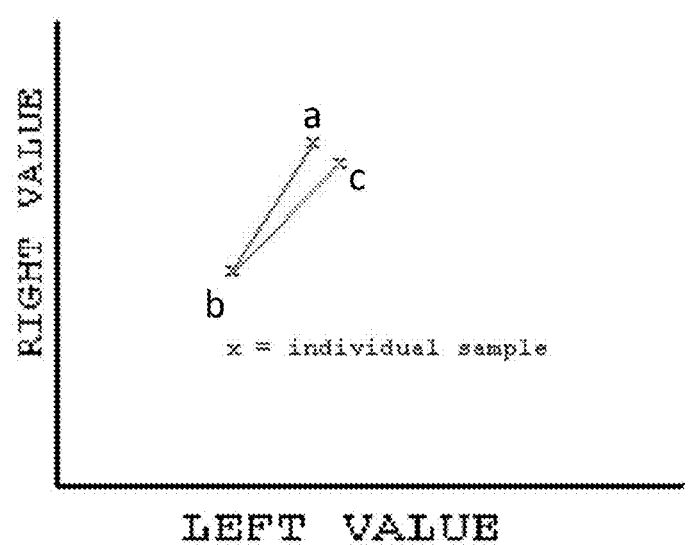
FIG. 18 shows illustrative data points usable with a finite state machine in detecting complex gestures, in accordance with some embodiments of the disclosure.

Complex gestures having may be useful when a user wishes to provide a user input through a sequence of gestures. For instance, a user may want to take a picture of him/herself using a mobile device, and the FSMs may be used to detect the sequence of gestures. The user may hold the phone with the index finger roughly in the back-center of the phone, three other fingers on one side, and palm/thumb on the other side. Interacting with the screen can be cumbersome with larger phones in one handed operation, and also could partially obscure the image being observed while the picture is being taken. In such instance, a sequence of gestures may be used to allow the user to take a picture without interacting with the screen. The index finger starts at rest on the back of the phone, then is lifted, and then is placed back down upon the phone. To the mobile device, the sequence may include three detected gestures (1) the index finger at rest, (2) the index finger is lifted, and (3) the index finger is back at rest (each corresponding to a state in an FSM). FIG. 18 illustrates a plot showing three data samples, a, b, and c corresponding to the three detected gestures. At sample finger beginning on the phone, then the sample values decreases since the finger was removed from proximity, then the sample values increase to a similar value as before (though probably not exactly the same as before since the index finger may not be exactly back to where it was, or the capacitive measurements may change due to dielectric temperature change, etc.).

While the above illustration explains the Naïve Bayesian classifier being used to determine grip, the same technique may be applied to classify capacitive measurements for other classes and/or environment characteristics. For instance, the classifier may be used to identify specific environments surrounding the mobile device, including but not limited to: resting on surface(s), residing in pockets, being holstered, being carried in purses or other luggage, any type of non-hand contact, etc. Sequence of states in environment characteristics may also be detected using FSMs (e.g., detecting a sequence of states where the user has made a sequence of moves to the device to put a device in a jean pocket, or where the user has made a sequence of moves to the device to place the device in a hands-free cradle in the car, etc.).

In some embodiments, capacitive measurements may be collected by a mobile device over time, and a clustering algorithm may be used to cluster the capacitive measurements into one or more types of (potential) grips. The clustered data may then be used to generate probability distributions for the classifier. Using the classifier, any further capacitive measurements may then be classified into one of these (potential) grips. Once a potential grip is detected, a user may be prompted to provide user input to associate the potential grip as one of the grips that can be used to make a command and/or change a characteristic of the mobile device. The clustering technique to learn the different potential grips may also be applied to training data collected from many different users overtime.

Besides learning new clusters and classes, some embodiments can improve the classifier by improving known clusters and classes. A mobile device may be initiated with a generic grip map and/or grip probability distributions. A mechanism may be used to add new classes, and/or modify the probability distributions of existing clusters to tailor generic grip maps to a user's specific grip map over time. This is particular advantageous because different capacitive measures may be observed for different users (e.g., different size of hands, some people have more clammy hands, etc.). In short, it may be difficult to provide probability distributions that fits all.

In one instance, the mobile device may store a set of vectors joining a sequence of samples (i.e., capacitive measurements). If the vectors substantially sum to zero, the samples would indicate that a user is using a particular static grip in holding the phone. Such data samples being similar to each other may be collected over time to form an additional class. Means and variances may be computed accordingly for the additional class. If an additional class is added, the device may prompt the user to label the grip such that the grip can be associated with a particular command to the device, or state of the device. In some cases, a state or a grip identifier may be assigned to this additional class by the mobile device. If the vectors do not sum to zero, it is likely that the samples do not represent a static grip. One or more of samples may be used to improve or move the peak coordinates and/or variances of other grips by associating a sample with a grip having peak coordinates closest to the sample. By providing new samples to existing grip distributions, the grip distributions can be improved over time based on samples taken during the operation of the mobile device. Learned classes may be used in some embodiments to form a user-specific grip map that could be used to improve classification of capacitive measurements In some instances, an experimental grip map can be created from generic grip map and a shadow (user-specific, learned) version of the grip map. A shadow version of the nearest peak grip may be added to the generic map. The new mean position may lie half way along the line segment formed by the average position of the currently observed grip and the peak of the originally identified nearby grip. Advantageously, the generic grip map may be adapted to the user (e.g., someone who may have different sized hands, etc.).

In some cases, the shadow map result may be compared to the default grip map result over time. A first order infinite impulse response (IIR) filter may be used to fill in the difference between the original map probability and the shadow map probability. Once the IIR accumulates to a certain level, the shadow map is copied over the original grip and is used in regular operation. Other grips in the shadow map may have their peak positions/centers moved by a fraction of the overall movement that had taken place between the replaced grip and the newly instated grip. This global movement advantageously captures effects of hand size and accelerates the tuning of grips.

In some embodiments, a user may be identified based on coincident accuracy of grips using a trained grip map. If a user can grip a phone with consistently high probability grip scores, then the algorithm can identify the user as the most common user. Overall likelihood of the user can be identified by one or more of the following: averaging grip probability score, dwell time in particular grips, average variance while in a grip, populating 2, 3, and 4 long grip change windows and correlating with the most common scenarios observed for each window. Window averages may be updated with every new grip transition. Less common users may be prompted more often for a password, or may have some other user interface consequence. In some cases, identification of the user may be used to select a grip map that is tailored to the particular user based on the accuracy grip detection compared across different grip maps.

In some embodiments, grip maps may be shifted or modified based on packaging drift effects. As temperature and humidity of the casing of a mobile device changes, the dielectric constant will change. Sometimes, the dielectric constant also changes because the user changes casing of a mobile device. Dielectric constant changes appear as a constant shift in the measurement being taken, and effectively shift the grip map by a particular constant. By adding a sensor that is not influenced by the presence of a hand, the temperature and humidity variables can be observed. A linear or piecewise linear correction can be applied to the measured values read from the grip sensors, where a calculation can be made for shifting every sample of sensor data. Alternatively, the peaks of the grip map could be altered so that the skewed data could fall on a skewed map, which ultimately corrects for the effect of the offsets. For instance, the mobile device may observe using an environmental sensor to determine the particular constant (i.e., corresponding to the constant shift caused by the change in the dielectric constant), and update the mean values in the grip map. This operation may happen much less frequently due to the thermal inertia of the device.

In some embodiments, movement may be identified based on transient analysis of inter-grip data. As a grip is changing, or as any movement happens, the skin on the hand deflects due to the inertia of the phone resisting the hand pushing it in some other direction. The deflection of the skin may result in a higher or lower capacitive reading. As sensor count increases, and as sample rate increases, the elasticity of the hand becomes apparent. The differential combination of hand moving towards and hand moving away from sensors as the hand accelerates the phone in a particular path creates a capacitive stimulus. Direction can be estimated by observing the event described above and applying a comparison between all of the sensors and all of the sensors. The net direction can be determined by finding the lowest valued weighting of sensors and the highest value weighting; the hand is moving to the lowest direction from the highest weighted direction. For instance, shake type gestures can be determined, as well as swing gestures (picking up a phone) or press type events (pushing a phone into a pocket). In some embodiments, the movement detection synchronize or correlate data from an accelerometer with the capacitive measurements to better detect movement.

Figure 19:
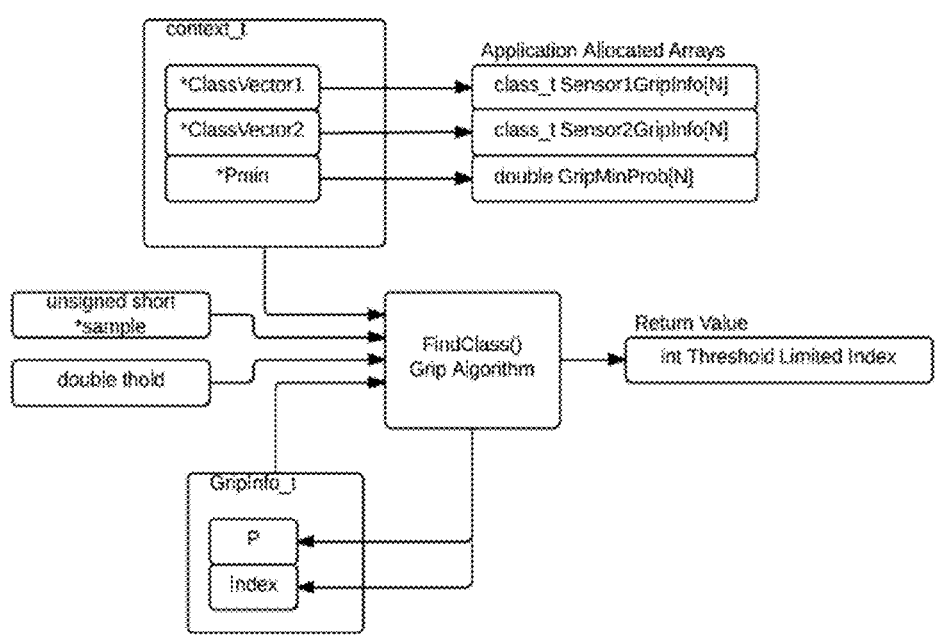
FIG. 19 shows an illustrative application programming interface for an exemplary classifier, in accordance with some embodiments of the disclosure.

One illustrative application programming interface (API) for grip detection is illustrated in FIG. 19. The Grip Detection API is organized such that information to describe all grips is separated from the processing required to identify grips. No data about the physical grips to be identified stays resident in any of the functions doing the processing; this means that two completely individual physical devices could use the same algorithm by simply reconfiguring the data structure the grip algorithm operates on. In some embodiments, the data that the grip algorithm uses may be is organized in a hierarchy such that any if any particular aspect a physical sensor were to change, only a simple, isolated change to the configuration of the data in the member arrays. In some cases, additional physical grips to be identified can be added to an existing configuration by extending the length of each of the allocated arrays and populating the new elements with the new grip description data.

The class_t structure, as seen in the "Application Allocated Arrays" is used to include data required to describe a grip from the perspective of a single sensor. If multiple sensors are used, the same number of instances of class_t may be used to completely describe the grip. For example, if two sensors are used, then two class_t instances may be allocated, one to describe each sensor. Exemplary members in class_t may include:

| Name | Mean |
|---|---|
| Type | Double |
| Description | the mean value used to describe a probability distribution of a single sensor perspective of a single grip |

| Name | Variance |
|---|---|
| Type | Double |
| Description | the variance value used to describe a probability distribution of a single sensor perspective of a single grip |

| Name | Scale |
|---|---|
| Type | Double |
| Description | the value used to scale the peak value of a probability distribution to a desired value; (optional) useful for normalizing probability distributions for a grip to a peak value |

The results of the most likely grip may be stored a Gripinfo_t structure by FindClass( ). The structure may include the value of the index of the ClassVector array used to find the greatest probability and (optionally) the value of the greatest probability. Gripinfo_t data may allow raw grip information to be made available to higher level software. Exemplary members of the Gripinfo_t structure includes:

| Name | P |
|---|---|
| Type | float |
| Description | Largest magnitude probability for the given sample data of all of the grips specified in an array or arrays of class_t (ClassVector) |

| Name | index |
|---|---|
| Type | Unsigned int |
| Description | Index of an array or arrays of class_t (ClassVector) which resulted in the highest probability grip for the given sample data |

The collection of data to describe grips for a device, and metadata about the described grips, is organized in a context_t type. An instance of context_t may not include any storage for grip information, but may include pointers to where the grip description information is stored. For a single index, arrays in the context_t are considered to represent some aspect of a single grip. For example, ClassVector1[0], ClassVector2[0], and Pmin[0] each describe an aspect of a single physical grip. Exemplary members of context_t includes:

| Name | ClassVector2 |
|---|---|
| Type | class_t* |
| Description | ClassVector1 is a pointer used to store the location of an array of class_t. Each element of the array being pointed to describes a single grip from the point of view of a single sensor. |

| | |
|---|---|
| Name | ClassVector2 |
| Type | class_t* |
| Description | ClassVector2 is a pointer used to store the location of an array of class_t. Each element of the array being pointed to describes a single grip from the point of view of a single sensor. |

| | |
|---|---|
| Name | Pmin |
| Type | double* |
| Description | Pmin is a pointer to an array of double. Each element of the array holds the minimum probability of a specific grip to be considered valid. |

The function p( ) calculates the probability of a sample on a probability distribution, using a statistical distribution defined by its mean(s), and variance(s), and an observed sample point (i.e., observed capacitive measurements). This function may be called by FindClass( ).

| | |
|---|---|
| Prototype | double p (double variance, double mean, unsigned short sample); |
| Parameters | 1. variance: Parametric variance value for the distribution to be calculated<br>2. mean: Parametric mean value for the parameterized to be calculated<br>3. sample: The sample point at which the probability should be calculated |
| Returns | The probability calculated given the parametric distribution data and sample point is returned |

The function FindClass( ) searches defined grips for the most probable match when given a single sample of grip data. In one example, FindClass( ) may support up to 256 grips. It is envisioned that any number of grips may be supported. FindClass( ) may cycle through all (or at least a subset of) grips represented in the ClassVector arrays and return the index of the most likely grip.

| | |
|---|---|
| Prototype | int FindClass(void *context, unsigned short *sample, void *status, double thold); |
| Parameters | 1. *context: pointer to a context_t structure holding the grip descriptions 2. mean: Parametric mean value for the parameterized to be calculated<br>2. *sample: pointer to an unsigned short array holding the grip data. The ordering of the grip data in the array should match the ordering of data in the ClassVector1 and ClassVector2 member variables. For example, if ClassVector1 represents the statistical model of sensor A, status[0] should contain data from sensor A, ClassVector2 should represent the model of sensor B, status[1] should contain data from sensor B, and so on.<br>3. *status: pointer to a GripInfo_t structure populated by FindClass( ) to store the raw probability and grip index detected.<br>4. thold: Threshold value to compare the largest detected grip probability to. This level specifies the minimum probability required for reporting a valid grip. This value does not supersede the minimum probability values defined per grip in the Pmin array pointed to in the first parameter, context. |
| Returns | If a grip is detected which has a probability equal to or greater than the value of thold, the index of the most probable grip in the context → ClassVector arrays will be returned. If no grip is found to have a probability equal to or greater than the value of thold, then −1 is returned. |

In the embodiments described above, systems with capacitive sensing were described in conjunction with particular embodiments. It will be understood, however, that the principles and advantages of the embodiments can be used for any other systems, apparatus, or methods with a need for capacitive environment detection. For example, any systems, apparatus, or methods with a need for adjusting one or more device characteristics based on environmental factors.

Such methods, systems, and/or apparatus can be implemented into various electronic devices. Examples of the electronic devices can include, but are not limited to, consumer electronic products, parts of the consumer electronic products, electronic test equipment, etc. Examples of parts of consumer electronic products can include rectifiers, programmable filters, attenuators, variable frequency circuits, circuit having an output coupled to an input of an analog-to-digital converter, etc. Examples of the electronic devices can also include memory chips, memory modules, circuits of optical networks or other communication networks, and disk driver circuits. The consumer electronic products can include, but are not limited to, wireless devices, a mobile phone (for example, a smart phone), cellular base stations, a telephone, a television, a computer monitor, a computer, a hand-held computer, a tablet computer, a personal digital assistant (PDA), a microwave, a refrigerator, a stereo system, a cassette recorder or player, a DVD player, a CD player, a digital video recorder (DVR), a VCR, an MP3 player, a radio, a camcorder, a camera, a digital camera, a portable memory chip, a washer, a dryer, a washer/dryer, a copier, a facsimile machine, a scanner, a multi functional peripheral device, a wrist watch, a clock, etc. Further, the electronic device can include unfinished products.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or "connected", as generally used herein, refer to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number may also include the plural or singular number, respectively. The words "or" in reference to a list of two or more items, is intended to cover all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The teachings of the inventions provided herein can be applied to other systems, not necessarily the systems described above. The elements and acts of the various embodiments described above can be combined to provide further embodiments.

In the discussions of the embodiments above, the capacitors, clocks, DFFs, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself.

In another example embodiment, the electrical circuits of the FIGURES may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the amplification functionalities may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that the activities discussed above with reference to the FIGURES are applicable to any integrated circuits that involve signal processing, particularly those that can execute specialized software programs, or algorithms, some of which may be associated with processing digitized real-time data. Certain embodiments can relate to multi-DSP signal processing, floating point processing, signal/control processing, fixed-function processing, microcontroller applications, etc.

In certain contexts, the features discussed herein can be applicable to medical systems, scientific instrumentation, wireless and wired communications, radar, industrial process control, audio and video equipment, current sensing, instrumentation (which can be highly precise), and other digital-processing-based systems.

Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment and interior applications of any kind). Furthermore, powertrain systems (for example, in hybrid and electric vehicles) can use high-precision data conversion products in battery monitoring, control systems, reporting controls, maintenance activities, etc.

In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Other consumer applications can include audio and video processors for home theater systems, DVD recorders, and high-definition televisions. Yet other consumer applications can involve advanced touch screen controllers (e.g., for any type of portable media device). Hence, such technologies could readily part of smartphones, tablets, security systems, PCs, gaming technologies, virtual reality, simulation training, etc.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes, Examples, and Implementations

Note that all optional features of the apparatus described above may also be implemented with respect to the method or process described herein and specifics in the examples may be used anywhere in one or more embodiments.

In a first example, a system is provided (that can include any suitable circuitry, dividers, capacitors, resistors, inductors, ADCs, DFFs, logic gates, software, hardware, links, etc.) that can be part of any type of computer, which can further include a circuit board coupled to a plurality of electronic components. The system can include means for clocking data from the digital core onto a first data output of a macro using a first clock, the first clock being a macro clock; means for clocking the data from the first data output of the macro into the physical interface using a second clock, the second clock being a physical interface clock; means for clocking a first reset signal from the digital core onto a reset output of the macro using the macro clock, the first reset signal output used as a second reset signal; means for sampling the second reset signal using a third clock, which provides a clock rate greater than the rate of the second clock, to generate a sampled reset signal; and means for resetting the second clock to a predetermined state in the physical interface in response to a transition of the sampled reset signal.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

What is claimed is:

1. A non-transitory computer-readable medium comprising code that, when executed by a processor, causes an apparatus to:
   receive capacitance measurements measured by at least two capacitive sensors of a handheld device, including: (1) left capacitive sensor configured to provide capacitance measurements related to a first portion of a hand adjacent to the left side of the handheld device and (2) right capacitive sensor configured to provide capacitance measurements related to a second portion of the hand adjacent to the right side of the handheld device; and
   determine a type of grip of the hand on the handheld device based on the capacitance measurements, wherein the capacitance measurements include a differential capacitance measurement between the left capacitive sensor and the right capacitive sensor, a single-ended capacitance measurement of the left capacitive sensor, and a single-ended capacitance measurement of the right capacitive sensor; and
   apply a predetermined algorithm, wherein applying the predetermined algorithm comprises:
      calculating a magnitude of the differential capacitance measurement between the left capacitive sensor and the right capacitive sensor; and
      calculating a sum of (1) the single-ended capacitance measurement of the left capacitive sensor, and (2) the single-ended capacitance measurement of the right capacitive sensor,
   wherein the magnitude of the differential capacitance measurement and the sum are used by the algorithm to determine the type of grip, and
   wherein the type of grip specifies placements of the palm, digits, and thumb on the handheld device in a particular configuration.

2. The medium of claim 1, wherein:
   determining the type of grip of the hand comprises accessing a multi-dimensional algorithm stored on a memory using the capacitance measurements.

3. A method for grip detection on a handheld device using environmental capacitive sensing, the steps comprising:
   receiving capacitance measurements measured by at least two capacitive sensors, including: (1) a first capacitive sensor configured to provide capacitance measurements related to a first portion of a hand and (2) a second capacitive sensor configured to provide capacitance measurements related to a second portion of the hand;
   calculating a differential capacitance measurement between the first capacitive sensor and the second capacitive sensor;
   calculating a sum capacitance measurement from the first capacitive sensor and the second capacitive sensor;
   applying an algorithm to one or more of the capacitance measurements, wherein the capacitance measurements comprise: single-ended capacitance measurement of the first capacitive sensor; single-ended capacitance measurement of the second capacitive sensor; differential capacitance measurement; and, sum capacitance measurement; and determining a type of grip of the hand based on the application of algorithm to capacitance measurements, wherein, the type of grip specifies placements of the palm, digits, and thumb on the handheld device in a particular configuration.

4. The method of claim 3 further comprising the step of connecting the first capacitive sensor to a positive input of a differential amplifier front-end to an analog-to-digital converter and the second capacitive sensor to a negative input of the differential amplifier front-end, or vice versa to obtain the differential capacitance measurement between the first capacitive sensor and the second capacitive sensor.

5. The method of claim 3 wherein,
the at least two capacitive sensors includes a further capacitive sensor;
the type of grip of the hand on the handheld device is determined based further on one or more of: (1) a differential capacitance measurement between the first capacitive sensor and the further capacitive sensor, (2) a differential capacitance measurement between the second capacitive sensor and the further capacitive sensor, and (3) a single-ended capacitance measurement for the further capacitive sensor.

6. A system configured to provide grip detection of a handheld device comprising:
a left capacitive sensor configured to provide capacitance measurements related to a first portion of a hand adjacent to the left side of handheld device;
a right capacitive sensor configured to provide capacitance measurements related to a second portion of the hand adjacent to the right side of handheld device;
one or more memories for storing the capacitive sensor measurements;
one or more processors operable to execute instructions based on the capacitive sensor measurements, the instructions comprising:
receiving capacitance measurements measured by at least two capacitive sensors of the handheld device, including: (1) the left capacitive sensor configured to provide capacitance measurements related to a first portion of a hand adjacent to the left side of handheld device and (2) the right capacitive sensor configured to provide capacitance measurements related to a second portion of the hand adjacent to the right side of handheld device;
calculating a magnitude of the differential capacitance measurement between the left capacitive sensor and the right capacitive sensor;
calculating a sum of (1) the single-ended capacitance measurement of the left capacitive sensor, and (2) the single-ended capacitance measurement of the right capacitive sensor;
applying a predetermined algorithm to one of more of the capacitive measurements or calculated thereof;
determining a type of grip of the hand on the handheld device based on the capacitance measurements and algorithm application thereto, wherein the capacitance measurements include a differential capacitance measurement between the left capacitive sensor and the right capacitive sensor, a single-ended capacitance measurement of the left capacitive sensor, and a single-ended capacitance measurement of the right capacitive sensor;
wherein, the type of grip specifies placements of the palm, digits, and thumb on the handheld device in a particular configuration.

7. The system of claim 6, wherein:
the left capacitive sensor is located on or positioned along the left side of the handheld device; and
the right capacitive sensor is located on or positioned along the right side of the handheld device.

8. The system of claim 6, wherein:
the left capacitive sensor faces a left face of the handheld device; and
the right capacitive sensor faces a right face of the handheld device.

9. The system of claim 6, wherein:
the left capacitive sensor and the right capacitive sensor are parallel to front and back faces of the handheld device and proximate to a back face of the handheld device.

10. The system of claim 6, wherein the system is configured such that the first capacitive sensor is connected to a positive input of a differential amplifier front-end to an analog-to-digital converter and the second capacitive sensor to a negative input of the differential amplifier front-end, or vice versa, to obtain the differential capacitance measurement between the first capacitive sensor and the second capacitive sensor.

11. The system of claim 6 wherein, the left capacitive sensor and the right capacitive sensor each has a width between 1-4 mm.

12. The system of claim 6, further comprising:
a switch matrix for iterating through different capacitance readings, including connecting the left capacitive sensor to a positive input of a differential amplifier front-end to an analog-to-digital converter and the right capacitive sensor to a negative input of the differential amplifier front-end, or vice versa to obtain the differential capacitance measurement between the left capacitive sensor and the right capacitive sensor.

13. The system of claim 12, wherein the switch matrix is further configured to:
connect the left capacitive sensor to the analog-to-digital converter for the single-ended capacitance measurement of the left capacitive sensor and connecting the right capacitive sensor to the analog-to-digital converter for the single-ended capacitance measurement of the right capacitive sensor.

14. The system of claim 6, further comprising:
a bias sensor that is electrostatically shielded, includes the same material used in a housing of the handheld device and exposed to the same environment as the housing with respect to temperature and/or humidity.

15. The system of claim 14 wherein, the bias sensor is connectable by a switch matrix in a differential measurement configuration with the left capacitive sensor or the right capacitive sensor to detect connection breakage and/or manufacturing defects.

16. The system of claim 6 further comprising:
a further capacitive sensor;
wherein, the type of grip of the hand on the handheld device is determined based further on one or more of: (1) a differential capacitance measurement between the left capacitive sensor and the further capacitive sensor, (2) a differential capacitance measurement between the right capacitive sensor and the further capacitive sensor, (3) and a single-ended capacitance measurement for the further capacitive sensor.

\* \* \* \* \*